United States Patent
Kohyama et al.

(10) Patent No.: US 12,533,383 B2
(45) Date of Patent: Jan. 27, 2026

(54) METHOD FOR PRODUCING CELL AGGREGATE INCLUDING GLIAL PROGENITOR CELLS

(71) Applicants: Keio University, Tokyo (JP); RACTHERA Co., Ltd., Tokyo (JP)

(72) Inventors: Jun Kohyama, Tokyo (JP); Yasuhiro Kamata, Tokyo (JP); Masaya Nakamura, Tokyo (JP); Hideyuki Okano, Tokyo (JP); Miho Saito, Kobe (JP); Mitsuhiro Inoue, Kobe (JP)

(73) Assignees: Keio University, Tokyo (JP); RACTHERA Co., Ltd., Tokyo (JP)

( * ) Notice: Subject to any disclaimer, the term of this patent is extended or adjusted under 35 U.S.C. 154(b) by 834 days.

(21) Appl. No.: 17/639,767

(22) PCT Filed: Sep. 4, 2020

(86) PCT No.: PCT/JP2020/033677
§ 371 (c)(1),
(2) Date: Mar. 2, 2022

(87) PCT Pub. No.: WO2021/045217
PCT Pub. Date: Mar. 11, 2021

(65) Prior Publication Data
US 2022/0323507 A1    Oct. 13, 2022

(30) Foreign Application Priority Data

Sep. 6, 2019    (JP) .................. 2019-163452

(51) Int. Cl.
*A61K 35/30*     (2015.01)
*A61P 25/28*     (2006.01)
*C12N 5/079*     (2010.01)

(52) U.S. Cl.
CPC .............. *A61K 35/30* (2013.01); *A61P 25/28* (2018.01); *C12N 5/0622* (2013.01); *C12N 2500/32* (2013.01); *C12N 2500/38* (2013.01); *C12N 2501/105* (2013.01); *C12N 2501/11* (2013.01); *C12N 2501/115* (2013.01); *C12N 2501/13* (2013.01); *C12N 2501/135* (2013.01); *C12N 2501/235* (2013.01); *C12N 2501/395* (2013.01); *C12N 2501/41* (2013.01); *C12N 2501/415* (2013.01); *C12N 2501/998* (2013.01); *C12N 2506/45* (2013.01)

(58) Field of Classification Search
CPC .... A61K 35/30; A61K 35/545; C12N 5/0622; C12N 5/0623; C12N 5/0618; C12N 2501/13
See application file for complete search history.

(56) References Cited

U.S. PATENT DOCUMENTS 8,492,147 B2 *   7/2013   Sasai ............... C12N 5/062
                                                  435/325
2019/0153387 A1   5/2019  Okano et al.

FOREIGN PATENT DOCUMENTS

| JP | 2005-523328 A | 8/2005 |
|----|---------------|--------|
| JP | 2010-162024 A | 7/2010 |
| JP | 2011-121949 A | 6/2011 |
| JP | 2017-524340 A | 8/2017 |
| WO | 03/089619 A2 | 10/2003 |
| WO | 2005/123902 A1 | 12/2005 |
| WO | 2009/146408 A1 | 12/2009 |
| WO | 2010/140698 A1 | 12/2010 |
| WO | 2011/074690 A1 | 6/2011 |
| WO | 2013/187416 A1 | 12/2013 |
| WO | 2015/179822 A1 | 11/2015 |
| WO | 2017/141900 A1 | 8/2017 |
| WO | 2018/007428 A1 | 1/2018 |
| WO | 2018/199142 A1 | 11/2018 |
| WO | 2018/208836 A1 | 11/2018 |
| WO | 2020/061371 A2 | 3/2020 |

OTHER PUBLICATIONS

English Machine translation of WO2013187416 (Year: 2013).*
Zhou et al., hGFAP-cre Transgenic Mice for Manipulation of Glial and Neuronal Function In Vivo. Genesis 31:85-94 (2001) (Year: 2001).*
Fukusumi et al., "Establishment of Human Neural Progenitor Cells from Human Induced Pluripotent Stem Cells with Diverse Tissue Origins," Stem Cells International, vol. 2016, Article ID 723575 (2016).

(Continued)

*Primary Examiner* — James D Schultz
*Assistant Examiner* — Nicholas A Humphries
(74) *Attorney, Agent, or Firm* — Morgan, Lewis & Bockius LLP

(57) ABSTRACT

The method for producing a cell aggregate including glial progenitor cells according to the present invention comprises:
(1) a step of subjecting pluripotent stem cells to suspension culture in an embryoid-body-forming culture medium containing one or more SMAD signaling inhibitors and one or more Wnt signaling activators in the absence of feeder cells for 5 days to 10 days, to form a cell aggregate;
(2) a step of subjecting the cell aggregate obtained in (1) to suspension culture in an embryoid-body-forming culture medium containing retinoic acid;
(3) a step of subjecting the cell aggregate obtained in (2) to suspension culture in an embryoid-body-forming culture medium or neuron-and-glia-proliferating culture medium containing retinoic acid and one or more SHH signaling activators; and
(4) a step of subjecting the cell aggregate obtained in (3) to suspension culture in a neuron-and-glia-proliferating culture medium containing no retinoic acid and one or more SHH signaling activators.

27 Claims, 34 Drawing Sheets
Specification includes a Sequence Listing.

(56) References Cited

OTHER PUBLICATIONS

Sugai et al., "Pathological classification of human iPSC-derived neural stem/progenitor cells towards safety assessment of transplantation therapy for CNS diseases," Molecular Brain, 9: 85 (2016).
Eiraku et al., "Self-Organized Formation of Polarized Cortical Tissues from ESCs and Its Active Manipulation by Extrinsic Signals," Cell Stem Cell, 3: 519-532 (2008).
Douvaras et al., "Generation and isolation of oligodendrocyte progenitor cells from human pluripotent stem cells," Nature Protocols, 10 (8): 1143-1154 (2015).
Kawabata et al., "Grafted Human iPS Cell-Derived Oligodendrocyte Precursor Cells Contribute to Robust Remyelination of Demyelinated Axons after Spinal Cord Injury," Stem Cell Reports, 6 (1-8) (2016).
Yasuda et al., "Significance of remyelination by neural stem/progenitor cells transplanted into the injured spinal cord", Stem Cells, 29: 1983-1994 (2011).
Nori et al., "Long-term safety issues of iPSC-based cell therapy in a spinal cord injury model: oncogenic transformation with epithelial-mesenchymal transition", Stem Cell Reports, 4 (3): 360-373 (2015).
Choi et al., "Human Astrocytes: Secretome Profiles of Cytokines and Chemokines," PLoS ONE, 9(4): e92325 (2014).
Jin et al., "Stem cell factor stimulates neurogenesis in vitro and in vivo," Journal of Clinical Investigation, 110 (3): 311-319 (2002).
Doeppner et al., "Acute Hepatocyte Growth Factor Treatment Induces Long-Term Neuroprotection and Stroke Recovery via Mechanisms Involving Neural Precursor Cell Proliferation and Differentiation," Journal of Cerebral Blood Flow & Metabolism, 31: 1251-1262 (2011).
Ohta et al., "Macrophage migration inhibitory factor (MIF) promotes cell survival and proliferation of neural stem/progenitor cells," Journal of Cell Science, 125 (13): 3210-3220 (2012).
Pons et al., "New Therapeutic Avenues of mCSF for Brain Diseases and Injuries," Frontiers in Cellular Neuroscience, 12: 499 (2018).
Stogsdill et al., "The interplay between neurons and glia in synapse development and plasticity," Current Opinion in Neurobiology, 42: 1-8 (2017).
Lindemann et al., "Interfering with TGFβ-induced Smad3 nuclear accumulation differentially affects TGFβ-dependent gene expression," Molecular Cancer, 2 (2003).
Furue et al., "Heparin promotes the growth of human embryonic stem cells in a defined serum-free medium," PNAS 105 (36): 13409-13414 (2008).
Li et al., "Specification of motoneurons from human embryonic stem cells," Nature Biotechnology, 23 (2): 215-221 (2005).
Stanton et al., "Small-molecule modulators of the Sonic Hedgehog signaling pathway," Molecular Biosystems, 6: 44-54 (2010).
Hayashi et al., "Single-cell full-length total RNA sequencing uncovers dynamics of recursive splicing and enhancer RNAs," Nature Communications, 9: 619 (2018).
Scheff et al., "Experimental modeling of spinal cord injury: characterization of a force-defined injury device," Journal of Neurotrauma, 20 (2): 179-193 (2003).
Basso et al., "Basso Mouse Scale for locomotion detects differences in recovery after spinal cord injury in five common mouse strains," Journal of Neurotrauma, 23 (5): 635-659 (2006).
Shibata et al., "Large-Area Fluorescence and Electron Microscopic Correlative Imaging With Multibeam Scanning Electron Microscopy," Frontiers in Neural Circuits, 13: 29 (2019).
Numasawa-Kuroiwa et al., "Involvement of ER stress in dysmyelination of Pelizaeus-Merzbacher disease with PLP1 missense mutations shown by iPSC-derived oligodendrocytes," Stem Cell Reports, 2: 648-661 (2014).
Matsumoto et al., "Mechanisms of neural stem cell fate specification," Farumashia, 39 (2): 108-112 (2003).
International Search Report issued in corresponding International Patent Application No. PCT/JP2020/033677 dated Nov. 10, 2020.
International Preliminary Report on Patentability issued in corresponding International Patent Application No. PCT/JP2020/033677 dated Mar. 17, 2022.
Griffin, "Engineering and Characterization of Human Stem Cell-Derived Multicellular Aggregates of Glial Cells," M.S. Thesis, 1-67, (Jan. 1, 2019).
Kamata et al.:, "A robust culture system to generate neural progenitors with gliogenic comptence from clinically relevant induced pluripotent stem cells for treatment of spinal cord injury," Stem Cells Translational Medicine, 10 (3): 398-413 (2021).
Extended European Search Report issued in corresponding European Patent Application No. 20861452.9 dated Jul. 24, 2023.
Kumamaru et al., "Generation and post-injury integration of human spinal cord neural stem cells", Nature Methods, vol. 15, 2018, 3 pages.
Liao et al., "Direct Conversion of Cord Blood CD34+ Cells Into Neural Stem Cells by Oct. 4", Stem Cells Translational Medicine, vol. 4, 2015, pp. 755-763.
Stover et al., "The Generation of Embryoid Bodies from Feeder-Based or Feeder-Free Human Pluripotent Stem Cell Cultures", Human Pluripotent Stem Cells: Methods and Protocols, Methods in Molecular Biology, vol. 767, 2011, pp. 391-398.
Hardison et al., "Transplantation of glial-committed progenitor cells into a viral model of multiple sclerosis induces remyelination in the absence of an attenuated inflammatory response", Experimental Neurology, vol. 197, 2006, pp. 420-429.

\* cited by examiner (A)

(B)

(A)

(B)

(A)

(B)

(A)

(B)

*Fig.*24
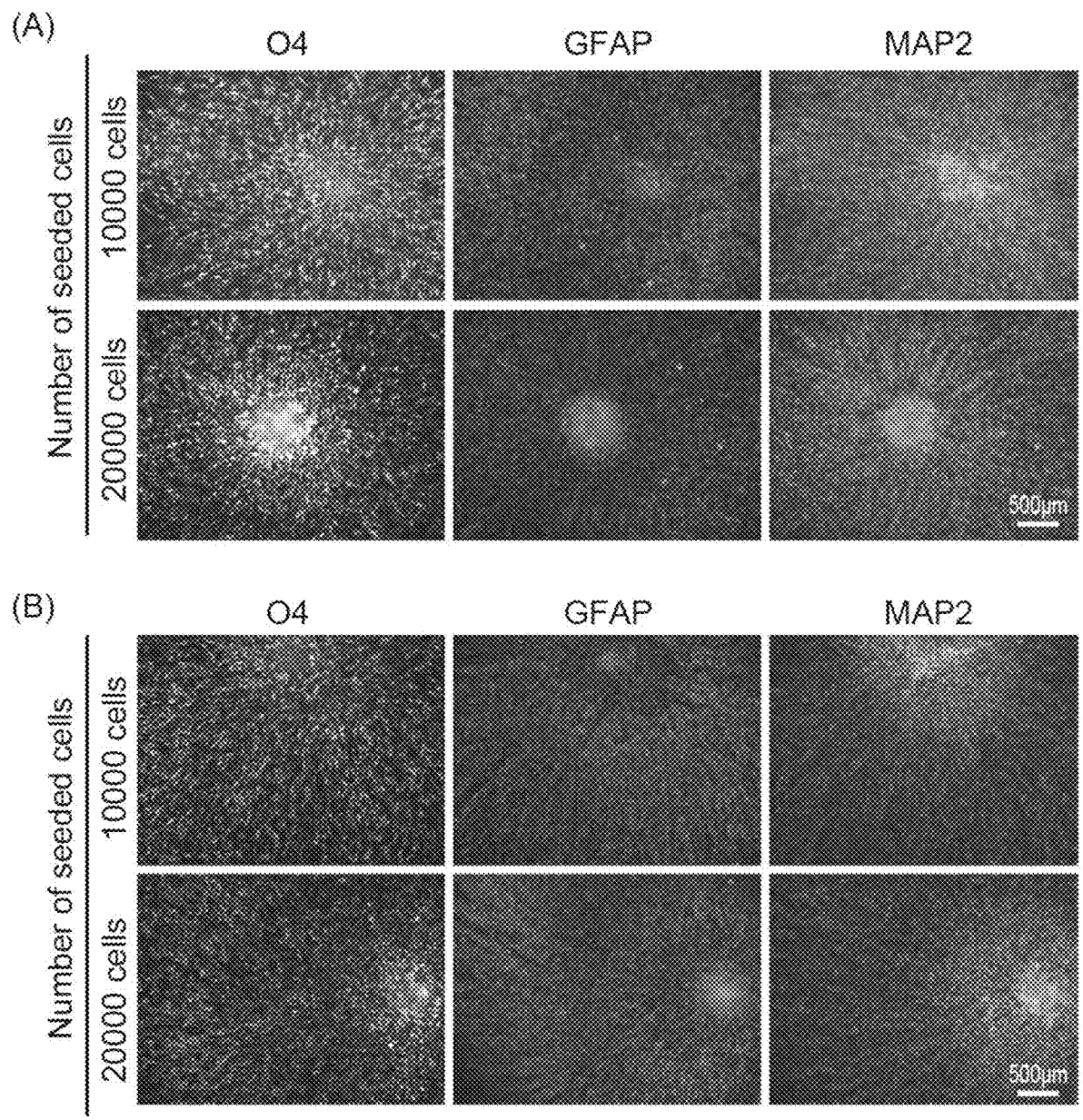

METHOD FOR PRODUCING CELL AGGREGATE INCLUDING GLIAL PROGENITOR CELLS

SEQUENCE LISTING SUBMISSION VIA EFS-WEB

A computer readable text file, entitled "SequenceListing.txt," created on Mar. 1, 2022 with a file size of 4,534 bytes contains the sequence listing for this application and is hereby incorporated by reference in its entirety.

TECHNICAL FIELD

The present invention relates to a cell aggregate including glial progenitor cells derived from pluripotent stem cells, a method for producing the cell aggregate, and so on.

BACKGROUND ART

Demyelinating diseases and diseases based on glial cell dysfunction, including spinal cord injury, rarely heals spontaneously, and mostly cause not only loss of glial cells forming myelin but also axonal degeneration and cell body degeneration, resulting in serious cases. In particular, spinal cord injury is a disease with significant unmet medical needs because rehabilitation effect is found only for some patients and there is no radical treatment method to regenerate lost nerve axons and glial cells. Cell supplement by transplantation is expected to be promising as a therapeutic strategy by neuroregeneration and remyelination.

Many research results for practical realization of treatment by transplanting neural progenitor cells have been reported, and methods of inducing differentiation of pluripotent stem cells into neural progenitor cells are known in recent years (e.g., Non Patent Literatures 1 and 2). In addition, a method of forming an embryoid body in a serum-free culture medium and subjecting the embryoid body to suspension culture is known as a method for culturing nervous system cells (e.g., Non Patent Literature 3).

Because spinal cord injury involves significant loss of myelin, it has been believed that transplanting cells including many glial cells, especially, including many oligodendrocytes is important for treatment of spinal cord injury (Non Patent Literatures 4, 6, and 7); however, what cell type and what quantity thereof to be contained for exhibition of therapeutic effect have not been clarified.

For implementation of the cell transplantation, the absence of residual undifferentiated pluripotent stem cells is essential for preventing cells after transplantation from forming tumor, and it is desired for avoidance of contamination with an infectious factor that no xenogeneic-cell-derived component be contained. However, previously reported cell aggregates including oligodendrocyte progenitor cells (Non Patent Literatures 4 and 5, and Patent Literature 1) are produced in the presence of feeder cells such as mouse cells, and hence feeder cells or a xenogeneic-cell-derived component derived from feeder cells are/is possibly included or contained therein. Accordingly, it is needed to establish a production method that does not allow xenogeneic-cell-derived components to be contained, thus being more suitable for clinical applications.

CITATION LIST

Patent Literature

Patent Literature 1: Japanese Unexamined Patent Publication No. 2017-524340

Non Patent Literature

Non Patent Literature 1: Fukusumi H et al., Stem Cells International, Volume 2016, Article ID 7235757 (2016)
Non Patent Literature 2: Sugai K et al., Molecular Brain, 9:85 (2016)
Non Patent Literature 3: Eiraku M et al., Cell Stem Cell 3, 519-532 (2008)
Non Patent Literature 4: Douvaras P et al., Nature Protocols 10, 1143-1154 (2015)
Non Patent Literature 5: Numasawa-Kuroiwa Y et al., Stem Cell Reports, 2: 648-661 (2014)
Non Patent Literature 6: Kawabata S et al., Stem Cell Reports, 6: 1-8 (2016)
Non Patent Literature 7: Yasuda A et al., Stem Cells 29, 1983-1994. (2011)
Non Patent Literature 8: Non et al., Stem Cell Reports, 4: 360-73. (2015)
Non Patent Literature 9: Choi S S et al., PLoS ONE 9(4) (2014): e92325
Non Patent Literature 10: Kunlin Jin et al., J Clin Invest. 2002; 110(3): 311-319
Non Patent Literature 11: Thorsten R Doeppner et al., J Cereb Blood Flow Metab 2011; 31: 1251-1262
Non Patent Literature 12: Shigeki Ohta et al., Journal of Cell Science 2012 125: 3210-3220
Non Patent Literature 13: Vincent Pons et al., Front. Cell. Neurosci. 2018 12: 499
Non Patent Literature 14: Jeff A Stogsdill et al., Current Opinion in Neurobiology 2017, 42: 1-8

SUMMARY OF INVENTION

Technical Problem

An object of the present invention is to provide a cell aggregate having a high content of glial progenitor cells without containing any xenogeneic-cell-derived component, thus being useful for regenerative therapy, and to provide a method for producing a cell aggregate including glial progenitor cells without any possibility of contamination with a xenogeneic-cell-derived component.

Solution to Problem

Focusing on the lowering of myelin-neural cells-astrocytes interaction in foci, the present inventors considered it important that oligodendrocyte progenitor cells, neural progenitor cells, and astrocyte progenitor cells are all included in cells to be used for transplantation, and examined for a method for induction of differentiation that is able to induce iPS cells to differentiate into such a cell aggregate and more suitable for clinical applications.

First, the present inventors examined on the method described in Non Patent Literature 5, a conventional method for induction of differentiation. In the method described in Non Patent Literature 5, iPS cells are subjected to maintenance culture on mouse cells as feeder cells. It follows that iPS cells are induced to differentiate by using a culture medium containing xenogeneic-cell-derived components, and hence the resulting cell aggregates including oligodendrocyte progenitor cells may contain a xenogeneic-cell-derived component. For clinical applications, however, it has been desired to eliminate xenogeneic-cell-derived components as much as possible. In view of this, the present inventors diligently examined to develop a method for inducing differentiation of iPS cells independent of feeder cells, namely, feeder-free iPS cells into a cell aggregate including oligodendrocyte progenitor cells by using a culture medium containing no xenogeneic-cell-derived component.

The present inventors attempted induction of differentiation by using feeder-free iPS cells cultured in the absence of feeder cells in a maintenance culture medium containing no xenogeneic-cell-derived component with reference to the method described in Non Patent Literature 5. The result revealed that some cell lines of iPS cells are not able to form an embryoid body (hereinafter, occasionally abbreviated as "EB") and ultimately induced to a cell aggregate lacking differentiation potential into oligodendrocytes with high possibility, suggesting that the method for induction of differentiation is unstable.

In view of this, examination was made for a method for forming an EB, and the result showed that an EB can be stably formed with changing the culture method to a serum-free aggregation/suspension culture method (Serum-Free Embryonic Body quick; hereinafter, occasionally abbreviated as "SFEBq method") and employing a specific combination of a culture medium and a differentiation inducer during induction of differentiation, and a cell aggregate including glial progenitor cells (neurosphere) having differentiation potential into oligodendrocytes was successfully obtained. In addition, it was found that the cell aggregate exhibits therapeutic effect when being transplanted into a dysfunction model animal. That is, the present inventors succeeded for the first time in establishing a production method that allows production of huge amounts of cell aggregates including glial progenitor cells without containing any xenogeneic-cell-derived component.

Specifically, the present invention relates to the followings.

[1] A method for producing a cell aggregate including glial progenitor cells, comprising:
(1) a step of subjecting pluripotent stem cells to suspension culture in an embryoid-body-forming culture medium containing one or more SMAD signaling inhibitors and one or more Wnt signaling activators in the absence of feeder cells for 5 days to 10 days, to form a cell aggregate;
(2) a step of subjecting the cell aggregate obtained in (1) to suspension culture in an embryoid-body-forming culture medium containing retinoic acid;
(3) a step of subjecting the cell aggregate obtained in (2) to suspension culture in an embryoid-body-forming culture medium or neuron-and-glia-proliferating culture medium containing retinoic acid and one or more SHH signaling activators; and
(4) a step of subjecting the cell aggregate obtained in (3) to suspension culture in a neuron-and-glia-proliferating culture medium containing no retinoic acid and one or more SHH signaling activators, and optionally further comprising:

(5) a step of subjecting the cell aggregate obtained in (4) to suspension culture in a neuron-and-glia-proliferating culture medium containing neither retinoic acid nor an SHH signaling activator.
[2] The production method according to [1], wherein, in step (1), pluripotent stem cells are cultured by using a culture vessel having a plurality of pores uniform in shape.
[3] The production method according to [1] or [2], wherein, in step (1), step (1) is sustained until a cell aggregate satisfying at least one of the following conditions:
1) having an RNA expression level of at least one of SOX1, PAX6, HES4, and HES5 increased by 100 times or more;
2) having an RNA expression level of OCT3/4 decreased by 200 times or more; and
3) having an RNA expression level of NANOG decreased by 400 times or more,
as compared with the cell aggregate at initiation of step (1), is obtained, and step (2) is then initiated.
[4] The production method according to any of [1] to [3], wherein, in step (2), step (2) is sustained until a cell aggregate satisfying at least one of the following conditions:
1) having an RNA expression level of at least one of ASCL1, DCX, HEY1, ZBTB20, βIII tubulin, ELAVL3, and SLIT1 increased by 5 times or more; and
2) having an RNA expression level of at least one of HOXB3, HOXA4, HOXB4, HOXB6, and HOXB8 increased by 5 times or more, as compared with the cell aggregate at initiation of step (2), is obtained, and step (3) is then initiated.
[5] The production method according to any one of [1] to [4], wherein step (2) is performed for 4 days to 11 days.
[6] The production method according to any one of [1] to [5], wherein an oxygen concentration is 3% to 10% in steps (1) and (2).
[7] The production method according to any one of [1] to [6], wherein, in step (3), step (3) is sustained until a cell aggregate satisfying at least one of the following conditions:
1) having an RNA expression level of at least one of HEY2, NKX6.2, and NKX2.2 increased by 5 times or more; and
2) having an RNA expression level of OLIG1 and/or OLIG2 increased by 10 times or more,
as compared with the cell aggregate at initiation of step (3), is obtained, and step (4) is then initiated.
[8] The production method according to any of [1] to [7], wherein step (3) is performed for 4 days to 11 days.
[9] The production method according to any of [1] to [8], wherein, in step (4), step (4) is sustained until a cell aggregate satisfying at least one of the following conditions:
1) having an RNA expression level of at least one of NFIA, NFIB, SLC1A3, S100B, and FABP7 increased by 10 times or more; and
2) having an RNA expression level of PAX6 decreased by 5 times or more, as compared with the cell aggregate at initiation of step (4), is obtained, and step (5) is then initiated.
[10] The production method according to any one of [1] to [9], wherein step (4) is performed for 4 days or more.
[11] The production method according to any one of [1] to [10], wherein, in step (4), the cell aggregate obtained in step (3) is dispersed at initiation of step (4), and the dispersed cells are then subjected to suspension culture, to form a cell aggregate again.

[12] The production method according to any one of [1] to [11], comprising step (5), wherein, in step (5), the cell aggregate obtained in step (4) is dispersed at initiation of step (5), and the dispersed cells are then subjected to suspension culture for 5 days to 100 days, to form a cell aggregate again.

[13] The production method according to any one of [1] to [12], comprising step (5), wherein, in step (5), step (5) is sustained until one or more markers selected from an O4 antigen, NG2, OLIG2, PDGFRα, SOX10, SPON1, FAM181B, TIMP4, SOX6, GRIK3, LHFPL3, KLF9, an A2B5 antigen, CNP, and PLP are expressed.

[14] The production method according to any one of [1] to [12], comprising step (5), wherein, in step (5), step (5) is sustained until one or more proteins selected from the group consisting of SPARCL1, MIF, MCP-1, IL-8, SCF, M-CSF, HGF, GRO-α, LIF, IFN-γ, and TRAIL are detected in the medium for culture of the cell aggregate.

[15] The production method according to any one of [1] to [14], wherein the SMAD signaling inhibitors are two of a TGFβ inhibitor and a BMP inhibitor.

[16] The production method according to [15], wherein the TGFβ inhibitor is one or more selected from the group consisting of SB431542, A83-01, SB202190, SB505124, NPC30345, SD093, SD908, SD208, LY2109761, LY364947, LY580276, Galunisertib (LY2157299), LY3200882, SB525334, GW788388, RepSox, and Lefty-1.

[17] The production method according to [15] or [16], wherein the BMP inhibitor is one or more selected from the group consisting of Noggin, LDN-193189, LDN-212854, Dorsomorphin, K02288, Chordin, and Follistatin.

[18] The production method according to any one of [1] to [17], wherein the Wnt signaling activators are one or more selected from the group consisting of a GSK3β inhibitor, Wnt3a, a Wnt agonist, Dkk, and R-Spondin.

[19] The production method according to any one of [1] to [18], wherein the Wnt signaling activators are one or more selected from the group consisting of CHIR99021, BIO, Kenpaullone, SB216763, and L803-mts.

[20] The production method according to any one of [1] to [19], wherein the SHH signaling activators are one or more selected from the group consisting of Purmorphamine, SAG, SHH protein, and an SHH fragment.

[21] The production method according to any one of [1] to [20], wherein the pluripotent stem cells are induced pluripotent stem cells.

[22] The production method according to any one of [1] to [20], wherein the pluripotent stem cells are human induced pluripotent stem cells.

[23] The production method according to any one of [1] to [22], wherein the cell aggregate including glial progenitor cells has the following characteristics:
(a) including oligodendrocyte progenitor cells, astrocyte progenitor cells, and neural progenitor cells;
(b) expressing a spinal region marker; and
(c) including no feeder cell and containing no component derived from feeder cells.

[24] A method for producing a cell population including oligodendrocytes, astrocytes, and neural cells, comprising a step of culturing a cell aggregate including glial progenitor cells with use of a maturation culture medium for 5 days to 60 days, wherein the cell aggregate is produced by the production method according to any one of [1] to [23].

[25] The production method according to [24], wherein the cell population including oligodendrocytes, astrocytes, and neural cells includes:
(i) cells expressing one or more markers selected from the group consisting of an O4 antigen, GalC, MBP, APC, GST π, CNP, PLP, OLIG2, SOX10, PDGFRα, and NG2;
(ii) cells expressing one or more markers selected from the group consisting of βIII tubulin, MAP2, and ELAVL3; and
(iii) cells expressing one or more markers selected from the group consisting of SLC1A3, S100B, AQP4, GFAP, and NG2.

[26] The production method according to [24] or [25], wherein the maturation culture medium is a culture medium containing at least one of T3, NT-3, and LIF.

[27] The production method according to [26], wherein the maturation culture medium further contains CNTF.

[28] A cell aggregate comprising glial progenitor cells, obtained by the production method according to any one of [1] to [23].

[29] A cell aggregate comprising progenitor cells of glial cells, wherein the cell aggregate has the following characteristics:
(a) including oligodendrocyte progenitor cells, astrocyte progenitor cells, and neural progenitor cells;
(b) including cells expressing a spinal region marker;
(c) including no feeder cell and containing no component derived from feeder cells; and
(d) having an ability to differentiate into a cell population including oligodendrocytes, astrocytes, and neural cells.

[30] The cell aggregate according to [29], wherein the spinal region marker is one or more markers selected from the group consisting of HOXB3, HOXB4, HOXB6, and HOXD8.

[31] The cell aggregate according to [29] or [30], further comprising cells expressing one or more markers selected from the group consisting of NKX2.1, NKX2.2, NKX6.1, and NKX6.2.

[32] The cell aggregate according to any one of [29] to [31], having the following characteristics:
(I) including cells expressing one or more markers selected from the group consisting of NFIA, NFIB, SOX9, HEY1, HEY2, ZBTB20, SLC1A3, S100B, MLC1, SLIT1, TIMP3, SPARCL1, GFAP, and AQP4;
(II) including cells expressing one or more markers selected from the group consisting of OLIG2, PDGFRα, SOX10, SPON1, FAM181B, TIMP4, SOX6, GRIK3, LHFPL3, KLF9, an A2B5 antigen, CNP, and PLP;
(III) including cells expressing one or more markers selected from the group consisting of DCX, βIII tubulin, MAP2, ELAVL3, NTRK2, GRIA2, PTPRO, and EPHA3;
(IV) including cells expressing one or more markers selected from the group consisting of SOX1, SOX2, NESTIN, MEIS1, MEIS2, DLL3, and ASCL1; and
(V) having an ability to differentiate into a cell population including (i) cells expressing one or more markers selected from the group consisting of an O4 antigen, GalC, MBP, APC, GSTπ, CNP, PLP, OLIG2, SOX10, PDGFRα, and NG2, (ii) cells expressing one or more markers selected from the group consisting of βIII tubulin, MAP2, and ELAVL3, and (iii) cells expressing one or more markers selected from the group consisting of SLC1A3, S100B, AQP4, GFAP, and NG2.

[33] The cell aggregate according to any one of [29] to [32], further (VI) comprising cells expressing one or more markers selected from the group consisting of C1ORF61 and SERPINE2.

[34] The cell aggregate according to any one of [29] to [33], further comprising cells expressing or secreting one or more markers selected from the group consisting of SPARCL1, MIF, MCP-1, IL-8, SCF, M-CSF, HGF, GRO-α, LIF, IFN-γ, and TRAIL.

[35] A cell population comprising oligodendrocytes, astrocytes, and neural cells, obtained by the production method according to any one of [24] to [27].

[36] A pharmaceutical composition comprising the cell aggregate according to any one of [28] to [34] or the cell population according to [35], as an active ingredient.

[37] A method for treating a demyelinating disease or disease based on or involving glial cell dysfunction, comprising transplanting an effective amount of the cell aggregate according to any one of [28] to [34] or the cell population according to [35] into a subject in need of transplantation.

[38] The production method according to [37], wherein the demyelinating disease or disease based on or involving glial cell dysfunction is acute-phase, subacute-phase, or chronic-phase spinal cord injury.

[39] The cell aggregate according to any one of [28] to [34] or the cell population according to claim 35, for use in treating a demyelinating disease or disease based on or involving glial cell dysfunction.

[40] The cell aggregate or cell population according to [39], wherein the demyelinating disease or disease based on or involving glial cell dysfunction is acute-phase, subacute-phase, or chronic-phase spinal cord injury.

[41] A method for evaluating a toxicity or drug efficacy of a test substance, comprising contacting the test substance with the cell aggregate according to any one of [28] to [34] or the cell population according to [35] and detecting or quantifying an influence of the test substance on the cell aggregate or the cell population.

[42] A method for determining whether a cell aggregate including glial progenitor cells is suitable for transplantation on the basis of, as an indicator, the presence or absence of expression of one or more markers selected from the group consisting of C1ORF61 and SERPINE2.

[43] A method for identifying glial progenitor cells, or neural stem cells having high preference of differentiation into glia, comprising detecting one or more genes selected from the group consisting of C1ORF61 and SERPINE2, a protein encoded by any of the genes, or a fragment of any of the genes and protein.

Advantageous Effects of Invention

With the method of the present invention for producing a cell aggregate including glial progenitor cells, a cell aggregate including glial progenitor cells, including no feeder cell and containing no xenogeneic-cell-derived component derived from feeder cells, can be produced. Through additional culture of the cell aggregate including glial progenitor cells, a cell population including oligodendrocytes, astrocytes, and neural cells can be produced. The cell aggregate or cell population obtained by the production method of the present invention is useful as a transplantation material for cell therapy.

BRIEF DESCRIPTION OF DRAWINGS

FIG. 24 shows fluorescence microscopy images of cell aggregates including glial progenitor cells subjected to immunofluorescence staining using an O4 antibody, an anti-GFAP antibody, or a Tuj1 antibody 28 days after terminal differentiation in Example 17. (A) shows a cell aggregate for which terminal differentiation was initiated after 8-day culture; and (B) shows a cell aggregate for which terminal differentiation was initiated after 14-day culture.

DESCRIPTION OF EMBODIMENTS

Definitions

Figure 1A:
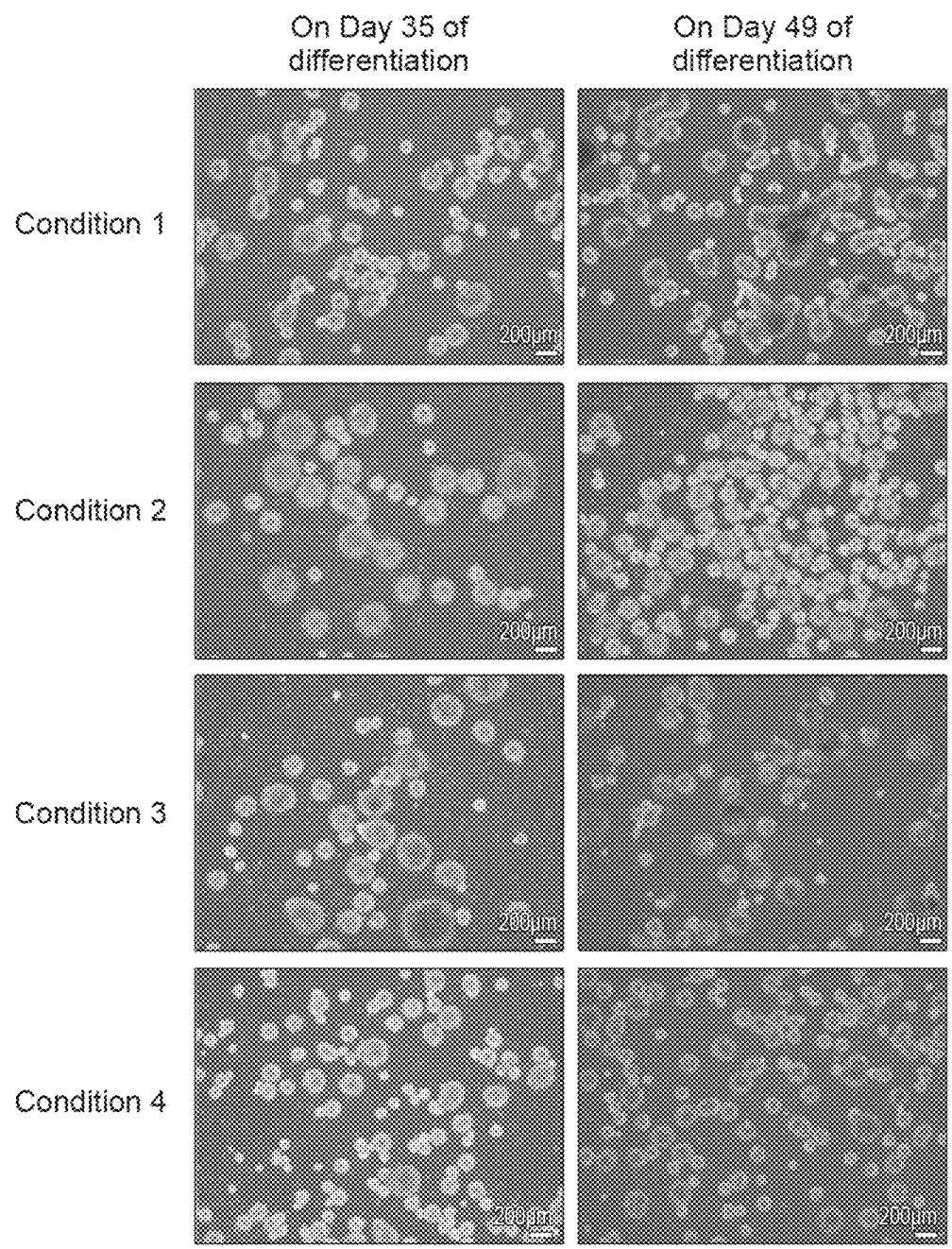
FIG. 1A shows images showing bright field images of cell aggregates including glial progenitor cells on day 35 and 49 of differentiation in Example 1.

Herein, the term "stem cell" refers to an undifferentiated cell having differentiation potential and proliferative capacity (in particular, replication competence) retaining differentiation potential. Stem cells include subpopulations with different differentiation abilities, such as pluripotent stem cells, multipotent stem cells, and unipotent stem cells.

A pluripotent stem cell is a stem cell that can be cultured in vitro and has an ability to differentiate into all cell lineages belonging to triploblastic (ectodermal, mesodermal, endodermal) and/or extraembryonic tissues (pluripotency in terms of differentiation). The term multipotent stem cell refers to a stem cell having an ability to differentiate into multiple types, but not all types, of tissues or cells. The term unipotent stem cell refers to a stem cell having an ability to differentiate into a specific tissue or cell.

Pluripotent stem cells can be induced from fertilized ova, cloned embryos, germline stem cells, stem cells in tissue, somatic cells, and so on. Examples of pluripotent stem cells include embryonic stem cells (ES cells), EG cells (embryonic germ cells), and induced pluripotent stem cells (iPS cells). Muse cells (multi-lineage differentiating stress enduring cells), which are obtained from mesenchymal stem cells (MSC), and GS cells prepared from germ cells (e.g., testis) are also included in pluripotent stem cells.

Human embryonic stem cells, which were established in 1998, are increasingly used even for regenerative medicine. Embryonic stem cells can be produced by culturing an inner cell mass in the blastocyst stage on feeder cells or in a culture medium containing FGF2. Methods for producing embryonic stem cells are described, for example, in WO96/22362, WO02/101057, U.S. Pat. Nos. 5,843,780, 6,200,806, and 6,280,718. Embryonic stem cells are available from specific institutions, and commercially available products thereof can be purchased. For example, KhES-1, KhES-2, and KhES-3, which are human embryonic stem cells, are available from Institute for Frontier Life and Medical Sciences, Kyoto University. A Crx::Venus strain (derived from KhES-1), which is a human embryonic stem cell, is available from RIKEN, Japan.

Herein, an "induced pluripotent stem cell" is a cell obtained by inducing pluripotency for a somatic cell through reprogramming, for example, with a known method.

Induced pluripotent stem cells were established with mouse cells by Yamanaka et al. in 2006 (Cell, 2006, 126(4), pp. 663-676). Induced pluripotent stem cells were established also with human fibroblasts in 2007, and have pluripotency and replication competence like embryonic stem cells (Cell, 2007, 131(5), pp. 861-872; Science, 2007, 318(5858), pp. 1917-1920; Nat. Biotechnol., 2008, 26(1), pp. 101-106).

Specific examples of induced pluripotent stem cells include cells obtained by inducing pluripotency for differentiated somatic cells such as fibroblasts and peripheral blood mononuclear cells through reprogramming by expression of any combination of a plurality of genes selected from a group of reprogramming genes including OCT3/4, SOX2, KLF4, MYC (c-MYC, N-MYC, L-MYC), GLIS1, NANOG, SALL4, LIN28, and ESRRB. Examples of preferred combinations of reprogramming factors include (1) OCT3/4, SOX2, KLF4, and MYC (c-MYC or L-MYC) and (2) OCT3/4, SOX2, KLF4, LIN28, and L-MYC (Stem Cells, 2013; 31:458-466).

In addition to the method of producing induced pluripotent stem cells through direct reprogramming by gene expression, induced pluripotent stem cells can be induced from somatic cells, for example, by addition of a compound (Science, 2013, 341, pp. 651-654).

In addition, established induced pluripotent stem cells can be obtained, and, for example, human induced pluripotent cell lines established by Kyoto University, such as 201B7 cells, 201B7-Ff cells, 253G1 cells, 253G4 cells, 1201C1 cells, 1205D1 cells, 1210B2 cells, and 1231A3 cells, are available from Kyoto University and iPS Academia Japan, Inc. For example, QHJI01s04 cells established by Kyoto University are available as established induced pluripotent stem cells from Kyoto University.

Herein, pluripotent stem cells are preferably embryonic stem cells or induced pluripotent stem cells, and more preferably induced pluripotent stem cells.

Herein, pluripotent stem cells are mammalian pluripotent stem cells, preferably rodent (e.g., mouse, rat) or primate (e.g., human, simian) pluripotent stem cells, more preferably human pluripotent stem cells, and even more preferably human induced pluripotent stem cells (iPS cells) or human embryonic stem cells (ES cells).

Pluripotent stem cells such as human iPS cells can be subjected to maintenance culture and expansion culture with methods well known to those skilled in the art.

Herein, "glia", also called "glial cells" or "neuroglial cells", is a collective term for cells that constitute the nervous system and are not neural cells, and estimated to be present in an abundance 10 times or more that of neural cells by cell count in the human brain. Examples of glial cells include astrocytes and oligodendrocytes, and these are present around neural cells in nerve tissue and take on various functions.

Herein, the term "marker" refers to a substance that is present in a cell and allows identification or determination of the type or character or the like of the cell on the basis of the presence or abundance of the substance. Specific examples of markers include mRNA, proteins encoded by such mRNA, and sugar chains, and fragments of them.

Herein, the term "differentiation marker" refers to a marker for detection of the degree (level) of differentiation of a cell in a specific differentiation stage.

Herein, the term "glial progenitor cell" refers to a cell having an ability to differentiate into a glial cell, and examples of glial progenitor cells include astrocyte progenitor cells and oligodendrocyte progenitor cells.

Herein, "oligodendrocytes" are a kind of glial cells present in the central nervous system, and present in such a way as to wrap around the axon of a neuron (neural cell), and play a role in increasing signaling speed between neural cells by forming myelin (myelin sheath).

Oligodendrocytes can be identified with a marker that is specifically expressed on oligodendrocytes, and PLP, GalC, APC, MBP, MAG, MOG, GST-π, SOX10, an O4 (capital O+4) antigen, NG2 (CSPG4), CNP, and so on are known as such markers, and a cell expressing at least one of the above mRNA, sugar chains, or proteins can be determined as an oligodendrocyte through analysis, for example, using a gene amplification method, in situ hybridization, an immunohistological technique, or flow cytometry analysis. If NG2 of the above markers, which is found to be expressed also on astrocytes, is used as an indicator, it is desirable to perform identification with use of another marker in combination.

Herein, the term "oligodendrocyte progenitor cell" refers to a cell having an ability to differentiate into an oligodendrocyte. The presence of an oligodendrocyte progenitor cell can be specified with a marker the expression of which is significantly found on oligodendrocyte progenitor cells. For example, PDGFRα and OLIG2 are known as markers of oligodendrocyte progenitor cells, and a cell expressing at least one marker of the above mRNA or proteins can be determined as an oligodendrocyte progenitor cell through analysis, for example, using a gene amplification method, in situ hybridization, or an immunohistological staining method. It should be noted that immature oligodendrocytes not forming myelin are also included in oligodendrocyte progenitor cells.

Herein, "astrocytes" are a kind of glial cells present in the central nervous system, and believed to have a function to structurally support neurons and contribute to activation of neurotransmission by regulating neurotransmitters, energy, and extracellular ion concentrations. In addition, astrocytes are believed to supply a substance that promotes myelin formation to oligodendrocytes described above, and thus are cells taking on important functions together with neurons and oligodendrocytes in nerve tissue. An astrocyte can be identified with a marker that is specifically expressed on astrocytes, and GFAP, S100B, AQP4, NG2, SLC1A3 (also referred to as GLAST or EAAT1), and so on are known as such markers, and a cell expressing at least one of the above mRNA, sugar chains, or proteins can be determined as an astrocyte through analysis, for example, using an immunohistological technique. If NG2 of the above markers, which is found to be expressed also on oligodendrocytes, is used as an indicator, it is desirable to perform identification with use of another marker in combination.

Herein, the term "astrocyte progenitor cell" refers to a cell having an ability to differentiate into an astrocyte. The presence of an astrocyte progenitor cell can be specified with a marker the expression of which is significantly found on astrocyte progenitor cells. Examples of markers of astrocyte progenitor cells include NFIA, NFIB, SOX9, HEY1, HEY2, FABP7, and ZBTB20.

In the process of differentiation of a pluripotent stem cell into an oligodendrocyte, the pluripotent stem cell differentiates in order: first into a neural stem cell, further into an oligodendrocyte progenitor cell, and then into an oligodendrocyte. A neural stem cell has multipotency and is able to differentiate into any of a neural progenitor cell, an astrocyte progenitor cell, and an oligodendrocyte progenitor cell; however, if a neural stem cell is allowed to differentiate into an oligodendrocyte progenitor cell, the neural stem cell is destined to differentiate into an oligodendrocyte. A neural stem cell is destined to differentiate into a neural cell if the neural stem cell is allowed to differentiate into a neural progenitor cell, and destined to differentiate into an astrocyte if the neural stem cell is allowed to differentiate into an astrocyte progenitor cell.

Here, being destined to differentiate into an astrocyte can be confirmed by the presence or absence of expression of at least one of the following one or more markers: NFIA, NFIB, SOX9, HEY1, HEY2, ZBTB20, SLC1A3, and S100B, preferably by the presence or absence of expression of at least one of SOX9, HEY1, HEY2, ZBTB20, SLC1A3, and S100B. Here, S100B is also referred to as S1003.

Herein, a neural cell is a neural unit composed of a cell body, a dendrite, and an axon, and is also called a neuron. Neural cells can be identified with a marker that is significantly expressed, and examples of the marker include βIII tubulin, MAP2, and ELAVL3.

The term neural cell refers to a cell having a function to transmit stimuli from another neural cell or a stimulus receptor cell to still another neural cell or a muscle or glandular cell. Neural cells are classified by the difference in neurotransmitter that neural cells produce into serotonergic neurons and motoneurons; however, limitation is not set on the type of neurotransmitter.

Herein, a "neural progenitor cell" is a cell having differentiation potential into a neural cell and destined to differentiate into a neural cell, and can be identified, for example, with neural cell adhesion molecules (NCAM), polysialylated NCAM, or a neuronal marker (e.g., DCX, βIII tubulin).

Herein, a "neural stem cell" is a cell having differentiation potential into a neural progenitor cell and differentiation potential into a glial progenitor cell, including astrocyte progenitor cells and oligodendrocyte progenitor cells, in combination, and can be identified, for example, with intermediate filament protein (e.g., nestin, vimentin), a primitive neuroectoderm such as the transcription factors SOX1 and PAX6, or a marker of neural stem cells.

Herein, the term "spinal region marker" refers to a marker that is expressed in association with differentiation into the spinal cord in the stage of development, and specific examples thereof include genes of HOXB3, HOXB4, HOXB6, and HOXD8 and proteins that the genes encode.

Herein, the term "ventral region marker" refers to a marker that is expressed in association with differentiation into the ventral part in the stage of development, and specific examples thereof include genes of NKX2.1, NKX2.2, NKX6.1, and NKX6.2 and proteins that the genes encode.

Herein, each "cell aggregate" is not limited as long as the cell aggregate is one in which a plurality of cells is adhering to each other to form a three-dimensional structure, and is, for example, a mass formed in such a manner that cells that have been dispersed in a medium such as a culture medium assemble together, or a mass of cells formed through cell division. Cell aggregates forming a particular tissue are also included in the definition. Embryoid bodies are also included in the definition of a cell aggregate. Herein, a "cell population" may be a cell aggregate (spheroidal cell population), or a layered cell population.

Herein, each "culture medium" is not limited and may be any culture medium commonly used for animal cell culture, as long as the culture medium can maintain the lives of animal cells, but is preferably a culture medium that provides an environment that allows target cells to proliferate. Each culture medium may be prepared in-house, and commercially available culture media may be purchased for use. Herein, the "embryoid-body-forming culture medium", "neuron-and-glia-proliferating culture medium", and "maturation culture medium" each contains the above culture medium as a minimal essential medium, and each can be prepared by adding factors or the like according to the corresponding purpose.

It is preferable from the viewpoint of using for producing a cell aggregate suitable for transplantation that each culture medium to be used in the present invention be a serum-free culture medium. The term "serum-free culture medium" in the present invention refers to a culture medium containing no raw or unpurified serum. Herein, even a culture medium contaminated with a purified component derived from blood or a component derived from animal tissue (e.g., a growth factor) is included in the definition of a serum-free medium, as long as the culture medium contains no raw or unpurified serum. The serum-free culture medium may contain, as appropriate, a fatty acid or lipid, an amino acid (e.g., a non-essential amino acid), a vitamin, a growth factor, a cytokine, an antioxidant, 2-mercaptoethanol, pyruvic acid, a buffer, an inorganic salt, and so on.

A serum substitute may be contained in each culture medium to be used in the present invention. Examples of the serum substitute include a serum substitute appropriately containing albumin, transferrin, a fatty acid, a collagen precursor, a trace element, 2-mercaptoethanol, or 3'-thiol glycerol, or an equivalent of any of them. Such a serum substitute can be prepared, for example, with a method described in WO98/30679. Commercially available products of serum substitutes may be used. Examples of such commercially available serum substitutes include Knockout Serum Replacement (manufactured by Thermo Fisher Scientific Inc.; hereinafter, occasionally written as KSR), "StemSure® Serum Replacement (SSR)" Chemically-defined Lipid concentrated (manufactured by Thermo Fisher Scientific Inc.), B27 supplement (manufactured by Thermo Fisher Scientific Inc.), N2 supplement (manufactured by Thermo Fisher Scientific Inc.), and ITS supplement (manufactured by Thermo Fisher Scientific Inc.), and preferred examples thereof include B27 supplement.

Each culture medium to be used in the present invention is preferably a xeno-free culture medium. Here, the term "xeno-free" refers to conditions in which components derived from a biological species differing from the biological species of cells to be cultured (xenogeneic components, also referred to as xenogeneic factors) are excluded. Some of the serum-free culture media may be xeno-free culture media.

Herein, feeder cells are cells that are allowed to coexist in culturing stem cells such as pluripotent stem cells and are different from the stem cells. Examples of feeder cells include mouse fibroblasts (e.g., MEF), human fibroblasts, SNL cells, and STO cells. The feeder cells may be feeder cells subjected to growth inhibition treatment. Examples of the growth inhibition treatment include treatment with a growth inhibitor (e.g., mitomycin C) and treatment with gamma-ray irradiation or UV irradiation.

Herein, components derived from feeder cells refer to components that are not contained in the stem cells and contained in feeder cells or secreted by feeder cells.

Herein, the term "xenogeneic cell" refers to a cell derived from a biological species differing from the biological species of cells to be cultured, and is used as being synonymous with the term "xenogeneic animal cell". The term "xenogeneic-cell-derived component" refers to a component that is derived from the xenogeneic cells and not contained in cells to be cultured.

In the case that feeder cells are derived from a biological species differing from that of cells to be cultured, the term xenogeneic-cell-derived component derived from feeder cells refers to a component that is derived from the feeder cells and not contained in cells to be cultured. Specific examples of such components include protein components differing at least in the nucleotide sequence or the amino acid sequence, saccharides, and lipids.

In the present invention, the term "suspension culture" refers to allowing cells to survive in a state of being suspended in a culture medium. Herein, cells in a state of single cells or an assembled mass of a plurality of cells (a cell aggregate or a cell population) is subjected to suspension culture. Cells subjected to suspension culture proliferate and/or differentiate.

[Method for Producing Cell Aggregate Including Glial Progenitor Cells]

Examples of a mode of the method of the present invention for producing a cell aggregate including glial progenitor cells include a method for producing a cell aggregate including glial progenitor cells, comprising:

(1) a step of subjecting pluripotent stem cells to suspension culture in an embryoid-body-forming culture medium containing one or more SMAD signaling inhibitors and one or more Wnt signaling activators in the absence of feeder cells for 5 days to 10 days, to form a cell aggregate;

(2) a step of subjecting the cell aggregate obtained in (1) to suspension culture in an embryoid-body-forming culture medium containing retinoic acid;

(3) a step of subjecting the cell aggregate obtained in (2) to suspension culture in an embryoid-body-forming culture medium or neuron-and-glia-proliferating culture medium containing retinoic acid and one or more SHH signaling activators; and (4) a step of subjecting the cell aggregate obtained in (3) to suspension culture in a neuron-and-glia-proliferating culture medium containing no retinoic acid and one or more SHH signaling activators, and optionally further comprising:

(5) a step of subjecting the cell aggregate obtained in (4) to suspension culture in a neuron-and-glia-proliferating culture medium containing neither retinoic acid nor an SHH signaling activator.

<Step (1)>

In step (1), pluripotent stem cells are cultured and allowed to form an embryoid body. The term "embryoid body (EB)" refers to a three-dimensional cell aggregate formed by suspension culture of pluripotent stem cells. In order to efficiently allowing pluripotent stem cells to differentiate into target cells, it is preferable that an embryoid body formed in the course of differentiation include many cells having differentiation potential into a germ layer (ectoderm, mesoderm, or endoderm) including target cells. If pluripotent stem cells are to be allowed to differentiate into neural cells or glial cells, for example, it is preferable that many cells having differentiation potential into an ectoderm be included in an embryoid body formed in the course of differentiation. That is, the embryoid body herein is preferably an embryoid body having differentiation potential into an ectoderm. However, differentiation of pluripotent stem cells has started even in the course of formation of an embryoid body, and the embryoid body may include cells classified as an ectoderm.

In step (1), pluripotent stem cells are cultured with use of an embryoid-body-forming culture medium containing differentiation-inducing factors including one or more SMAD signaling inhibitors and one or more Wnt signaling activators in effective concentrations. The culture medium used in step (1) can be prepared by mixing the specified differentiation-inducing factors in effective concentrations with an embryoid-body-forming culture medium.

Herein, the SMAD signaling inhibitors are not limited as long as they are capable of suppressing signaling mediated by SMAD, and one or more SMAD signaling inhibitors may be appropriately used in combination. Examples of the SMAD signaling inhibitors include inhibitors belonging to the TGFβ superfamily capable of inhibiting SMAD signaling by inhibiting phosphorylation of SMAD in the upstream of SMAD signals, specifically, a TGFβ inhibitor and a BMP inhibitor. It is preferable to use two of a TGFβ inhibitor and a BMP inhibitor as the SMAD signaling inhibitors, and, for example, one or more TGFβ inhibitors, preferably one TGFβ inhibitor, and one or more BMP inhibitors, preferably one BMP inhibitor may be appropriately used in combination.

Herein, the TGFβ inhibitor is not limited as long as it is capable of suppressing signaling mediated by TGFβ, and may be any of nucleic acid, protein, and a low-molecular-weight organic compound. Examples of the TGFβ inhibitor include substances that directly act on TGFβ (e.g., proteins, antibodies, aptamers), substances that suppress expression of a gene encoding TGFβ (e.g., antisense oligonucleotides, siRNA), substances that inhibit binding between the TGFβ receptor and TGFβ, and substances that inhibit physiological activities due to signaling caused by the TGFβ receptor (e.g., inhibitors for the TGFβ receptor). Examples of the TGFβ inhibitor include substances that inhibit binding to the ALK family as the receptor and substances that inhibit phosphorylation of SMAD caused by the ALK family.

Herein, specific examples of the TGFβ inhibitor include SB431542, SB202190 (R. K. Lindemann et al., Mol. Cancer 2:20 (2003)), SB505124 (GlaxoSmithKline), NPC30345, SD093, SD908, SD208 (Scios), LY2109761, LY364947, LY580276 (Lilly Research Laboratories), A-83-01 (WO2009146408), Galunisertib (LY2157299), LY3200882, SB525334, GW788388, RepSox, Lefty-1 (examples thereof include mouse: NM_010094 and human: NM_020997 in NCBI Accession Nos.), Lefty-2 (mouse: NM_177099, human: NM_003240 and NM_001172425 in NCBI Accession Nos.), and derivatives of them, and at least one TGFβ inhibitor can be used. It is preferable that the TGFβ inhibitor be one or more selected from the group consisting of SB431542 and A83-01, which are known as inhibitors for the TGFβ receptor (ALK5) and the activin receptor (ALK4/7), respectively.

The concentration of the TGFβ inhibitor in the culture medium can be appropriately set within a range that allows inhibition of signaling mediated by TGFβ. For example, the concentration of SB431542 is not limited as long as the concentration allows inhibition of ALK5, and, for example, 100 nM to 100 μM, preferably 500 nM to 30 μM, and more preferably 1 μM to 20 μM. In the case of a TGFβ inhibitor of another type, a concentration with which the ALK inhibitory activity or TGFβ inhibitory activity corresponding to that with the presented concentration of SB431542 is exhibited can be appropriately set.

Herein, the BMP inhibitor is not limited as long as it is an inhibitor involved in inhibition of BMP signaling via binding between BMP (Bone Morphogenetic Protein) and the BMP receptor (type I or type II), and may be any of nucleic acid, protein, and a low-molecular-weight organic compound. Examples of the BMP inhibitor include substances that directly act on BMP (e.g., proteins, antibodies, aptamers), substances that suppress expression of a gene encoding BMP (e.g., antisense oligonucleotides, siRNA), substances that exhibit the biological activity to inhibit the BMP signaling by inhibiting binding of BMP to the BMP receptor, substances that inhibit physiological activities due to signaling caused by the BMP receptor (e.g., inhibitors for the BMP receptor), and a BMP type I receptor kinase inhibitor.

Specific examples of substances that exhibit the biological activity to inhibit the BMP signaling by inhibiting binding of BMP to the BMP receptor include Dorsomorphin, Noggin, and derivatives of them. Specific examples of the BMP type I receptor kinase include LDN-193189 (specifically, 4-(6-(4-(piperazin-1-yl)phenyl)pyrazolo[1,5-a]pyrimidin-3-yl) quinoline), and derivatives thereof (e.g., LDN-212854). Other examples of the BMP inhibitor include K02288, Chordin, and Follistatin.

The BMP inhibitor is preferably one or more selected from the group consisting of Noggin, LDN-193189, Dorsomorphin, and K02288 (PLoS One. 2013; 8(4): e62721.).

The concentration of the BMP inhibitor in the culture medium can be appropriately set, for example, within a range that allows inhibition of signaling mediated by BMP. For example, the concentration of LDN-193189 is not limited as long as the concentration allows inhibition of the BMP type I receptor kinase, and, for example, 1 nM to 10 μM, preferably 10 nM to 5 μM, more preferably 50 nM to 3 μM, and even more preferably 50 nM to 1 μM. In the case of a BMP inhibitor of another type, a concentration with which the inhibitory activity to the BMP type I receptor kinase or the BMP inhibitory activity corresponding to that with the presented concentration of LDN-193189 is exhibited can be appropriately set.

Herein, the Wnt signal activator is not limited as long as it is capable of activating signaling mediated by Wnt. Examples of the Wnt signal activator include Wnt proteins (e.g., Wnt3a), Wnt agonists, Dkk (an inhibitor for Wnt signaling inhibitory protein), a GSK3β (Glycogen Synthase Kinase 3β) inhibitor, and R-Spondin.

Herein, the GSK3β 3 inhibitor is defined as a substance that inhibits the kinase activity of Glycogen Synthase Kinase (GSK) 3β protein, and specific examples thereof include indirubin derivatives such as BIO (another name: GSK-3βR inhibitor IX; 6-bromoindirubin-3'-oxime, maleimide derivatives such as SB216763, α-bromomethylketone compounds such as GSK-3β inhibitor VII, cell-penetrating phosphorylated peptides such as CHIR99021 and L803-mts, and derivatives of them.

Herein, it is preferable that the Wnt signal activator be a GSK3β P inhibitor, and it is preferable that Wnt signal activator be one or more selected from the group consisting of CHIR99021, BIO, Kenpaullone, SB216763, and L803-mts, which are GSK3β inhibitors.

The concentration of the Wnt signal activator in the culture medium can be appropriately set, for example, within a range that allows enhancement of signaling mediated by Wnt3a. For example, the concentration of CHIR99021 is not limited as long as the concentration allows inhibition of GSK3β, and, for example, 100 nM to 100 μM, preferably 500 nM to 30 μM, and more preferably 1 μM to 10 μM. In the case of a Wnt signal activator of another type, a concentration with which the GSK3β inhibitory activity or enhancement of signaling mediated by Wnt3a corresponding to that with the presented concentration of CHIR99021 is exhibited can be appropriately set.

In step (1), pluripotent stem cells are cultured in the absence of feeder cells. Being in the absence of feeder cells is also called being feeder-free, and is such a state that no feeder cell is present in the culture medium. Examples of culture conditions in the absence of feeder cells include culture conditions without addition of feeder cells such as fibroblasts, SNL cells, and STO cells.

Herein, the "embryoid-body-forming culture medium" is not limited as long as it is a culture medium that can be used in producing an embryoid body by subjecting pluripotent stem cells to suspension culture. The embryoid-body-forming culture medium may be a feeder-free culture medium that is suitable for formation of an embryoid body and suitable for feeder-free culture of pluripotent stem cells. The embryoid-body-forming culture medium can be prepared, for example, by adding additive factors such as serum substitute and nutritional sources to a minimal essential medium, as necessary.

Examples of the minimal essential medium include culture media that can be used for culture of animal cells such as BME culture medium, BGJb culture medium, CMRL 1066 culture medium, Glasgow MEM (GMEM) culture medium, Improved MEM Zinc Option culture medium, IMDM culture medium, Medium 199 culture medium, Eagle MEM culture medium, αMEM culture medium, DMEM culture medium, F-12 culture medium, DMEM/F-12 culture medium, IMDM/F12 culture medium, Ham's culture medium, RPMI 1640 culture medium, Fischer's culture medium, and mixed culture media of them. Carbon sources such as carbohydrates and amino acids, vitamins, inorganic salts and so on are contained in those minimal essential media.

For the embryoid-body-forming culture medium, for example, a culture medium obtained by removing some or all of the factors required to maintain an undifferentiated state (undifferentiation maintenance factors) from a culture medium for maintenance culture of pluripotent stem cells kept in an undifferentiated state (maintenance culture medium), or a culture medium in which the concentrations of some or all of the undifferentiation maintenance factors have been reduced to equal to or lower than their effective concentrations can be used. Such a culture medium can be prepared by blending to allow the culture medium to contain components equivalent to those of the culture medium of interest. Alternatively, a culture medium obtained by adding serum substitute and nutritional factors such as hormones to a minimal essential medium such as DMEM can be used. Maintenance culture media are commercially available in some cases as a kit for use by appropriately mixing a plurality of liquids, and in this case the embryoid-body-forming culture medium can be prepared by blending with excluding a liquid containing an undifferentiation maintenance factor. In the case of Stem Fit AK03N (manufactured by AJINOMOTO HEALTHY SUPPLY CO., INC.), for example, the product includes solution A, solution B, and solution C, separately, and the embryoid-body-forming culture medium can be prepared for use by using only solution A and solution B, with excluding solution C, which contains FGF2.

Use of a culture medium based on a maintenance culture medium as the embryoid-body-forming culture medium is advantageous in that the concentrations of desired additive factors can be appropriately varied to desired concentrations without large variation of the basic composition of the culture medium at the initiation of step (1). This leads to an advantage that no large change in the culture environment is provided to cells.

It is preferable that a component that inhibits or antagonizes the actions of differentiation-inducing factors such as the SMAD signaling inhibitor and the Wnt signaling activator be contained in the embryoid-body-forming culture medium to such a degree that the component does not influence on step (1), for example, in a concentration to such a degree that the component does not act, or such a component be not contained.

Specific examples of the culture medium to be used in step (1) include a culture medium obtained by adding 50 nM to 3 µM, preferably 100 nM of LDN-193189 (SMAD signaling inhibitor), 1 µM to 20 µM, preferably 3 µM of SB431542 (SMAD signaling inhibitor), and 1 µM to 10 µM, preferably 3 µM of CHIR99021 (Wnt signaling activator) (all manufactured by STEMGEN S.p.A.) to a culture medium (AK03N-C) obtained from StemFit AK03N culture medium (manufactured by AJINOMOTO HEALTHY SUPPLY CO., INC.), which is a maintenance culture medium, by removing FGF2, called solution C in the kit, as an embryoid-body-forming culture medium.

In step (1), pluripotent stem cells are subjected to suspension culture in the embryoid-body-forming culture medium for 5 days to 10 days. In an embodiment, cells forming a cell aggregate (or an embryoid body) are subjected to suspension culture. A suspension culture method known as what is called SFEBq method (Non Patent Literature 3) is preferable for the suspension culture. The SFEBq method is a method to form a cell aggregate by subjecting pluripotent stem cells to suspension culture with use of a culture vessel having a plurality of pores uniform in shape. In the SFEBq method, cells as single cells dispersed at the initiation of step (1) are subjected to suspension culture in a culture vessel (pore), and cells floating in one pore eventually adhere together to form a three-dimensional structure; thus, one cell aggregate is formed in each pore.

It is preferable that the culture vessel having a plurality of pores uniform in shape for use in the SFEBq method, for example, have 6, 12, 24, 96, or 384 independent spaces (pores) to culture cells, and that these pores have the same shape and size. Each pore in the culture vessel may be pillar-shaped, and the shape of the bottom surface is not limited and may be, for example, a true circle, a square, a rectangle, a polygon, or an ellipse, and it is preferable that the shape of the bottom surface be a true circle (i.e., the pore is cylindrical). The bottom surface of each pore may be flat, round-bottom (U-bottom), V-bottom, or M-bottom, and is preferably U-bottom or V-bottom or M-bottom, more preferably V-bottom or M-bottom, and most preferably V-bottom. This is because the edged shape of the bottom allows cells suspended (floating) in the pore to readily gather and form a sphere in a given period of time. It is preferable that a material without cell adhesion properties or a material with low cell adhesion properties be used for the bottom surface of each pore.

The bottom area of each pore in the culture vessel may be 0.1 to 2.0 cm$^2$, preferably 0.5 to 1.2 cm$^2$, more preferably about 0.35 cm$^2$, as converted to that of the flat bottom, the inner diameter may be 0.3 to 16.5 mm, preferably 3 to 11 mm, and more preferably about 6 to 8 mm, and the height may be 0.1 to 20 mm, preferably 0.3 to 17 mm, and more preferably 8 to 12 mm.

Examples of common commercially available culture vessels as the culture vessel include a 6-well plate (bottom area as converted to that of flat bottom: about 9.5 cm$^2$, inner diameter: about 35 mm), a 12-well plate (bottom area as converted to that of flat bottom: about 3.8 cm$^2$, inner diameter: about 23 mm), a 24-well plate (bottom area as converted to that of flat bottom: about 1.88 cm$^2$, inner diameter: about 16 mm), a 48-well plate (bottom area as converted to that of flat bottom: about 1.0 cm$^2$, inner diameter: about 11 mm), a 96-well plate (bottom area as converted to that of flat bottom: about 0.35 cm$^2$, inner diameter: about 6 to 8 mm), and 384-well plate (bottom area as converted to that of flat bottom: about 0.1 cm$^2$, inner diameter: about 3 to 4 mm). The culture vessel is preferably a 96-well plate, and more preferably a V-bottom 96-well plate.

As the 96-well plate, the PrimeSurface plates 96V, 96M, and 96U, and 96 Slit-Well plate (manufactured by Sumitomo Bakelite Co., Ltd.), and an Ultra-Low Attachment Surface 96-well round bottom (manufactured by Corning Incorporated) can be used. The pores in the culture vessel are not required to be clearly independent of each other as those in 96-well plates, as long as the culture vessel has a shape that allows cell aggregates of uniform size to be independently formed, and, for example, a culture vessel with unevenness or concaves in the bottom surface of the dish may be used. Examples of such culture vessels include multi-dimple culture vessels and those of 60 mm to 150 mm are used, but the culture vessel is not limited thereto.

If cell suspension is aliquoted in all of the pores of a 96-well plate, theoretically speaking, 96 uniform cell aggregates can be obtained, and a huge number of cell aggregates can be obtained at once by increasing the number of plates or increasing the number of pores per well, like multi-dimple culture vessels. Examples of commercially available multi-dimple culture vessels that can be used include, but are not limited to, Elplasia (manufactured by Kuraray Co., Ltd.), AggreWell (manufactured by STEMCELL Technologies Inc.), and EZSPHERE (manufactured by AGC TECHNO GLASS Co., Ltd.).

In the SFEBq method, a cell suspension with uniform cell density is first aliquoted into equal portions in pores of a culture vessel. In the case of a 96-well plate, the cell density may be 3000 cells/well to 20000 cells/well, preferably 5000 cells/well to 10000 cells/well, and more preferably approximately 9000 cells/well. Within a short time from the initiation of culture, for example, within 24 hours, preferably within 12 hours, more preferably within 8 hours, cell aggregates having almost the same size are formed in the pores, each of which contains one cell aggregate in the center part. The diameter of each cell aggregate and the number of cells therein can be controlled by adjusting the amounts of aliquots or cell density of the cell suspension. Further, with use of the SFEBq method, a plurality of cell aggregates obtained is each spherical, and thus cell aggregates can be formed with high reproducibility.

The suspension culture in step (1) may be performed for about 5 days to 10 days, preferably for about 7 days to 10 days, more preferably for about 7 days. The culture period may be determined according to the desired degree of cell differentiation. The degree of cell differentiation can be determined through measurement of differentiation markers, and the culture period in step (1) can be determined on the basis of the increase in the expression levels of SOX1, PAX6, HES4, and HES5, the decrease in the expression level of OCT3/4, and the decrease in the expression level of NANOG. Specifically, step (1) may be sustained for a period until a cell aggregate satisfying at least one of the following conditions:

1) having an expression level of at least one of SOX1, PAX6, HES4, and HES5 increased by 100 times or more on RNA basis;
2) having an expression level of OCT3/4 decreased by 200 times or more on RNA basis; and
3) having an expression level of NANOG decreased by 400 times or more on RNA basis, as compared with the cell aggregate at initiation of step (1), is obtained, and step (2) may be then initiated.

Herein, "expressing X times more on RNA basis", "an expression level increased by X times on RNA basis", or "an RNA expression level increased by X times" means that when one cell or a plurality of cells is obtained from the floating cells or cells constituting a cell aggregate at two time points during a step and subjected to comparative analysis using a technique capable of absolutely or relatively quantifying RNA expression levels in cells, the result shows that the expression level at one time point is X times higher than the RNA expression level at the other time point (having increased by X times). "Expressing X times less on RNA basis", "an expression level decreased by X times on RNA basis", or "an RNA expression level decreased by X times" means that the RNA expression level at one time point is X times lower than the RNA expression level at the other time point (having decreased by X times). The technique to be used is not limited as long as the technique is capable of quantifying RNA, and measurement methods using RNA sequencing, real-time PCR assay, microarrays, Northern blotting, in situ hybridization, and so on are applicable, and comparative measurement is preferably performed with use of RNA sequencing, real-time PCR assay, or microarrays.

The culture conditions for the suspension culture in step (1) are not limited, and may be conditions, for example, with a temperature of 35° C. to 37° C., preferably of 37° C., a humidity of 90% to 95%, preferably of 95%, and a $CO_2$ concentration of 3% to 5%, preferably of 5%, and it is preferable that the culture conditions be also hypoxic culture conditions. The term "hypoxic culture conditions" refers to conditions under which cells are cultured in an oxygen concentration lower than the oxygen concentration of the atmosphere (approximately 21%). The term oxygen concentration refers to the concentration of oxygen in the air in contact with a culture medium containing cells in a culture apparatus. The oxygen concentration is not limited as long as it is 20% or lower, but preferably in the range of 3% to 10%, more preferably in the range of 4% to 6%, and most preferably 5%.

Pluripotent stem cells may be subjected to maintenance culture with a maintenance culture medium before differentiation, that is, before step (1). The maintenance culture medium is a culture medium that contains factors required to maintain an undifferentiated state (undifferentiation maintenance factors) and is capable of maintaining pluripotency. Examples of the undifferentiation maintenance factors include fibroblast growth factor, transforming growth factor beta (TGFβ family) factor, and activin A.

Herein, the term "fibroblast growth factor (FGF)" refers to a factor that acts on the fibroblast growth factor receptor to activate an FGF signal. Examples of FGF include FGF2 (also called bFGF), FGF4, and FGF8.

Herein, the maintenance culture medium is a culture medium that allows maintenance culture of pluripotent stem cells under feeder-free conditions, in other words, a feeder-free culture medium. Various culture media have been developed and are commercially available as applicable feeder-free culture media, and examples thereof include Essential 8 (manufactured by Thermo Fisher Scientific Inc.). The Essential 8 culture medium contains, as additives, magnesium L-ascorbate-2-phosphate (64 mg/l), sodium selenide (14 μg/l), insulin (19.4 mg/l), $NaHCO_3$(543 mg/l), transferrin (10.7 mg/l), FGF2 (100 ng/ml), and TGFβ (TGFβ 1 (2 ng/ml) or Nodal (100 ng/ml)) in DMEM/F-12 culture medium (Nature Methods, 8, p424-429 (2011)).

Other examples of commercially available maintenance culture media include S-medium (manufactured by DS Pharma Biomedical Co., Ltd.), StemPro (manufactured by Thermo Fisher Scientific Inc.), hESF9 (Proc Natl Acad Sci USA. 2008 Sep. 9; 105(36): 13409-14), mTeSR1 (manufactured by STEMCELL Technologies Inc.), mTeSR2 (manufactured by STEMCELL Technologies Inc.), TeSR-E8 (manufactured by STEMCELL Technologies Inc.), Cellartis DEF-CS 500 Xeno-Free Culture Medium (manufactured by Takara Bio Inc.), and StemFit (manufactured by AJINOMOTO HEALTHY SUPPLY CO., INC.).

A culture medium having such a composition that undifferentiation maintenance factors have been removed from the components of the maintenance culture medium described above by lowering the concentrations of the undifferentiation maintenance factors can be prepared and used as the embryoid-body-forming culture medium in step (1). Accordingly, the embryoid-body-forming culture medium to be used in step (1) is preferably a feeder-free culture medium being a maintenance culture medium having reduced concentrations of undifferentiation maintenance factors or removed of undifferentiation maintenance factors. Specific examples thereof include maintenance culture media not containing FGF such as FGF2 for feeder-free culture. Alternatively, a culture medium obtained by mixing a neuron-and-glia-proliferating culture medium described later or a culture medium having a composition similar to that of the neuron-and-glia-proliferating culture medium and the maintenance culture medium, for example, at a ratio of 1:1 can be used as the embryoid-body-forming culture medium.

<Step (2)>

In step (2), the cell aggregate obtained in step (1) is subjected to suspension culture in an embryoid-body-forming culture medium containing retinoic acid. The embryoid-body-forming culture medium and suspension culture are as described above. The culture medium to be used in step (2) can be prepared by mixing retinoic acid in an embryoid-body-forming culture medium.

The culture medium to be used in step (2) may be a culture medium having the same composition as the culture medium to be used in step (1) except two points: the culture medium to be used in step (2) contains retinoic acid, and does not contain the one or more SMAD signaling inhibitors and one or more Wnt signaling activators. Examples of "retinoic acid" include retinoids (e.g., retinoic acid). Specific examples of the culture medium to be used in step (2) include a culture medium obtained by adding 1 μM retinoic acid (manufactured by Sigma-Aldrich Co. LLC) to a culture medium, as an embryoid-body-forming culture medium, obtained from StemFit AK03N culture medium (manufactured by AJINOMOTO HEALTHY SUPPLY CO., INC.) by excluding FGF2, called solution C in the kit, therefrom (AK03N-C).

The concentrations of retinoids in the culture medium can be appropriately set within a range that allows enhancement of signaling mediated by retinoic acid. For example, the concentration of retinoic acid is not limited as long as the activity, that is, the posterior patterning effect for regional specificity is exhibited, and is, for example, 10 nM to 100

μM, preferably 100 nM to 10 μM, and more preferably 500 nM to 5 μM. For concentrations of other retinoids, a concentration at which the activity corresponding to that of retinoic acid in the presented concentration is exhibited can be appropriately set.

Step (2) can be initiated by removing the culture medium used in step (1) from the culture vessel at the completion of step (1) and performing culture medium exchange with the culture medium to be used in step (2). In the case that the culture vessel used in step (1) is used in step (2), it is preferable from the viewpoint of protecting cell aggregates to exchange about half of the culture medium, and half or more of the culture medium can be exchanged by repeating that operation in multiple cycles. At that time, cell aggregates can be washed with a culture medium differing from the culture medium to be used in step (2) or phosphate buffer, as necessary, and culture with the culture medium to be used in step (2) may be then initiated. Alternatively, after all the cell aggregates obtained in step (1) are collected at the completion of step (1) and washed, as necessary, step (2) can be initiated by suspending the cell aggregates in the culture medium to be used in step (2). The culture vessel to be used in step (2) is not limited as long as it is a culture instrument for suspension culture, and a dish or plate commonly used by those skilled in the art can be used. Examples thereof include the PrimeSurface plate 96V and Ultra-Low Attachment Culture Flasks (manufactured by Corning Incorporated).

The suspension culture in step (2) may be performed for about 3 days to 21 days, preferably for about 4 days to 11 days, more preferably for about 7 days. The culture period may be determined according to the desired degree of cell differentiation. The degree of cell differentiation can be determined through measurement of differentiation markers, and, for example, cells can be collected to measure mRNA levels or protein levels of expressed differentiation markers. Alternatively, the culture supernatant may be collected to measure protein levels of differentiation markers secreted from cells into the culture medium. The culture period of step (2) can be determined on the basis of the RNA or protein expression levels of one or more markers selected from the group consisting of ASCL1, DCX, SLIT1, HEY1, ZBTB20, βIII tubulin, ELAVL3, HOXB3, HOXA4, HOXB4, HOXB6, and HOXB8. Specifically, step (2) may be sustained for a period until a cell aggregate satisfying at least one of the following conditions:

1) having an expression level of at least one of ASCL1, DCX, HEY1, ZBTB20, βIII tubulin, ELAVL3, and SLIT1 increased by 5 times or more on RNA basis; and
2) having an expression level of at least one of HOXB3, HOXA4, HOXB4, HOXB6, and HOXB8 increased by 5 times or more on RNA basis,
as compared with the cell aggregate at initiation of step (2), is obtained, and step (3) may be then initiated.

The culture conditions for the suspension culture in step (2) may be identical to those in step (2), and it is preferable that the culture conditions be also hypoxic culture conditions. The oxygen concentration under hypoxic culture conditions is not limited as long as it is 20% or lower, but preferably in the range of 3% to 10%, more preferably in the range of 4% to 6%, and most preferably 5%.

<Step (3)>

In step (3), the cell aggregate obtained in step (2) is subjected to suspension culture in an embryoid-body-forming culture medium or neuron-and-glia-proliferating culture medium containing retinoic acid and one or more SHH signaling activators. The embryoid-body-forming culture medium is as described above. The culture medium to be used in step (3) can be prepared by mixing retinoic acid and one or more SHH signaling activators in an embryoid-body-forming culture medium or neuron-and-glia-proliferating culture medium. If an embryoid-body-forming culture medium is used, the culture medium to be used in step (3) can be prepared also by further mixing one or more SHH signaling activators in the culture medium to be used in step (2).

Herein, the term "neuron-and-glia-proliferating culture medium" refers to a culture medium suitable for grow culture of glial progenitor cells, glial cells, neural progenitor cells, and neural cells (neurons), and is not limited as long as the culture medium is capable of maintaining the survival of such cells and allowing the cells to differentiate and proliferate. The neuron-and-glia-proliferating culture medium can be produced by appropriately adding nutritional factors or the like suitable for the survival of glial progenitor cells, glial cells, neural progenitor cells, and neural cells, to the above minimal essential medium, and products commercially available as culture media particularly suitable for maintenance culture or induction of differentiation of nervous system cells can be used in combination or with partial compositional modification, as appropriate. For example, commercially available Neurobasal or a commercially available minimal essential medium or the like, such as DMEM/F-12, may be selected for use with addition of the above nutritional factors and so on, as appropriate.

For the "nutritional factors suitable for survival" mentioned above, nutritional factors well known as factors to be added in culturing nervous system cells to those skilled in the art can be appropriately used in combination, and specific examples thereof include insulin, sodium selenite, progesterone, transferrin, putrescine, growth factors, vitamins, cAMP activators, hormones, and neurotrophic factors, and one or more factors of them can be selected for use.

It is preferable for allowing, in particular, all of glial progenitor cells, glial cells, neural progenitor cells, and neural cells to differentiate and proliferate properly that one or more growth factors be contained in the neuron-and-glia-proliferating culture medium herein, and it is preferable that a platelet-derived growth factor (PDGF) be contained. For the platelet-derived growth factor, PDGF-AA can be used. Other examples of growth factors in the neuron-and-glia-proliferating culture medium herein include FGF (e.g., FGF2), EGF, IGF-1, and HGF. In a preferable mode, PDGF-AA, EGF, IGF-1, and FGF (preferably, FGF2) are contained in the neuron-and-glia-proliferating culture medium.

Examples of neurotrophic factors include human NT-3 (the recombinant protein human neurotrophin 3), BDNF, NGF, GDNF, and CNTF. Examples of vitamins include biotin and ascorbic acid. Examples of cAMP activators include cAMP, dibutyryl-cAMP, and forskolin. Examples of hormones include progesterone and T3. In a preferable mode, a thyroid hormone such as T3 and a neurotrophic factor such as NT-3 are contained in the neuron-and-glia-proliferating culture medium in addition to the growth factors presented above.

As mixtures obtained by appropriately blending the nutritional factors presented above, N1 supplement (hereinafter, occasionally referred to as N1), N2 supplement (hereinafter, occasionally referred to as N2), B27 supplement (including products removed of vitamin A; hereinafter, occasionally referred to as B27), and so on are commercially available, and thus these can be used to add to a minimal essential medium for convenience. For example, insulin, transferrin, progesterone, sodium selenate, and putrescine are contained in N2. In using N2, it is preferable that human NT-3 and/or B27 (it is preferable to remove vitamin A) be further contained.

Examples of the neuron-and-glia-proliferating culture medium include a culture medium obtained by adding N2, B27 (a product removed of vitamin A may be used), Glutamax®, FGF2, EGF, T3, NT-3, PDGF-AA, and IGF-1 to DMEM/F-12 culture medium. Another example is a culture medium obtained by adding glucose, L-glutamine, sodium hydrogen carbonate, HEPES, insulin, transferrin, progesterone, sodium selenite, putrescine, B27, MEM NEAA, FGF2, EGF, T3, NT-3, PDGF-AA, and IGF-1 to DMEM/F-12 culture medium. Another example is a culture medium obtained by adding Glutamax, 3-mercaptoethanol, B27, N2, MEM NEAA, FGF2, EGF, T3, NT-3, PDGF-AA, and IGF-1 to DMEM/F-12 culture medium. Still another example is a culture medium obtained by adding N1, B27, T3, biotin, dibutyryl cAMP, PDGF-AA, IGF-1, and NT-3 to DMEM/F-12 culture medium.

From the viewpoint that one or more of the above-described nutritional factors suitable for the survival of nervous system cells are contained in the neuron-and-glia-proliferating culture medium, it is preferable that the neuron-and-glia-proliferating culture medium do not contain a substance that inhibits or suppresses the biological activities of the components, or contain such a substance in a concentration lower than the effective concentration.

Specific examples of the neuron-and-glia-proliferating culture medium include a culture medium obtained by adding 1% N2 (manufactured by Thermo Fisher Scientific Inc.), B27 (manufactured by Thermo Fisher Scientific Inc.) with a vitamin A concentration of 5 µg/ml or less, preferably free of vitamin A, 10 ng/ml to 100 ng/ml, preferably 60 ng/ml of T3 (manufactured by Sigma-Aldrich Co. LLC), 5 ng/ml to 100 ng/ml, preferably 10 ng/ml of PDGF-AA (manufactured by PeproTech, Inc.), 10 ng/ml to 100 ng/ml, preferably 20 ng/ml of FGF2, 5 ng/ml to 100 ng/ml, preferably 10 ng/ml of EGF (manufactured by PeproTech, Inc.), 10 ng/ml of insulin-like growth factor 1 (manufactured by R&D Systems, Inc.), and 5 ng/ml to 100 ng/ml, preferably 10 ng/ml of NT-3 (Neurotrophin-3) (manufactured by R&D Systems, Inc.) to DMEM/F-12 culture medium (manufactured by Thermo Fisher Scientific Inc.).

Herein, an SHH signaling activator is defined as a substance that causes disinhibition of Smoothened (Smo) caused by binding of SHH (Sonic Hedgehog) to the receptor Patched (Ptchl) and subsequent activation of Gli2. Examples of SHH signaling activators include proteins belonging to the Hedgehog family, specifically, SHH and IHH (Indian Hedgehog), partial peptides of SHH or IHH such as Sonic Hedgehog N-Terminus (Shh-N), recombinant Human Sonic Hedgehog (C24II) N-Terminus (SHH-C24II), and recombinant Mouse Sonic Hedgehog (C25II) N-Terminus (SHH-C25II), SHH receptors, SHH receptor agonists, Hh-Ag1.5 (Li, X. et al., Nature Biotechnology, 23, 215 to 221 (2005).), Smoothened Agonist (SAG), [N-methyl-N'-(3-pyridinylbenzyl)-N'-(3-chlorobenzo[b]thiophene-2-carbonyl)-1,4-diaminocyclohexane)], 20a-hydroxycholesterol, Purmorphamine (PMA; 9-cyclohexyl-N-[4-(4-morpholinyl)phenyl]-2-(1-nagthalenyloxy)-9H-purin-6-amine), and derivatives of them (Stanton B Z et al., Mol Biosyst. 6:44-54, 2010).

The SHH signaling activators in step (3) may be one or more selected from the group consisting of Purmorphamine, SAG, SHH proteins, and SHH fragments (e.g., SHH C25II or SHH C24II), and are preferably one or more selected from the group consisting of SHH proteins, SHH fragments, Purmorphamine, and SAG.

The concentrations of the SHH signaling activators in the culture medium can be appropriately set within a range that allows enhancement of signaling mediated by SHH. For example, the concentration of Purmorphamine is not limited as long as the ventralization effect for regional specificity is exhibited, and is, for example, 10 nM to 10 µM, preferably 100 nM to 10 µM, and more preferably 500 nM to 5 µM. For other SHH signaling activators, a concentration at which the disinhibition effect for Smoothened (Smo) and subsequent activation effect for Gli2 corresponding to those of Purmorphamine in the presented concentration are caused, or the ventralization effect for regional specificity is exhibited can be appropriately set.

Specific examples of the culture medium to be used in step (3) include a culture medium obtained by adding 1 µM retinoic acid (manufactured by Sigma-Aldrich Co. LLC) and 1 µM Purmorphamine (manufactured by Millipore Corporation) to an embryoid-body-forming culture medium or neuron-and-glia-proliferating culture medium.

After collecting all the cell aggregates obtained in (2) at the completion of step (2) and washing the collected cell aggregates with the culture medium to be used in step (3), another culture medium (examples thereof include, but are not limited to, DMEM/F-12), phosphate buffer, or the like, as necessary, step (3) can be initiated by suspending the cell aggregates in the culture medium to be used in step (3). Alternatively, from the viewpoint of protecting cell aggregates, about half of the culture medium can be exchanged to avoid rapid change of the culture environment, and half or more of the culture medium can be exchanged by repeating that operation in multiple cycles. The culture vessel to be used in step (3) is not limited as long as it is a culture instrument for suspension culture, and a flask or plate commonly used by those skilled in the art can be appropriately used. Examples thereof include the PrimeSurface plate 96V and 96 Slit-Well plate, and Ultra-Low Attachment Culture Flasks (manufactured by Corning Incorporated).

The suspension culture in step (3) may be performed for about 4 days to 11 days, preferably for about 4 days to 7 days, more preferably for about 7 days. The culture period may be determined according to the desired degree of cell differentiation. During the culture period, culture medium exchange may be appropriately performed for the whole or part of the culture medium once every several days (e.g., once every 3 days or 4 days).

The degree of cell differentiation can be determined through measurement of differentiation markers, and, for example, cells can be collected to measure mRNA levels or protein levels of expressed differentiation markers. Alternatively, the culture supernatant may be collected to measure protein levels of differentiation markers secreted from cells into the culture medium. The culture period of step (3) can be determined, for example, on the basis of the RNA or protein expression levels of one or more markers selected from the group consisting of HEY2, NKX6.2, NKX2.2, OLIG1, and OLIG2. Specifically, step (3) may be sustained for a period until a cell aggregate satisfying at least one of the following conditions:

1) having an expression level of at least one of HEY2, NKX6.2, and NKX2.2 increased by 5 times or more on RNA basis; and
2) having an expression level of OLIG1 and/or OLIG2 increased by 10 times or more on RNA basis, as compared with the cell aggregate at initiation of step (3), is obtained, and step (4) may be then initiated. The evaluation method for the RNA expression levels is as described for step (1).

The culture conditions for the suspension culture in step (3) are not limited, and may be conditions, for example, with a temperature of 35° C. to 37° C., preferably of 37° C., a humidity of 90% to 95%, preferably of 95%, a $CO_2$ concentration of 3% to 5%, preferably of 5%, and an $O_2$ concentration of 10% to 20%, preferably of 20%.

<Step (4)>

In step (4), the cell aggregate obtained in (3) is subjected to suspension culture in a neuron-and-glia-proliferating culture medium containing no retinoic acid and one or more SHH signaling activators. The neuron-and-glia-proliferating culture medium and SHH signaling activators are as described above.

In step (4), culture medium exchange may be performed with a culture medium for step (4) at the completion of step (3) to subject the cell aggregate obtained in step (3) to suspension culture as it is; however, the cell aggregate obtained in step (3) may be dispersed in advance in order to remove cells that cannot survive or proliferate in the culture medium to be used in step (4) as non-target cells and increase the contents of target oligodendrocyte progenitor cells, astrocyte progenitor cells, and neural progenitor cells, and the dispersed cells may be subjected to suspension culture to form a cell aggregate again.

"Dispersing a cell aggregate" means dissociating cells forming a cell aggregate into cell units (single cells), or disintegrating the original shape of a cell aggregate while a state in which a plurality of cells is conjugating together is maintained. Examples of dispersing methods include physical stimulation techniques and techniques with a compound, and cell aggregates can be disintegrated with one of the techniques or a combination of both types of the techniques. Specifically, an original cell aggregate includes approximately 1000 to 100000 cells, preferably approximately 3000 to 50000 cells, more preferably approximately 1000 to 50000 cells, even more preferably approximately 3000 to 30000 cells, and, even when the cell aggregate after being dispersed is in a state in which a plurality of cells is conjugating together to form a small mass of cells, the number of cells included in the mass is about 100 or less, whereas it is more preferable to disperse a cell aggregate before dissociation to reach a state in which 90% or more of the cells are single.

Specifically, a cell aggregate can be effectively dispersed by dissociating cell-to-cell bonds with use of a trypsin-like enzyme (e.g., trypsin, TrypLE®), Accutase®, Accumax®, or a metal-chelating agent (e.g., EDTA, EGTA) and further providing physical stimulation with use of a Pipetman™. In addition, a manipulation of passing through a Cell Strainer can be used as a method for dispersing cells into single cells. While allowing a dispersed cell aggregate to assemble and form a cell aggregate again for implementation of the present invention is achieved by culturing cells under suspension culture conditions for a certain period of time, the SFEBq method described above can be used to obtain masses of cell aggregates more uniform in size.

The suspension culture in step (4) may be performed for about 4 days or more, preferably for about 10 days or more, more preferably for about 14 days or more, particularly preferably for about 14 days to 21 days. The culture period may be determined according to the desired degree of cell differentiation.

The degree of cell differentiation can be determined through measurement of differentiation markers, and, for example, cells can be collected to measure mRNA levels or protein levels of expressed differentiation markers. Alternatively, the culture supernatant may be collected to measure protein levels of differentiation markers secreted from cells into the culture medium. The culture period of step (4) can be determined, for example on the basis of the RNA or protein expression levels of one or more markers selected from the group consisting of NFIA, NFIB, SLC1A3, S100B, FABP7, and PAX6. Specifically, step (4) may be sustained for a period until a cell aggregate satisfying at least one of the following conditions:

1) having an expression level of at least one of NFIA, NFIB, SLC1A3, S100B, and FABP7 increased by 10 times or more on RNA basis; and
2) having an expression level of PAX6 decreased by 5 times or more on RNA basis, as compared with the cell aggregate at initiation of step (4), is obtained, and step (5) may be then initiated. The evaluation method for the RNA expression levels is as described for step (1).

Examples include the PrimeSurface plate 96V and 96 Slit-Well plate, and Ultra-Low Attachment Culture Flasks (manufactured by Corning Incorporated).

The culture vessel to be used in step (4) is not limited as long as it is a culture instrument for suspension culture, and a flask, plate, and dish commonly used by those skilled in the art can be appropriately used.

Examples thereof include Nunc™ EasYFlask™ Cell Culture Flasks (manufactured by Thermo Fisher Scientific Inc.), Ultra-Low Attachment Culture Flasks (manufactured by Corning Incorporated), and a culture vessel having a plurality of pores uniform in shape for use in the SFEBq method.

The culture conditions for the suspension culture in step (4) are not limited, and may be conditions, for example, with a temperature of 35° C. to 37° C., preferably of 37° C., a humidity of 90% to 95%, preferably of 95%, a $CO_2$ concentration of 2% to 5%, preferably of 5%, and an $O_2$ concentration of 10% to 20%, preferably of 20%.

During the culture period, culture medium exchange may by performed once every about 2 to 7 days, or once every about 2 to 5 days, or once every about 3 to 4 days, and, in the culture medium exchange, the whole of the culture medium may be exchanged, and, for example, about ⅓ or ½ of the culture medium may be exchanged to avoid large change of the culture environment for cells. Components contained in the culture medium, such as growth factors and neurotrophic factors, may be supplied as appropriate at a timing other than culture medium exchange. For example, it is preferable in step (4) to add PDGF-AA, for example, once every 2 to 3 days so as to maintain the concentration of PDGF-AA (e.g., 10 ng/ml).

For the neuron-and-glia-proliferating culture medium to be used in step (4), in the case that a neuron-and-glia-proliferating culture medium is used in step (3), a culture medium of the same composition may be used as a neuron-and-glia-proliferating culture medium also in step (4), and components may be modified as appropriate.

It is preferable that the neuron-and-glia-proliferating culture medium to be used in step (4) contain 5 ng/ml to 100 ng/ml of PDGF-AA, and it is more preferable that the neuron-and-glia-proliferating culture medium to be used in step (4) contain approximately 10 ng/ml of PDGF-AA.

<Step (5)>

In step (5), the cell aggregate obtained in (4) is subjected to suspension culture in a neuron-and-glia-proliferating culture medium containing neither retinoic acid nor an SHH signaling activator. The neuron-and-glia-proliferating culture medium is as described above.

Culture medium exchange may be performed with a culture medium for step (5) at the completion of step (4) to subject the cell aggregate obtained in step (4) to suspension culture as it is; however, the cell aggregate obtained in step (4) may be dispersed in advance in order to remove cells that cannot survive or proliferate in the culture medium to be used in step (5) as non-target cells and increase the contents of target oligodendrocyte progenitor cells, astrocyte progenitor cells, and neural progenitor cells, and the dispersed cells may be subjected to suspension culture to form a cell aggregate again. The specific method is the same as in step (4).

The period of the suspension culture in step (5) is not limited and the culture can be continued, as long as culture is performed under conditions that do not allow excessive progression of differentiation and do not allow cell aggregates to become excessively large with appropriately performing culture medium exchange and passage. The culture in step (5) may be performed for about 5 days to 100 days, preferably for about 5 days to 20 days or 7 days to 50 days, more preferably for about 7 days to 35 days, even more preferably for 7 days to 28 days, most preferably for 14 days to 28 days. During the culture period of step (5), culture medium exchange may be appropriately performed once every several days, for example, once every 7 days or less, once every about 2 to 7 days, or once every 2 to 5 days, or once every about 3 to 4 days, according to the number of cells or the volume of the culture medium, and, in the culture medium exchange, the whole of the culture medium may be exchanged, and, for example, about ⅓ or ½ of the culture medium may be exchanged to avoid large change of the culture environment for cells. The passage number is not limited, and passage may be performed, for example, 0 to 5 times. For example, the step can be terminated after 14-day culturing starting from the initiation of step (5), and the step can be terminated after performing one additional passage and then continuing culture for 8 days or 14 days.

The degree of cell differentiation can be determined through measurement of differentiation markers, and, for example, cells can be collected to measure the amounts of differentiation markers expressed or being present. Examples of differentiation markers at least include mRNA, proteins, saccharides, and lipids. Alternatively, the culture supernatant may be collected to measure the amounts of differentiation markers secreted from cells into the culture medium.

The culture period of step (5) can be determined, for example, according to the expression levels or abundances of one or more markers selected from the group consisting of an O4 antigen, NG2, OLIG2, PDGFRα, SOX10, SPON1, FAM181B, TIMP4, SOX6, GRIK3, LHFPL3, KLF9, an A2B5 (Epitope A2B5) antigen, CNP, and PLP.

For the neuron-and-glia-proliferating culture medium to be used in step (5), a culture medium having the same composition as in step (4) may be used and components may be modified as appropriate, as long as neither retinoic acid nor an SHH signaling activator is contained.

The culture vessel to be used in step (5) is not limited as long as it is a culture instrument for cell culture, and a flask or plate commonly used by those skilled in the art can be appropriately used. Examples thereof include Nunc™ EasY-Flask™ Cell Culture Flasks (manufactured by Thermo Fisher Scientific Inc.), Ultra-Low Attachment Culture Flasks (manufactured by Corning Incorporated), a 96-well plate, and a 96 Slit-Well plate. The culture conditions for the suspension culture in step (5) are not limited, and may be conditions, for example, with a temperature of 37° C., a humidity of 95%, a $CO_2$ concentration of 5%, and an 02 concentration of 20%. It is preferable to perform culture medium exchange once every about 7 days and add PDGF-AA (e.g., 10 ng/ml) once every about 3 to 4 days during the culture period.

The cell aggregate including glial progenitor cells obtained after step (5) (the cell aggregate of the present invention including glial progenitor cells) has the following characteristics:

(a) including oligodendrocyte progenitor cells, astrocyte progenitor cells, and neural progenitor cells;
(b) expressing a spinal region marker; and
(c) including no feeder cell and containing no component derived from feeder cells.

For the purpose of confirming that cells having characteristic (a) have been obtained in step (5), step (5) can be sustained until the cell aggregate is confirmed to be expressing one or more, preferably two or more, even more preferably five or more markers selected from an O4 antigen, NG2, OLIG2, PDGFRα, SOX10, SPON1, FAM181B, TIMP4, SOX6, GRIK3, LHFPL3, KLF9, an A2B5 antigen, CNP, and PLP.

Further, for the purpose of confirming that cells having characteristic (b) have been obtained in step (5), step (5) can be sustained until the cell aggregate is confirmed to be expressing one or more, preferably two or more markers selected from the group consisting of HOXB3, HOXB4, HOXB6, and HOXD8.

Further, step (5) can be sustained until one or more proteins selected from the group consisting of SPARCL1, MIF, MCP-1, IL-8, SCF, M-CSF, HGF, GRO-α, LIF, IFN-γ, and TRAIL are detected in the culture medium culturing the cell aggregate in step (5).

The cell aggregate including glial progenitor cells is spherical with a diameter of approximately 100 m to 800 m, for example, approximately 100 m to 300 m, approximately 200 m to 400 m, or approximately 400 m to 600 μm. The cell aggregate including glial progenitor cells can differentiate into a cell aggregate including oligodendrocytes, astrocytes, and neural cells by continuing culture suitable for differentiation. When being transplanted into a living body, the cell aggregate including glial progenitor cells can differentiate into a cell population including oligodendrocytes, astrocytes, and neural cells in the living body.

[Cell Aggregate Including Glial Progenitor Cells]

In a mode, the cell aggregate of the present invention including glial progenitor cells has the following characteristics:

(a) including oligodendrocyte progenitor cells, astrocyte progenitor cells, and neural progenitor cells;
(b) expressing a spinal region marker;
(c) including no feeder cell and containing no component derived from feeder cells; and
(d) having an ability to differentiate into a cell population including oligodendrocytes, astrocytes, and neural cells.
(a) The cell aggregate including glial progenitor cells in an embodiment includes oligodendrocyte progenitor cells, astrocyte progenitor cells, and neural progenitor cells, as cells constituting the cell aggregate.

The term glial progenitor cells is meant to include both oligodendrocyte progenitor cells and astrocyte progenitor cells.

The oligodendrocyte progenitor cells in the cell aggregate of the present invention including glial progenitor cells are characterized by expressing one or more, preferably two or more, more preferably five or more markers selected from an O4 antigen, NG2, OLIG2, PDGFRα, SOX10, SPON1, FAM181B, TIMP4, SOX6, GRIK3, LHFPL3, KLF9, an A2B5 antigen, CNP, and PLP. Preferably, the oligodendrocyte progenitor cells are expressing at least an A2B5 antigen, an O4 antigen, OLIG2, and FAM181B.

The astrocyte progenitor cells in the cell aggregate of the present invention including glial progenitor cells are characterized by expressing one or more, preferably two or more, more preferably five or more markers selected from NFIA, NFIB, SOX9, HEY1, HEY2, FABP7, ZBTB20, SLC1A3, S100B, MLC1, SLIT1, TIMP3, SPARCL1, GFAP, and AQP4. Preferably, the astrocyte progenitor cells are expressing at least NFIA, NFIB, SLC1A3, and SPARCL1.

Among the markers expressed on the astrocyte progenitor cells, NFIA, NFIB, SOX9, HEY1, HEY2, FABP7, and ZBTB20 are markers expressed on low-maturity astrocyte progenitor cells, which are classified as glial progenitor cells and have not differentiated into complete astrocyte progenitor cells, but are destined to be induced to differentiate into astrocytes. That is, the cell aggregate of the present invention including glial progenitor cells is characterized by including such low-maturity astrocyte progenitor cells.

Accordingly, more preferably,
1) low-maturity astrocyte progenitor cells characterized by expressing one or more, preferably two or more, more preferably five or more markers selected from NFIA, NFIB, SOX9, HEY1, HEY2, FABP7, and ZBTB20; and
2) astrocyte progenitor cells characterized by expressing one or more, preferably two or more, more preferably five or more markers selected from SLC1A3, S100B, MLC1, SLIT1, TIMP3, SPARCL1, GFAP, and AQP4
are both included in the cell aggregate of the present invention including glial progenitor cells.

The cell aggregate of the present invention including glial progenitor cells further includes relatively immature (low degree of differentiation) neural stem cells, in addition to neural progenitor cells. The neural stem cells are characterized by expressing one or more, preferably two or more, more preferably four or more markers selected from SOX1, SOX2, NESTIN, MEIS1, MEIS2, DLL3, and ASCL1. Preferably, the neural stem cells are expressing at least SOX1, ASCL1, and NESTIN.

The neural progenitor cells in the cell aggregate of the present invention including glial progenitor cells are characterized by expressing one or more, preferably two or more, more preferably five or more markers selected from DCX, βIII tubulin, MAP2, ELAVL3, NTRK2, GRIA2, PTPRO, and EPHA3. Preferably, the neural progenitor cells are expressing at least DCX, βIII tubulin, and ELAVL3.

It is preferable for the cell aggregate including glial progenitor cells in an embodiment to include 5% or more, preferably 10% to 60%, more preferably 20% to 50%, even more preferably 20% to 40% of oligodendrocyte progenitor cells to the total of the cells constituting the cell aggregate. Further, it is preferable for the cell aggregate including glial progenitor cells in an embodiment to include 10% or more, preferably 10% to 80%, more preferably 10% to 50%, even more preferably 20% to 30% of astrocyte progenitor cells. Furthermore, it is preferable for the cell aggregate including glial progenitor cells in an embodiment to include 10% or more, preferably 20% to 60%, more preferably 30% to 50% of neural progenitor cells. Here, the total of oligodendrocyte progenitor cells, astrocyte progenitor cells, and neural progenitor cells does not exceed 100%, and accounts for 80% or more, preferably 85% or more, more preferably 90% or more, even more preferably 95% or more of the total number of the cells included in the cell aggregate.

The proportions of the cell types in the cell aggregate including glial progenitor cells are not limited, and an example of a mode is a cell aggregate in which the content of astrocyte progenitor cells or neural progenitor cells is more than the content of oligodendrocyte progenitor cells.

The content ratio of each type of cells to the total of the cells constituting a cell aggregate can be specified by expression of the corresponding cell markers. For example, the proportion of target cells to the total of the cells present in a given range can be determined by using numerical values calculated through measurement (detection or quantification) of mRNA for a marker, a protein, or a fragment thereof with a technique well known to those skilled in the art such as FACS, immunostaining, and single-cell RNA sequencing. The total number of cells can be counted, for example, with nuclear staining, which allows the number of target cells present in the same range to be counted as the number of cells expressing a marker that is expressed specifically on the target cells.

(b) The cell aggregate including glial progenitor cells in an embodiment is expressing a spinal region marker, and, for example, characterized by expressing one or more, preferably two or more spinal region markers selected from HOXB3, HOXB4, HOXB6, and HOXD8 on mRNA basis.

The cell aggregate including glial progenitor cells in an embodiment is expressing a ventral region marker, and, for example, characterized by expressing one or more, preferably two or more ventral region markers selected from NKX2.1, NKX2.2, NKX6.1, and NKX6.2 on mRNA basis.

The cell aggregate including glial progenitor cells in an embodiment is characterized by including cells expressing one or more, preferably two or more spinal region markers selected from HOXB3, HOXB4, HOXB6, and HOXD8 on mRNA basis, and expressing one or more, preferably two or more ventral region markers selected from NKX2.1, NKX2.2, NKX6.1, and NKX6.2.

(c) The cell aggregate including glial progenitor cells in an embodiment is characterized by including no feeder cell and containing no component derived from feeder cells, or containing no xenogeneic-cell-derived component if feeder cells are derived from another animal species. Such a cell aggregate can be obtained by culturing pluripotent stem cells in the absence of feeder cells. Here, the term xenogeneic-cell-derived component refers to a component derived from a biological species differing from the biological species of cells to be cultured, and cells other than iPS cells or than cells formed by inducing iPS cells to differentiate, or a component specific to these cells are not included or contained in the cell aggregate of the present invention including glial progenitor cells. Modes of the cell aggregate of the present invention including glial progenitor cells include a mode in which neither a component derived from feeder cells such as a component derived from xenogeneic feeder cells, nor another xenogeneic-cell-derived component or xenogeneic factor is contained. Such a cell aggregate can be obtained with a xeno-free culture medium in addition to the above conditions in the absence of feeder cells.

(d) The cell aggregate including glial progenitor cells in an embodiment has an ability to differentiate into a cell population including oligodendrocytes, astrocytes, and neural cells. To successfully confirm that the cell aggregate of the present invention including glial progenitor cells has the ability, whether the cell aggregate has differentiated into a cell population including oligodendrocytes, astrocytes, and neural cells is determined after culture is performed in a maturation culture medium described later with a culture method described later for 5 days to 60 days, more specifically, for 10 days. Specifically, differentiation into a cell population including oligodendrocytes, astrocytes, and neural cells can be identified by detecting expression of markers described later.

The cell aggregate including glial progenitor cells in an embodiment is characterized by (I) including cells expressing one or more, preferably two or more, more preferably five or more markers selected from NFIA, NFIB, SOX9, HEY1, HEY2, FABP7, ZBTB20, SLC1A3, S100B, MLC1, SLIT1, TIMP3, SPARCL1, GFAP, and AQP4, preferably on mRNA basis.

Preferably, the cell aggregate including glial progenitor cells in the embodiment is characterized by expressing one or more, preferably two or more, more preferably five or more markers selected from NFIA, NFIB, SOX9, HEY1, HEY2, and ZBTB20 on mRNA basis and characterized by including cells expressing one or more, preferably two or more, more preferably five or more markers selected from SLC1A3, S100B, MLC1, SLIT1, TIMP3, SPARCL1, GFAP, and AQP4 on mRNA basis.

The cell aggregate including glial progenitor cells in an embodiment is characterized by (II) including cells expressing one or more, preferably two or more, more preferably five or more markers selected from OLIG2, PDGFRα, SOX10, SPON1, FAM181B, TIMP4, SOX6, GRIK3, LHFPL3, KLF9, an A2B5 antigen, CNP, and PLP, preferably on mRNA basis.

The cell aggregate including glial progenitor cells in an embodiment is characterized by (III) including cells expressing one or more markers selected from the group consisting of DCX, βIII tubulin, MAP2, ELAVL3, NTRK2, GRIA2, PTPRO, and EPHA3.

The cell aggregate including glial progenitor cells in an embodiment is characterized by (IV) including cells expressing one or more markers selected from the group consisting of SOX1, SOX2, NESTIN, MEIS1, MEIS2, DLL3, and ASCL1.

The cell aggregate including glial progenitor cells in an embodiment (V) has an ability to differentiate into a cell population including:
  (i) cells expressing one or more markers selected from the group consisting of an O4 antigen, GalC, MBP, APC, GSTπ, CNP, PLP, OLIG2, SOX10, PDGFRα, and NG2;
  (ii) cells expressing one or more markers selected from the group consisting of βIII tubulin, MAP2, and ELAVL3; and
  (iii) cells expressing one or more markers selected from the group consisting of SLC1A3, S100B, AQP4, GFAP, and NG2.

The cell aggregate including glial progenitor cells in an embodiment is characterized by having an ability to differentiate into a cell population including at least 5% or more, preferably approximately 5% to 20% of O4-positive cells through the above culture.

The cell aggregate including glial progenitor cells in an embodiment is characterized by having an ability to differentiate into a cell population including at least 10% or more, preferably approximately 10% to 50% of APC-positive cells through the above culture.

The cell aggregate including glial progenitor cells in an embodiment is characterized by having an ability to differentiate into a cell population including at least 10% or more, preferably approximately 10% to 40% of GFAP-positive cells through the above culture.

The cell aggregate including glial progenitor cells in an embodiment is characterized by having an ability to differentiate into a cell population including at least 15% or more, preferably approximately 15% to 50% of βIII tubulin-positive cells through the above culture.

The cell aggregate including glial progenitor cells in an embodiment is characterized by having an ability to differentiate into a cell population including at least 10% or more, preferably approximately 10% to 30% of Hu-positive cells through the above culture.

The cell aggregate including glial progenitor cells in an embodiment is characterized by (VI) expressing one or more markers selected from C1ORF61 and SERPINE2 on mRNA basis.

The cell aggregate including glial progenitor cells in an embodiment (VII) further has at least one characteristic of the following (A) to (C):
  (A) 60% or more, preferably 70% or more, more preferably 70% to 90%, even more preferably 75% to 85% of cells to the total of the cells constituting the cell aggregate are expressing NFIA;
  (B) 10% or more, preferably 20% or more, more preferably 20% to 50%, even more preferably 20% to 40% of cells to the total of the cells constituting the cell aggregate are expressing OLIG2; and
  (C) 20% or more, preferably 30% or more, more preferably 30% to 60%, even more preferably 30% to 50% of cells to the total of the cells constituting the cell aggregate are expressing one or more markers selected from HEY2, C1ORF61, FAM181B, NFIA, NFIB, ITM2B, LHFPL3, and MLC1.

Here, the ratio of cells positive for each marker can be calculated by counting the number of cells stained with immunostaining or gene expression analysis on single-cell basis.

The cell aggregate including glial progenitor cells in an embodiment (VIII) includes no pluripotent stem cell. Inclusion of no pluripotent stem cell can be confirmed by, as an indicator, no expression or decreased expression levels of both OCT3/4 and NANOG on mRNA basis or protein basis. Specifically, for example, if the expression level of OCT3/4 has decreased by 200 times or more as compared with that in iPS cells and/or the expression level of NANOG has decreased by 400 times or more as compared with that in iPS cells, the decrease(s) can be used as the indicator.

The cell aggregate including glial progenitor cells in an embodiment is characterized by (IX) having differentiated to such a degree that PAX6 is not expressed. This can be confirmed by, as an indicator, no expression or a decreased expression level of PAX6 on mRNA basis or protein basis. Specifically, for example, if the expression level of PAX6 has decreased by 10 times or more at a timing of recovery of a cell aggregate for transplantation after performing step (4) or (5) (e.g., on day 49 of differentiation in Examples of the present application) as compared with that at a timing of initiating step (3) (e.g., on day 14 of differentiation in Examples of the present application), the decrease can be used as the indicator.

The cell aggregate including glial progenitor cells in an embodiment may be (X) a spherical cell aggregate with a diameter of approximately 100 µm to 800 µm, and the diameter may be, for example, approximately 100 µm to 300 µm, approximately 200 µm to 400 µm, or approximately 400 µm to 600 µm. The number of cells per cell aggregate may be approximately 1000 to 100000, and is preferably approximately 3000 to 50000, and more preferably approximately 3000 to 30000.

The cell aggregate including glial progenitor cells in an embodiment has at least two, at least four, at least six, at least eight, or all of (I), (II), (III), (IV), (V), (VI), (VII), (VIII), (IX), and (X) in the above.

The cell aggregate including glial progenitor cells in an embodiment includes cells expressing or secreting one or more markers selected from the group consisting of SPARCL1, MIF, MCP-1, IL-8, SCF, M-CSF, HGF, GRO-α, LIF, IFN-γ, and TRAIL, or cells for which the markers are detected in the culture supernatant for the cell aggregate. It is preferable that the cell aggregate including glial progenitor cells in an embodiment include cells expressing or secreting one or more markers selected from the group consisting of SPARCL1, MIF, MCP-1, IL-8, SCF, M-CSF, HGF, and GRO-α, or cells for which the markers are detected in the culture supernatant for the cell aggregate, and it is more preferable that the cell aggregate including glial progenitor cells in an embodiment include cells expressing or secreting one or more markers selected from the group consisting of SPARCL1, MIF, MCP-1, SCF, M-CSF, and HGF, or cells for which the markers are detected in the culture supernatant for the cell aggregate.

In an embodiment, if SPARCL1 is detected in the culture supernatant for the cell aggregate including glial progenitor cells, 0.1 ng or more, preferably 1 ng or more, more preferably 10 ng or more of SPARCL1 is detected per 1000 cells, for example, after 48-hour culture. In an embodiment, 0.1 ng to 1000 ng, preferably 1 ng to 1000 ng, more preferably 10 ng to 60 ng of SPARCL1 is detected per 1000 cells.

In an embodiment, if MIF is detected in the culture supernatant for the cell aggregate including glial progenitor cells, 0.1 pg or more, preferably 0.2 pg or more, more preferably 0.5 pg or more of MIF is detected per 1000 cells, for example, after 48-hour culture. In an embodiment, 0.1 pg to 100 pg, preferably 0.1 pg to 10 pg, more preferably 0.5 pg to 5 pg of MIF is detected per 1000 cells.

In an embodiment, if MCP-1 is detected in the culture supernatant for the cell aggregate including glial progenitor cells, 0.1 pg or more, preferably 0.2 pg or more, more preferably 0.5 pg or more of MCP-1 is detected per 1000 cells, for example, after 48-hour culture. In an embodiment, 0.1 pg to 100 pg, preferably 0.1 pg to 10 pg, more preferably 0.5 pg to 8 pg of MCP-1 is detected per 1000 cells.

In an embodiment, if SCF is detected in the culture supernatant for the cell aggregate including glial progenitor cells, 0.001 pg or more, preferably 0.01 pg or more, more preferably 0.02 pg or more of SCF is detected per 1000 cells, for example, after 48-hour culture. In an embodiment, 0.001 pg to 10 pg, preferably 0.01 pg to 1 pg, more preferably 0.02 pg to 0.2 pg of SCF is detected per 1000 cells.

In an embodiment, if M-CSF is detected in the culture supernatant for the cell aggregate including glial progenitor cells, 0.001 pg or more, preferably 0.005 pg or more, more preferably 0.01 pg or more of M-CSF is detected per 1000 cells, for example, after 48-hour culture. In an embodiment, 0.0001 pg to 10 pg, preferably 0.001 pg to 1 pg, more preferably 0.005 pg to 0.1 pg of M-CSF is detected per 1000 cells.

In an embodiment, if HGF is detected in the culture supernatant for the cell aggregate including glial progenitor cells, 0.0001 pg or more, preferably 0.001 pg or more, more preferably 0.01 pg or more of HGF is detected per 1000 cells, for example, after 48-hour culture. In an embodiment, 0.0001 pg to 10 pg, preferably 0.001 pg to 1 pg, more preferably 0.005 pg to 0.5 pg of HGF is detected per 1000 cells.

In an embodiment, if LIF is detected in the culture supernatant for the cell aggregate including glial progenitor cells, 0.0001 pg or more, preferably 0.001 pg or more, more preferably 0.01 pg or more of LIF is detected per 1000 cells, for example, after 48-hour culture. In an embodiment, 0.0001 pg to 10 pg, preferably 0.001 pg to 1 pg, more preferably 0.005 pg to 0.5 pg of LIF is detected per 1000 cells.

[Method for Producing Cell Population Including Oligodendrocytes, Astrocytes, and Neural Cells]

A mode of the method for producing a cell population including oligodendrocytes, astrocytes, and neural cells is performed by culturing a cell aggregate including glial progenitor cells with a maturation culture medium for 5 days to 60 days.

The "maturation culture medium" is a culture medium for glial cells and neural cells to mature, being a culture medium containing factors required for the maturation of glial cells and neural cells. The material to serve as a basal culture medium (minimal essential medium) is not limited as long as the basal culture medium is a culture medium that allows nervous system cells to survive, and may be in common with the neuron-and-glia-proliferating culture medium described above. Examples of the minimal essential medium include a culture medium obtained by adding supplements for culture of nervous system cells such as N2 and/or B27 to a minimal essential medium such as DMEM/F-12. However, it is desirable that growth factors that are contained in the neuron-and-glia-proliferating culture medium and primarily contribute to cell proliferation, such as FGF (e.g., FGF2), EGF, and PDGF (e.g., PDGF-AA), be not contained.

On the other hand, the maturation culture medium contains neurotrophic factors, thyroid hormones, and/or cytokines that contribute to differentiation into glial cells. Examples of the neurotrophic factors include NT-3. Examples of the thyroid hormones include T3. Examples of the cytokines include LIF.

For the maturation culture medium, for example, a culture medium containing, at least one, preferably two, more preferably all of T3, NT-3, and LIF can be used. As a maturation culture medium to be used for differentiation into astrocytes, a culture medium further containing CNTF can be used. Those factors may be added to a culture medium for use, and a culture medium blended with those factors may be used. The concentration of T3 in the maturation culture medium may be 5 ng/ml or more, and is preferably 30 ng/ml to 100 ng/ml, and more preferably 60 ng/ml to 100 ng/ml. The concentration of NT-3 in the maturation culture medium may be 10 ng/ml or more, and is preferably 10 ng/ml to 100 ng/ml, and more preferably 10 ng/ml to 50 ng/ml. The concentration of LIF in the maturation culture medium may be 10 ng/ml or more, and is preferably 10 ng/ml to 100 ng/ml, and more preferably 10 ng/ml to 50 ng/ml. Further, the concentration of CNTF in the maturation culture medium may be 5 ng/ml or more, and is preferably 10 ng/ml to 50 ng/ml, and more preferably 25 ng/ml to 50 ng/ml.

In the "cell population including oligodendrocytes, astrocytes, and neural cells" obtained by the method for producing a cell population including oligodendrocytes, astrocytes, and neural cells (the cell population of the present invention including oligodendrocytes, astrocytes, and neural cells), the content ratio of each cell type is not limited as long as the cell population includes the three types of cells: oligodendrocytes, astrocytes, and neural cells, as the cells constituting the cell population in a detectable manner. The cell population may be a cell aggregate having a three-dimensional structure (spherical) or a cell aggregate having a two-dimensional layered structure. The layered cell population can be produced by subjecting the cell aggregate including glial progenitor cells to adhesion culture in the presence of a cell adhesion factor such as Matrigel.

To detect each cell, for example, an immunohistological technique and gene analysis (such as RT-qPCR and RNA sequencing) can be used. In using gene analysis, mRNA contained in a cell aggregate and the expression level thereof can be identified in accordance with a method described in Example 2 herein.

The thus-obtained cell population of the present invention including oligodendrocytes, astrocytes, and neural cells may include oligodendrocyte progenitor cells, astrocyte progenitor cells, and neural progenitor cells, which are starting cells. The cell population preferably includes 50% or more, more preferably 70% or more of oligodendrocytes, astrocytes, and neural cells to the total number of the cells. The cell population includes 2% or more, preferably 5% to 50%, more preferably 10% to 40% of oligodendrocytes. Further, the cell population includes 10% or more, preferably 10% to 70%, more preferably 10% to 50% of astrocytes. Furthermore, the cell population includes 10% or more, preferably 20% to 60%, more preferably 30% to 50% of neural cells. Here, the total of oligodendrocytes, astrocytes, and neural cells does not exceed 100%, and accounts for 50% or more, preferably 70% or more of the total number of the cells included in the cell aggregate.

The cell population of the present invention including oligodendrocytes, astrocytes, and neural cells includes:
  (i) cells expressing one or more markers, preferably three or more markers, more preferably five or more markers, even more preferably all markers selected from the group consisting of an O4 antigen, GalC, MBP, APC, GSTπ, CNP, PLP, OLIG2, SOX10, PDGFRα, and NG2;
  (ii) cells expressing one or more markers, preferably two or more markers, more preferably all markers selected from the group consisting of βIII tubulin, MAP2, and ELAVL3; and
  (iii) cells expressing one or more markers, preferably two or more markers, more preferably three or more markers, even more preferably all markers selected from the group consisting of SLC1A3, S100B, AQP4, GFAP, and NG2.

The culture of the cell aggregate including glial progenitor cells may be suspension culture. The culture conditions are not limited, and may be conditions, for example, with a temperature of 35° C. to 37° C., preferably of 37° C., a humidity of 90% to 95%, preferably of 95%, a $CO_2$ concentration of 3% to 5%, preferably of 5%, and an O2 concentration of 10% to 20%, preferably of 20%. The culture vessel is not limited as long as it is a culture instrument for cell culture, and a flask or dish commonly used by those skilled in the art can be used. Examples thereof include Nunc™ EasYFlask™ Cell Culture Flasks (manufactured by Thermo Fisher Scientific Inc.) and Ultra-Low Attachment Culture Flasks (manufactured by Corning Incorporated).

[Pharmaceutical Composition]

Examples of a mode of the present invention include a pharmaceutical composition comprising, as an active ingredient, the cell aggregate of the present invention including glial progenitor cells, or the cell population of the present invention including oligodendrocytes, astrocytes, and neural cells, or a cell population for transplantation including cells derived from the cell aggregate or cell population. The cell aggregate of the present invention including glial progenitor cells is produced with the method of the present invention for producing a cell aggregate including glial progenitor cells. The cell population of the present invention including oligodendrocytes, astrocytes, and neural cells is produced with the method of the present invention for producing a cell population including oligodendrocytes, astrocytes, and neural cells.

The effective amount of the active ingredient depends on the purpose of administration, methods of administration, and the condition of the subject (e.g., sex, age, body weight, disease state), and can be, for example, $1 \times 10^4$ to $1 \times 10^8$, $1 \times 10^5$ to $3 \times 10^5$, $1 \times 10^6$ to $3 \times 10^6$, or $1 \times 10^7$ to $3 \times 10^7$ in number of cells.

The pharmaceutical composition in an embodiment may contain a pharmaceutically acceptable carrier in addition to an effective amount of the active ingredient. For the pharmaceutically acceptable carrier, physiological aqueous solvent (e.g., physiological saline, buffer, serum-free culture medium) can be used. In transplantation therapy, the pharmaceutical composition may contain, as necessary, a preservative, a stabilizer, a reducing agent, an isotonic agent, and so on that are commonly used, together with a drug containing a tissue or cells to be transplanted.

The cell aggregate for transplantation or cell population for transplantation can be produced as a cell suspension by suspending in suitable physiological aqueous solvent. If necessary, the cell population for transplantation may be cryopreserved with addition of a cryopreservative, thawed and washed with buffer before use, and used for transplantation therapy.

The cell population of the present invention for transplantation may be a suspension in which a cell aggregate has been suspended, or a suspension or sheet, for example, in which the cell aggregate has been dispersed into cells.

The cell population for transplantation obtained with the production method of the present invention can be prepared as a cell tissue structure as a three-dimensional tissue by performing step (4) in the method for producing a cell aggregate including glial progenitor cells and then three-dimensionally forming through culture on a scaffold.

As described later, the pharmaceutical composition of the present invention containing cells can be obtained in a serum-free manner, and hence does not contain any therapeutically problematic component such as a serum-derived component, and provides a significant effect of repairing the nervous system with injury in an injured site and recovering motor function through administration to a spinal cord injury model animal (e.g., a mouse). Accordingly, the pharmaceutical composition of the present invention is useful as a therapeutic drug for demyelinating diseases and diseases based on or involving glial cell dysfunction, for which there were previously no effective therapeutic means, and for acute-phase, subacute-phase, or chronic-phase diseases based on or involving glial cell dysfunction, such as acute-phase, subacute-phase, or chronic-phase spinal cord injury.

Moreover, the cell population for transplantation formed from the cell aggregate including glial progenitor cells as described herein is produced from established pluripotent stem cells, specified with markers or the like, and quality-controlled, which allows mass production of cell populations for transplantation with stable quality and use of them for transplantation. Since the cell population for transplantation can be stored, the cell population for transplantation can be prepared according to the date of transplantation for a patient.

The "demyelinating disease" is not limited as long as it is a dysfunction involving inflammation or atrophy of myelin forming myelin sheaths around the axons of neural cells. Examples of the demyelinating disease include spinal cord injury, multiple sclerosis, adrenoleukodystrophy, leukoencephalopathy with vanishing white matter, Pelizaeus-Merzbacher disease (congenital dysplasia of cortical white matter, in a broad sense), and leukodystrophy. Examples of the spinal cord injury include acute-phase spinal cord injury, subacute-phase spinal cord injury, and chronic-phase spinal cord injury.

The "disease involving glial cell dysfunction" (also referred to as "disease based on glial cells") is not limited as long as it is a disease involving dysfunctions of glial cells, specifically, one cell type or a plurality of cell types selected from the group consisting of astrocytes, oligodendrocytes, ependymal cells, and microglia. Specific examples of the disease involving glial cell dysfunction include spinal cord injury, cerebral infarction, neuropsychiatric diseases such as schizophrenia, demyelinating diseases, and neurodegenerative diseases. More specific examples thereof include many other neuropathies and neurodegenerative conditions including neuromyelitis optica, amyotrophic lateral sclerosis, Parkinson's disease, Alexander's disease, congenital dysplasia of cortical white matter, Huntington's disease, Alzheimer's disease and schizophrenia, progressive multifocal leukoencephalopathy (PML), encephalomyelitis (EPL), central pontine myelinolysis (CPM), Wallerian degeneration, adrenoleukodystrophy, macular hole, spinocerebellar degeneration, and multiple system atrophy. Among these diseases, those from the onset of which a specific period of time has passed are called chronic-phase demyelinating diseases or chronic-phase diseases involving glial cell dysfunction. For spinal cord injury, for example, many cases have been found in which, 3 to 6 months after injury, a very hard scar tissue is formed in an injured part and the pathological condition is fixed, and this pathological condition is called chronic-phase spinal cord injury.

Examples of injured condition of membrane tissue with glial cells in the disease involving glial cell dysfunction include condition with glial cells such as oligodendrocytes and astrocytes killed through degeneration.

[Therapeutic Method/Therapeutic Drug]

Examples of a mode of the present invention include a method for treating a demyelinating disease or disease based on or involving glial cell dysfunction, comprising: transplanting an effective amount of the cell aggregate of the present invention including glial progenitor cells, or the cell population of the present invention including oligodendrocytes, astrocytes, and neural cells, or a cell population for transplantation including cells derived from the cell aggregate or the cell population into a subject in need of transplantation. Here, the demyelinating disease or disease based on or involving glial cell dysfunction may be a chronic-phase demyelinating disease or chronic-phase disease based on or involving glial cell dysfunction. A dysfunction or disease from the onset of which a specific period of time has passed is determined as being in chronic phase, and, for chronic-phase spinal cord injury, for example, spinal cord injury 3 to 6 months or more after injury is determined as being in chronic phase.

The cell aggregate of the present invention including glial progenitor cells is useful for transplantation therapy for a demyelinating diseases or disease involving glial cell dysfunction. Thus, the present invention provides a therapeutic drug for a demyelinating disease or disease involving glial cell dysfunction, comprising the cell aggregate of the present invention or a cell population for transplantation including cells obtained from the cell aggregate.

In addition, the present invention provides a therapeutic method comprising administering (transplanting), to a patient, the therapeutic drug in a form of a cell aggregate or a suspension thereof, a suspension of dispersed cells, a suspension with a biodegradable biomaterial such as fibrin and hydrogel, or a cell tissue structure obtained by culturing any of them as a scaffold. The cell aggregate (cell population) of the present invention or a cell population for transplantation including cells obtained from the cell aggregate (cell population) can be used as a therapeutic drug for a demyelinating disease or disease involving glial cell dysfunction, or to replenish an injured site of concern for injured condition of tissue with the corresponding glial cells.

By transplanting the cell aggregate of the present invention or a cell population for transplantation including cells obtained from the cell aggregate into a patient with a demyelinating disease or disease involving glial cell dysfunction or with injured condition of tissue with glial cells, or by replenishing tissue itself for injured tissue with glial cells, the demyelinating disease or disease involving glial cell dysfunction or the injured condition of the tissue with glial cells can be treated.

While a problem of rejection due to difference in histocompatibility antigens often arises in transplantation therapy, the problem can be overcome by using pluripotent stem cells (e.g., induced pluripotent stem cells) established from somatic cells of a recipient in transplantation. That is, in a preferred mode of the present invention, a cell aggregate (cell population) that is immunologically autologous for a recipient is produced by using pluripotent stem cells (e.g., induced pluripotent stem cells) established from somatic cells of the recipient, and the cell aggregate (cell population) or a cell population for transplantation including cells obtained from the cell aggregate (cell population) is transplanted into the recipient.

It is also acceptable that an allogeneic (alien) cell aggregate (cell population) is produced by using pluripotent stem cells (e.g., induced pluripotent stem cells) established from somatic cells of another individual immunologically compatible (e.g., compatible with respect to HLA type or MHC type) with a recipient, and the cell aggregate (cell population) or a cell population for transplantation including cells obtained from the cell aggregate (cell population) is transplanted into the recipient.

Even in allotransplantation of cells, rejection can be avoided with production of the cell aggregate (cell population) of the present invention by using iPS cells in which expression of histocompatibility antigens (e.g., antigen proteins constituting HLA Class I and HLA Class II) or factors necessary for expression of the antigens is suppressed.

The pharmaceutical composition described above can be used as a therapeutic drug that is administered to or transplanted into a patient or a recipient in the therapeutic method of the present invention.

Examples of a mode of the present invention include use of the cell aggregate of the present invention including glial progenitor cells or the cell population of the present invention including oligodendrocytes, astrocytes, and neural cells for use in treating a demyelinating disease or disease based on or involving glial cell dysfunction.

[Method for Evaluating Toxicity or Drug Efficacy]

Examples of a mode of the present invention include a method for evaluating a toxicity or drug efficacy of a test substance, comprising contacting the test substance the cell aggregate of the present invention including glial progenitor cells or the cell population of the present invention including oligodendrocytes, astrocytes, and neural cells and detecting or quantifying an influence of the test substance on the cell aggregate or the cell population.

The cell aggregate of the present invention including glial progenitor cells and the cell population of the present invention including oligodendrocytes, astrocytes, and neural cells can be used as disease model cells for screening or drug efficacy evaluation for a therapeutic drug for a demyelinating disease or disease based or involving glial cell dysfunction (also referred to as glial disease, collectively) or a prophylactic drug therefor.

The cell aggregate of the present invention including glial progenitor cells and the cell population of the present invention including oligodendrocytes, astrocytes, and neural cells can be used as healthy model cells for safety test, stress test, toxicity test, adverse effect test, or infection or contamination test for chemicals or the like. Since the cell aggregate or cell population of the present invention includes glial progenitor cells such as oligodendrocyte progenitor cells and astrocyte progenitor cells, neural progenitor cells, oligodendrocytes, and astrocytes, the cell aggregate or cell population of the present invention can be used even for functional test for nerve tissues with these cells (central nervous system, spinal cord, neuromuscular junctions), specifically, functional evaluation for serotonergic neurons, motor neurons, and so on, and evaluation of proliferative capacity or differentiation potential for glial and neural progenitor cells.

Examples of the evaluation methods include stimulation/toxicity test such as apoptosis evaluation, and test to evaluate the influence of a chemical on normal differentiation from glial progenitor cells into glial cells (RT-PCR for various gene markers, analysis of expressed proteins by ELISA or the like for cytokines, phagocytotic ability test). For example, the cell aggregate or cell population of the present invention can be used for search for a compound that promotes differentiation potential into oligodendrocytes, or seek for a compound, protein, or the like that rescues a disease-specific phenotype for cells formed by differentiation of iPS cells derived from a patient with a demyelinating disease or glial disease.

For a cell material for these tests, for example, a plate obtained by dispersing the cells of the cell aggregate of the present invention and seeding the cells to adhere, a cell suspension, or a sheet or formed product thereof can be provided.

The cell aggregate of the present invention including glial progenitor cells, the cell population of the present invention including oligodendrocytes, astrocytes, and neural cells, or cells obtained by dispersing any of them can be used for extrapolation test to human or animal test.

[Novel Markers for Evaluating/Determining Cell Aggregate Including Glial Progenitor Cells]

Examples of a mode of the present invention include a method for determining whether a cell aggregate including glial progenitor cells is suitable for transplantation on the basis of, as an indicator, the presence or absence of expression of one or more markers selected from the group consisting of C1ORF61 and SERPINE2.

In the determination method of the present invention, whether expression of C1ORF61 or SERPINE2 is present can be determined by detecting the proteins or mRNA of these markers, or fragments thereof. Specifically, the determination method of the present invention in a mode comprises:

(1) a step of detecting a protein or a fragment thereof expressed in a cell aggregate sample, the protein being derived from one or more markers selected from the group consisting of C1ORF61 and SERPINE2; and (2) a step of determining the cell aggregate sample as a cell aggregate including glial progenitor cells suitable for transplantation if the expression level of the protein or fragment thereof derived from the marker(s) is more than a reference value.

Alternatively, the determination method of the present invention in a mode comprises:

(1) a step of detecting mRNA or a fragment thereof expressed in a cell aggregate sample, the mRNA being derived from one or more markers selected from the group consisting of C1ORF61 and SERPINE2; and (2) a step of determining the cell aggregate sample as a cell aggregate including glial progenitor cells suitable for transplantation if the expression level of the mRNA or fragment thereof derived from the marker(s) is more than a reference value.

Examples of a mode of the present invention include a method for identifying glial progenitor cells, or neural stem cells having high preference of differentiation into glia, comprising detecting one or more genes selected from the group consisting of C1ORF61 and SERPINE2, a protein encoded by any of the genes, or a fragment of any of the genes and protein. Here, "having high preference of differentiation into glia" indicates a character of neural stem cells to differentiate into glia with a high proportion (e.g., 30% or more) when terminal differentiation is induced in a maturation culture medium.

In the identification method of the present invention, whether expression of C1ORF61 or SERPINE2 is present can be determined by detecting the proteins or mRNA for these markers, or fragments thereof. Specifically, the identification method of the present invention in a mode comprises:

(1) a step of detecting a protein or a fragment thereof expressed in a cell population sample, the protein being derived from one or more markers selected from the group consisting of C1ORF61 and SERPINE2; and (2) a step of determining the cell population sample as glial progenitor cells or neural stem cells having high preference of differentiation into glia if the expression level of the protein or fragment thereof derived from the marker(s) is more than a reference value.

Alternatively, the identification method of the present invention in a mode comprises:

(1) a step of detecting mRNA or a fragment thereof expressed in a cell population sample, the mRNA being derived from one or more markers selected from the group consisting of C1ORF61 and SERPINE2; and (2) a step of determining the cell population sample as glial progenitor cells or neural stem cells having high preference of differentiation into glia if the expression level of the mRNA or fragment thereof derived from the marker(s) is more than a reference value.

Table 1 in the following lists genes shown herein and GenBank Accession Nos. thereof.

TABLE 1

| Gene name | GenBank Accession No. |
|---|---|
| ACTL6B | NM_016188, NR_134539 |
| AKR1C1 | NM_001353, XM_017015791 |
| APC | NM_000038, NM_001127510, NM_001127511, NM_001354895, NM_001354896 |
| AQP4 | NM_001650, NM_004028, NM_001317384, NM_001317387, NM_001364286 |
| ASCL1 | NM_004316 |
| ASPHD1 | NM_181718, XM_017023107, XM_024450222, XM_024450223 |
| ATCAY | NM_033064 |
| BDNF | NM_001143805, NM_001143806, NM_001143807, NM_001143808, NM_001143809 |
| C1ORF61 | NM_006365 |
| CCL2 (MCP-1) | NM_002982 |
| CELF4 | NM_020180, NM_001025087, NM_001025088, NM_001025089, NM_001330603 |
| CNTF | NM_000614 |
| CNP | NM_033133, NM_001330216, XM_011524340 |
| CSF1 (M-CSF) | NM_000757, NM_172210, NM_172211, NM_172212 |
| CSPG4 (NG2) | NM_001897 |
| CXCL1 (GRO-α) | NM_001511, NR_046035 |
| DCX | NM_001195553, NM_000555, NM_178151, NM_178152, NM_178153 |
| DKK | NM_012242 |
| DLL3 | NM_203486, NM_016941 |
| DYNC1I1 | NM_001135556, NM_004411, NM_001135557, NM_001278421, NM_001278422 |
| EGF | NM_001963, NM_001178130, NM_001178131, NM_001357021, XM_005262796 |
| ELAVL3 | NM_001420, NM_032281, XM_011527778, XM_024451410, XM_024451411 |
| EPHA3 | NM_005233, NM_182644, XM_005264715, XM_005264716 |
| ESRRB | NM_001379180, NM_004452 |
| FABP7 | NM_001446, NM_001319039, NM_001319041, NM_001319042 |
| FAM181B | NM_175885 |
| FGF2 | NM_001361665, NM_002006 |
| FKBP5 | NM_004117, NM_001145775, NM_001145776, NM_001145777 |
| GAPDH | NM_002046, NM_001256799, NM_001289745, NM_001289746, NM_001357943 |
| GDNF | NM_000514, NM_001190468, NM_001190469, NM_001278098, NM_199231 |
| GFAP | NM_002055, NM_001131019, NM_001242376, NM_001363846, XM_024450690 |
| GLIS1 | NM_001367484, NM_147193, XM_017000409, XM_017000410, XM_017000411 |
| GRIA2 | NM_001083619, NM_000826, NM_001083620, NM_001379000, NM_001379001 |
| GRIK3 | NM_000831 |
| GSK3B | NM_001146156, NM_002093, NM_001354596, XM_006713610, XR_002959518 |
| GSTP1 (GSTπ) | NM_000852 |
| HES4 | NM_021170, NM_001142467, XM_005244771 |
| HES5 | NM_001010926, XM_005244751 |
| HEY1 | NM_012258, NM_001040708, NM_001282851 |
| HEY2 | NM_012259, XM_017010627, XM_017010628, XM_017010629 |
| HGF | NM_000601, NM_001010931, NM_001010932, NM_001010933, NM_001010934 |
| HOXA4 | NM_002141 |
| HOXB3 | NM_001384749, NM_002146, NM_001330322, NM_001330323, NM_001384747 |
| HOXB4 | NM_024015 |
| HOXB6 | NM_018952, NM_001369397, XM_011524727 |
| HOXB8 | NM_024016, XM_005257286, XM_017024564 |

TABLE 1-continued

| Gene name | GenBank Accession No. |
|---|---|
| HOXD8 | NM_019558, NM_001199746, NM_001199747 |
| HS3ST3B1 | NM_006041, NR_130138, XM_017025479 |
| IFI44 | NM_006417, NR_135640, NR_135641, XM_005270380, XM_011540516 |
| IFI44L | NM_006820, NM_001375646, NM_001375647, NM_001375648, NM_001375649 |
| IFNG (IFN-γ) | NM_000619 |
| IGF1 | NM_000618, NM_001111283, NM_001111284, NM_001111285 |
| IL8 | NM_000584, NM_001354840 |
| IMPA2 | NM_014214, XM_011525659, XM_011525661 |
| ITM2B | NM_021999 |
| KCND3 | NM_004980, NM_172198, NM_001378969, NM_001378970 |
| KIF3C | NM_002254, XM_005264299 |
| KLF4 | NM_004235, NM_001314052 |
| KLF9 | NM_001206 |
| LAMA1 | NM_005559 |
| LHFPL3 | NM_199000, NM_001386065, XM_005250327 |
| LIF | NM_002309, NM_001257135, XM_024452239, XM_024452240 |
| LIN28 | NM_024674 |
| LINC00152 | NR_024204, NR_024205, NR_024206, NR_146460, NR_146461 |
| LMTK3 | NM_001080434, XM_011526411, XM_011526412 |
| MAG | NM_002361, NM_080600, NM_001199216 |
| MAP2 | NM_001039538, NM_001363910, NM_001363911, NM_001363913, NM_001375474 |
| MBP | NM_001025101, NM_002385, NM_001025081, NM_001025090, NM_001025092 |
| MEIS1 | NM_002398 |
| MEIS2 | NM_170675, NM_002399, NM_170674, NM_170676, NM_170677 |
| MGC12916 | NR_026880 |
| MIF | NM_002415 |
| MLC1 | NM_015166, NM_139202, NM_001376472, NM_001376473, NM_001376474 |
| MMRN1 | NM_007351, NM_001371403, XM_005262856 |
| MOG | NM_206809, NM_002433, NM_206810, NM_206811, NM_206812 |
| MYC | NM_002467, NM_001354870 |
| NANOG | NM_024865, NM_001297698 |
| NCAM | NM_000615, NM_001076682, NM_001242607, NM_001242608, NM_001386289 |
| NESTIN | NM_006617 |
| NFIA | NM_001134673, NM_005595, NM_001145511, NM_001145512, XM_011541512 |
| NFIB | NM_001190737, NM_005596, NM_001190738, NM_001282787, NM_001369458 |
| NGF | NM_002506 |
| NKX2.1 | NM_001079668, NM_003317 |
| NKX2.2 | NM_002509, XM_006723566 |
| NKX6.1 | NM_006168 |
| NKX6.2 | NM_177400, XM_017016789 |
| NTF3 (NT-3) | NM_001102654, NM_002527 |
| NTRK2 | NM_006180, NM_001007097, NM_001018064, NM_001018065, NM_001018066 |
| OLIG1 | NM_138983 |
| OLIG2 | NM_005806, XM_005260908 |
| PAX6 | NM_001368894, NM_000280, NM_001604, NM_001127612, NM_001258462 |
| PDGFA (PDGF-AA) | NM_002607, NM_033023 |
| PDGFRA | NM_006206, NM_001347827, NM_001347828, NM_001347829, NM_001347830 |
| PLP | NM_001128834, NM_199478, NM_000533, NM_001305004 |
| POU5F1 | NM_002701, NM_203289, NM_001173531, NM_001285986, NM_001285987 |
| PTPRO | NM_030667, NM_002848, NM_030668, NM_030669, NM_030670 |
| RSPO1 (R-spondin) | NM_001038633, NM_001242908, NM_001242909, NM_001242910 |
| S100B | NM_006272, XM_017028424 |
| SALL4 | NM_020436, NM_001318031, XM_005260467, XM_011528921, XM_011528922 |

TABLE 1-continued

| Gene name | GenBank Accession No. |
| --- | --- |
| SCF | NM_000899, NM_003994 |
| SERPINE2 | NM_001136528, NM_006216, NM_001136530, NR_073116, XM_005246641 |
| SFRP2 | NM_001010897, NM_001346980, NR_144535, XM_024449348, XM_024449349 |
| SHH | NM_000193, NM_001310462, NR_132318, NR_132319, XM_011516479 |
| SLIT1 | NM_003061 |
| SLC1A3 | NM_004172, NM_001166695, NM_001166696, NM_001289939, NM_001289940 |
| SLC8A2 | NM_015063, XM_005259172, XM_017027159 |
| SOX1 | NM_005986 |
| SOX2 | NM_003106 |
| SOX6 | NM_001367873, NM_017508, NM_033326, NM_001145811, NM_001145819 |
| SOX9 | NM_000346 |
| SOX10 | NM_006941 |
| SPARCL1 | NM_004684, NM_001128310, NM_001291976, NM_001291977 |
| SPON1 | NM_006108 |
| STXBP1 | NM_001032221, NM_003165, NM_001374306, NM_001374307, NM_001374308 |
| TIMP3 | NM_000362 |
| TIMP4 | NM_003256 |
| TUBB3 | NM_006086, NM_001197181 |
| TRAIL | NM_001190942, NM_001190943, NM_003810 |
| WNT3A | NM_033131, XM_011544319 |
| ZBTB20 | NM_001348800, NM_015642, NM_001164342, NM_001164343, NM_001164344 |

EXAMPLES

Hereinafter, the present invention will be described in detail with reference to Examples, but the present invention is never limited to these.

Example 1: Production of Cell Aggregate

A QHJI01 s04 strain, which is a clinical grade peripheral-blood-derived feeder-free iPS cell line established by Center for iPS Cell Research and Application, Kyoto University, was used as an iPS cell line. Before differentiation, the iPS cell line was subjected to maintenance culture in StemFit® AK03N culture medium (manufactured by Ajinomoto Co., Inc.) supplemented with laminin 511E8 fragment (iMatrix-511E8; manufactured by Nippi, Incorporated) (0.5 mg/ml).

To induce differentiation of iPS cells into neural progenitor cells, a serum-free aggregation/suspension culture method (SFEBq method) was used for embryoid body formation. Specifically, the QHJI01s04 strain subjected to maintenance culture was separated into single cells with 0.5× TrypLE Select (manufactured by Thermo Fisher Scientific Inc.)/0.25 mM EDTA (ethylenediaminetetraacetic acid)/PBS (phosphate-buffered saline, manufactured by Thermo Fisher Scientific Inc.), the cells were seeded on a 96-well low-attachment plate (product name: PrimeSurface® plate 96V, manufactured by Sumitomo Bakelite Co., Ltd.) at 9000 cells/well, and induction was initiated under 5% $CO_2$/5% $O_2$ at 37° C. on the day of seeding, as day 0 of differentiation. Half-volume culture medium exchange was performed every day by using an embryoid-body-forming culture medium (AK03N-C culture medium) supplemented with factors shown in Table 2.

TABLE 2

| Days after initiation of differentiation | Embryoid-body-forming culture medium | Factor |
| --- | --- | --- |
| Day 0 of differentiation | AK03N-C culture medium | 10 μM Y-27632 (manufactured by FUJIFILM Wako Pure Chemical Corporation), 3 μM SB431542 (manufactured by STEMGEN S.p.A.), 100 nM LDN-193189 (manufactured by STEMGEN S.p.A.), and 3 μM CHIR99021 (manufactured by STEMGEN S.p.A.) |
| Day 1 to 7 of differentiation | AK03N-C culture medium | 3 μM SB431542 (manufactured by STEMGEN S.p.A.), 100 nM LDN-193189 (manufactured by STEMGEN S.p.A.), and 3 μM CHIR99021 (manufactured by STEMGEN S.p.A.) |
| Day 7 to 14 of differentiation | AK03N-C culture medium | 1 μM retinoic acid (RA, Sigma-Aldrich Co. LLC) |

On day 14 of differentiation, embryoid bodies were collected from the 96-well plate, and washed once with DMEM/F-12 (product name: D-MEM/Ham's F-12; Dulbecco's Modified Eagle Medium: Nutrient Mixture F-12, manufactured by FUJIFILM Wako Pure Chemical Corporation). Thereafter, culture was performed for 7 days from day 14 to 21 of differentiation under 5% $CO_2$/20% $O_2$ at 37° C. in a low-attachment flask (product name: Ultra-Low Attachment 75 $cm^2$ Rectangular Canted Neck Cell Culture Flask with Vent Cap, manufactured by Corning Incorporated), with performing culture medium exchange once every 3 days under conditions 1, 2, 3, and 4 shown in Table 3.

TABLE 3

| Condition | Culture medium | Factor |
| --- | --- | --- |
| 1 | neuron-and-glia-proliferating culture medium | 1 μM retinoic acid (RA, Sigma-Aldrich Co. LLC) |
| 2 | neuron-and-glia-proliferating culture medium | 1 μM purmorphamine (PM, manufactured by Millipore Corporation) |
| 3 | neuron-and-glia-proliferating culture medium | 1 μM RA and 1 μM PM |
| 4 | AK03N-C culture medium | 1 μM RA and 1 μM PM |

A culture medium obtained by adding B27 supplement (manufactured by Thermo Fisher Scientific Inc.), N2 supplement (manufactured by Thermo Fisher Scientific Inc.), 60 ng/ml T3 (sodium salt of 3,3',5-triiodo-L-thyronine, manufactured by Sigma-Aldrich Co. LLC), 10 ng/ml PDGF-AA (Platelet-Derived Growth Factor-AA, manufactured by PeproTech, Inc.), 10 ng/ml IGF-1 (Insulin-like Growth Factor-1, manufactured by R&D Systems, Inc.), 10 ng/ml NT-3 (Neurotrophin-3, manufactured by PeproTech, Inc.), 10 μng/ml EGF (Epidermal Growth Factor, manufactured by PeproTech, Inc.), and 20 ng/ml FGF2 (Fibroblast Growth Factor 2, manufactured by PeproTech, Inc.) to DMEM/F-12 (3.151 g/L glucose, 15 mM HEPES, 2.5 mM L-glutamine, with 0.5 mM sodium pyruvate, manufactured by FUJIFILM Wako Pure Chemical Corporation) was used as the neuron-and-glia-proliferating culture medium in Table 3.

On day 21 of differentiation, embryoid bodies were collected and each dispersed into single cells with TrypLE Select, and the cells were then subjected to suspension culture (passage number: 1) with a neuron-and-glia-proliferating culture medium containing 1 μM PM in a tissue culture flask (manufactured by Thermo Fisher Scientific Inc.), with performing culture medium exchange once every 7 days. After 14 days, on day 35 of differentiation, dispersing into single cells was performed again, and thereafter suspension culture was performed (passage number: 2) with a neuron-and-glia-proliferating culture medium. Bright field images on day 35 and 49 of differentiation are shown in FIG. 1A.

To confirm terminal differentiation potential of the cell aggregates obtained on day 49 of differentiation, the cell aggregates were seeded as they were on an 8-well chamber slide glass (manufactured by IWAKI & CO., LTD.) treated with 1% Matrigel Matrix Basement Membrane Growth Factor Reduced (manufactured by Corning Incorporated) diluted with DMEM/F-12 and allowed to adhere on the Matrigel, and cultured with a maturation culture medium for 14 days for terminal differentiation. A culture medium obtained by adding B27 supplement, 1% non-essential amino acid (manufactured by Thermo Fisher Scientific Inc.), 60 ng/ml T3, 10 ng/ml NT-3, 25 ng/ml CNTF, and 10 ng/ml LIF to KBM Neural Stem Cell (manufactured by Kohjin Bio Co., Ltd.) was used as the maturation culture medium.

With cells on day 14 of terminal differentiation (on day 63 of differentiation), immunofluorescence staining was performed for various markers. In the immunofluorescence staining, six primary antibodies and fluorescence-labeled secondary antibodies corresponding thereto were used. Three primary antibodies were mixed together as shown in Table 4, and diluted with blocking solution to prepare two primary antibody solutions (primary antibody solution 1 and primary antibody solution 2). Similarly, three secondary antibodies were mixed together as shown in Table 4 with further addition of Hoechst 33342 (dilution rate: 1:1000, manufactured by DOJINDO LABORATORIES) for nuclear staining, and diluted with blocking solution to prepare two secondary antibody solutions (secondary antibody solution 1 and secondary antibody solution 2).

TABLE 4

| Primary antibody solution 1 | Secondary antibody solution 1 |
|---|---|
| mouse IgM O4 antibody (dilution rate: 1:500, manufactured by Millipore Corporation) | goat anti-mouse IgM* labeled with Alexa Fluor 488 |
| rat IgG2a anti-GFAP antibody (dilution rate: 1:1000, manufactured by Thermo Fisher Scientific Inc.) | goat anti-rat IgG* labeled with Alexa Fluor 555 |
| mouse IgG2b anti-βIII tubulin (Tuj1) antibody (antibody dilution rate: 1:500, manufactured by Sigma-Aldrich Co. LLC) | goat anti-mouse IgG2b* labeled with Alexa Fluor 647 |

| Primary antibody solution 2 | Secondary antibody solution 2 |
|---|---|
| mouse IgG3 anti-GalC antibody (dilution rate: 1:1000, manufactured by Thermo Fisher Scientific Inc.) | goat anti-mouse IgG3* labeled with Alexa Fluor 48 |
| rat IgG2a anti-MBP antibody (dilution rate: 1:1000, manufactured by Bio-Rad Laboratories, Inc.) | goat anti-rat IgG* labeled with Alexa Fluor 555 |
| mouse IgG1 anti-MAP2 antibody (dilution rate: 1:500, manufactured by Sigma-Aldrich Co. LLC) | goat anti-mouse IgG1* labeled with Alexa Fluor 647 |

| Primary antibody solution 3 | Secondary antibody solution 3 |
|---|---|
| mouse IgM O4 antibody (dilution rate: 1:500, manufactured by Millipore Corporation) | goat anti-mouse IgM* labeled with Alexa Fluor 488 |

TABLE 4-continued

| rat IgG2a anti-GFAP antibody (dilution rate: 1:1000, manufactured by Thermo Fisher Scientific Inc.) | goat anti-rat IgG* labeled with Alexa Fluor 555 |
|---|---|
| mouse IgG1 anti-MAP2 antibody (dilution rate: 1:500, manufactured by Sigma-Aldrich Co. LLC) | goat anti-mouse IgG1* labeled with Alexa Fluor 647 |

*dilution rate: 1:1000, manufactured by Thermo Fisher Scientific Inc.

In the immunofluorescence staining, on day 14 of terminal differentiation (on day 63 of differentiation), the cells obtained under each of conditions 1, 2, 3, and 4 were fixed with 4% paraformaldehyde (PFA, manufactured by FUJIFILM Wako Pure Chemical Corporation) at room temperature for 25 minutes, washed three times with PBS, and then incubated with 10% goat serum (manufactured by FUJIFILM Wako Pure Chemical Corporation)/PBS as blocking solution at room temperature for 1 hour. Thereafter, a primary antibody solution (primary antibody solution 1 or primary antibody solution 2) shown above in Table 4 was added, and incubation was performed at 4° C. overnight for containing. After that, washing was performed three times with PBS, the secondary antibody solution (secondary antibody solution 1 or secondary antibody solution 2) corresponding to the primary antibody solution was further added, and incubation was performed at room temperature for 1 hour. Thereafter, washing was performed three times with PBS, and the resultant was stored at 4° C.

Figure 1B:
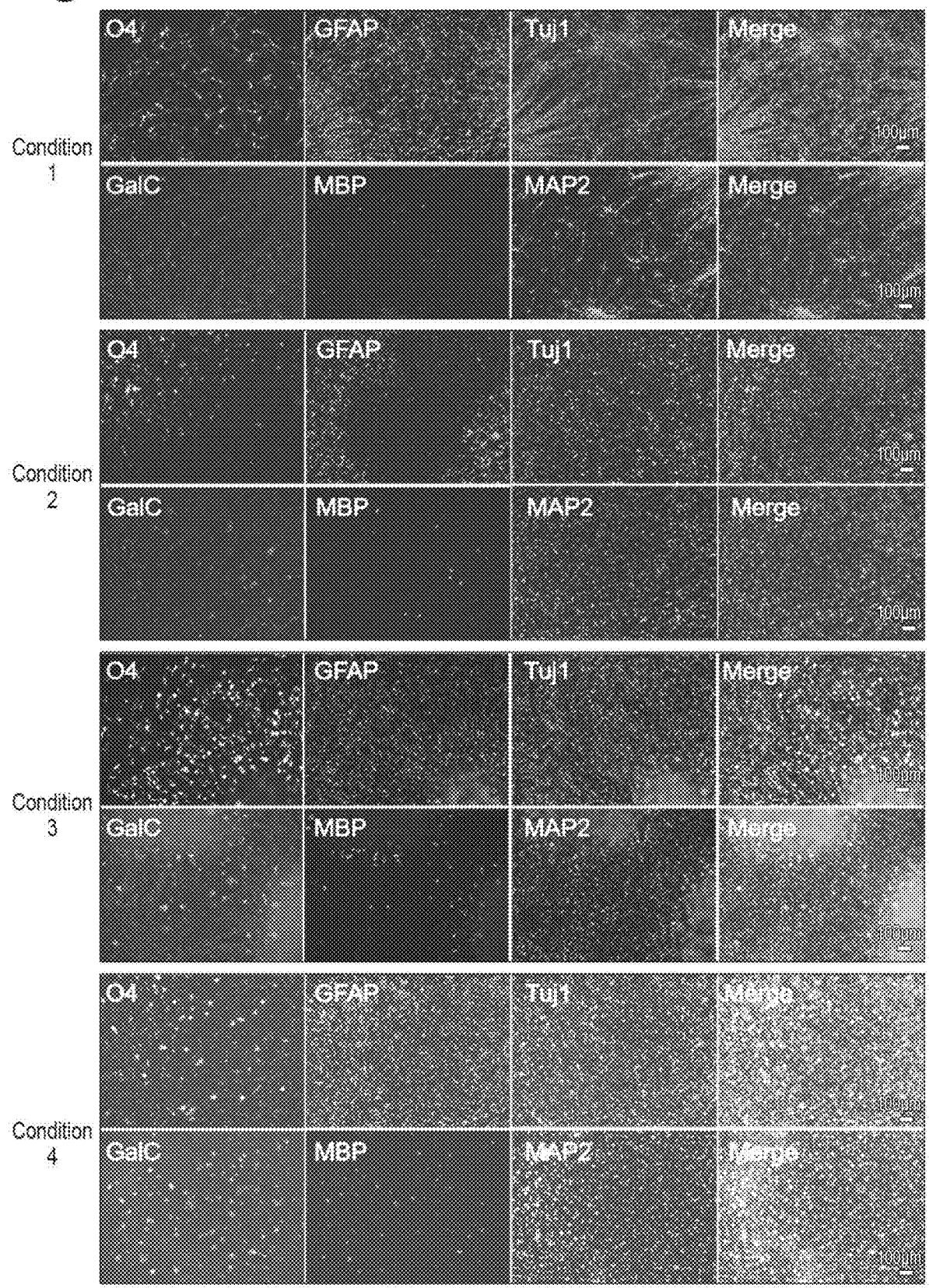
FIG. 1B shows fluorescence microscopy images showing results of immunofluorescence staining for cell aggregates including glial progenitor cells 14 days after terminal differentiation in Example 1.

Microscopy and image acquisition were performed by using the fluorescence microscope BZ-X710 (manufactured by KEYENCE CORPORATION). The immunofluorescence staining images are shown in FIG. 1B. Merge is an image obtained by overlapping three types of fluorescence. Although neurons, astrocytes, and oligodendrocytes were detected under any of conditions 1, 2, 3, and 4, it was revealed that condition 3 or 4 is the best condition from results that the forms of O4-positive cells were immature and GalC-positive cells were not detected, which indicated slow maturation, on day 14 of terminal differentiation under condition 1, and that a GFAP-non-positive cell population was detected under condition 2.

Figure 2:
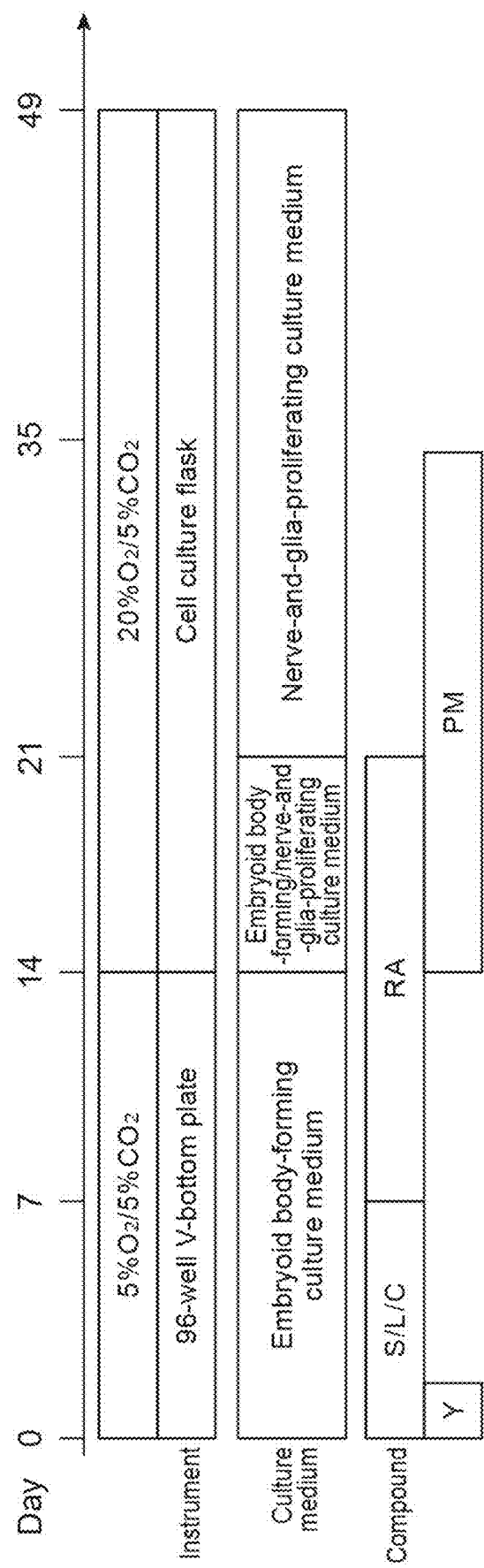
FIG. 2 shows a diagram illustrating an example of a protocol of the method for producing a cell aggregate including glial progenitor cells.

From these examinations, a method for producing a cell aggregate including glial progenitor cells was established (FIG. 2). In FIG. 2, the embryoid-body-forming culture medium is AK03N-C culture medium, the neuron-and-glia-proliferating culture medium is the above neuron-and-glia-proliferating culture medium, and S, L, C, Y, RA, and PM in Compound designate SB431542, LDN193189, CHIR99021, Y-27632, retinoic acid, and purmorphamine, respectively.

Example 2: Characterization of Cell Aggregates—Part 1 (Gene Expression Change During Induction of Differentiation To examine gene expression change during induction of differentiation, gene expression analysis by RNA-sequencing was carried out for intermediate products in induction of differentiation. Induction of differentiation was initiated with use of the QHJI01s04 strain in accordance with the method of condition 3 in Example 1, total RNA was extracted from cells before differentiation (iPS cell line), on day 7, 14, 21, and 35 of differentiation by using an easy Plus Mini kit (manufactured by QIAGEN), a library was prepared by using a TruSeq Stranded mRNA Library Prep kit from Illumina, Inc., and sequencing in 80 cycles was performed by using a HiSeq 2500. Gene expression analysis was performed with data of 30000000 or more reads per cell (FIGS. 3A to 3D).

Figure 3A:
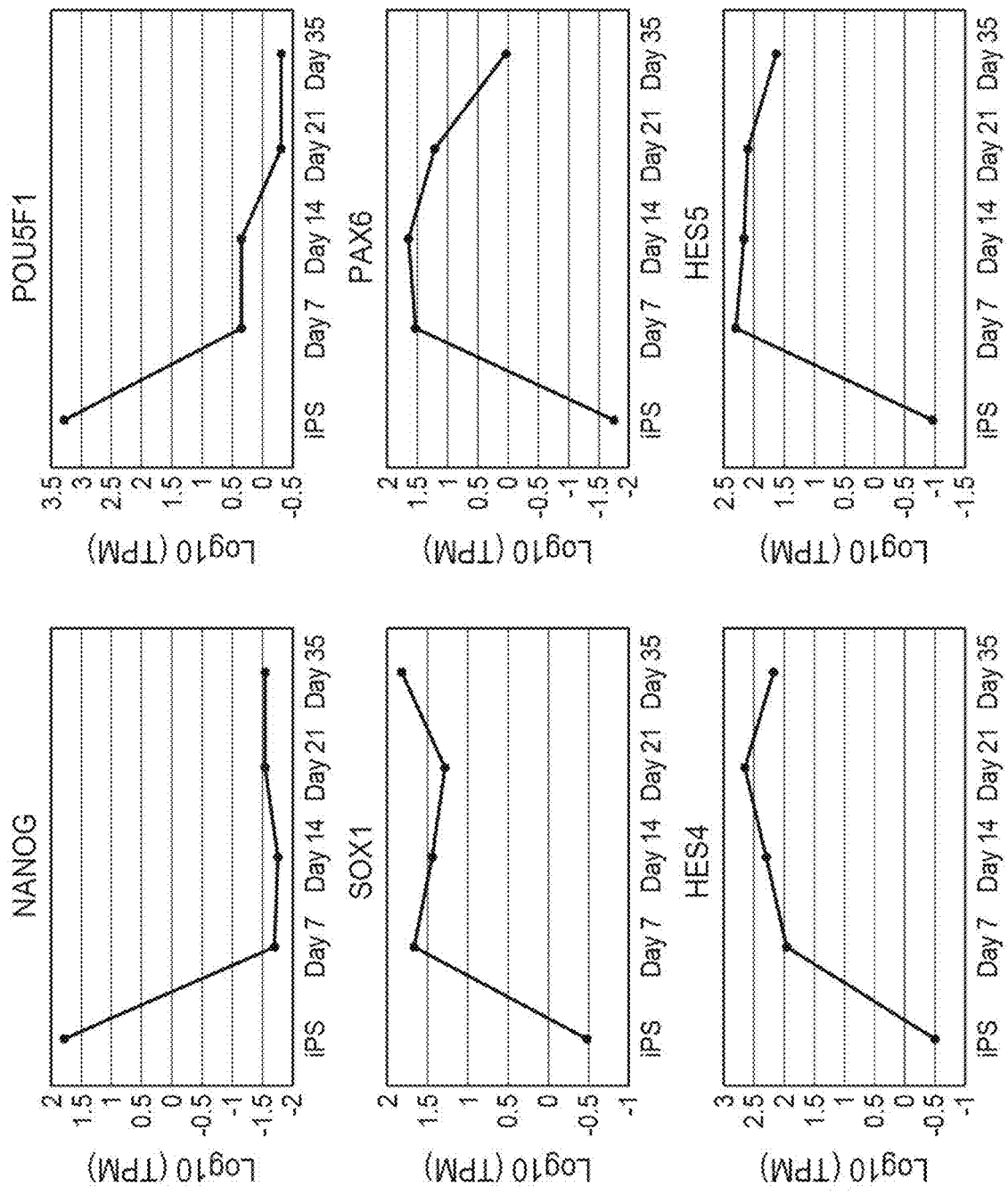
FIG. 3A shows results of gene expression analysis during induction of differentiation in Example 2.
Figure 3B:
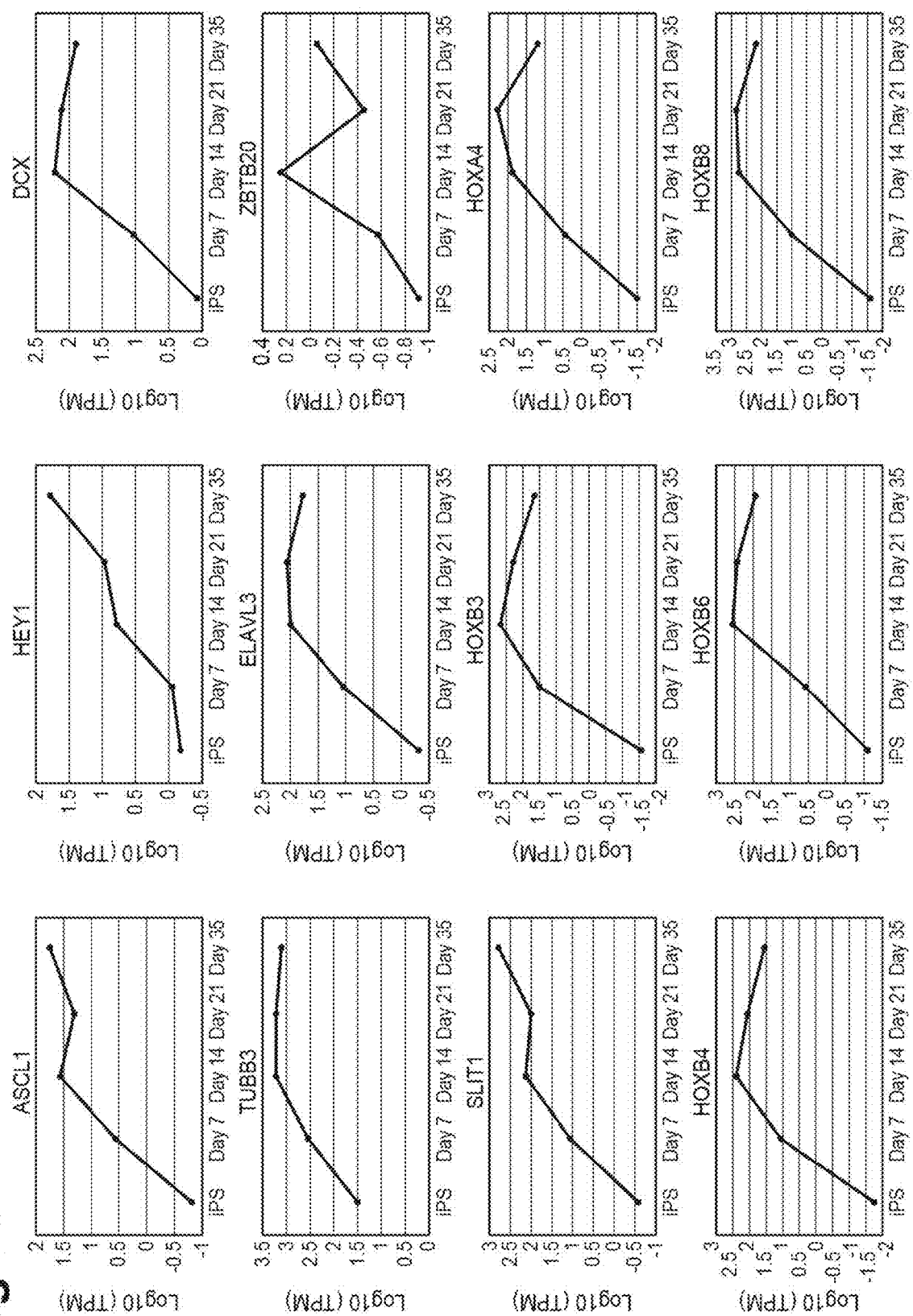
FIG. 3B shows results of gene expression analysis during induction of differentiation in Example 2.
Figure 3C:
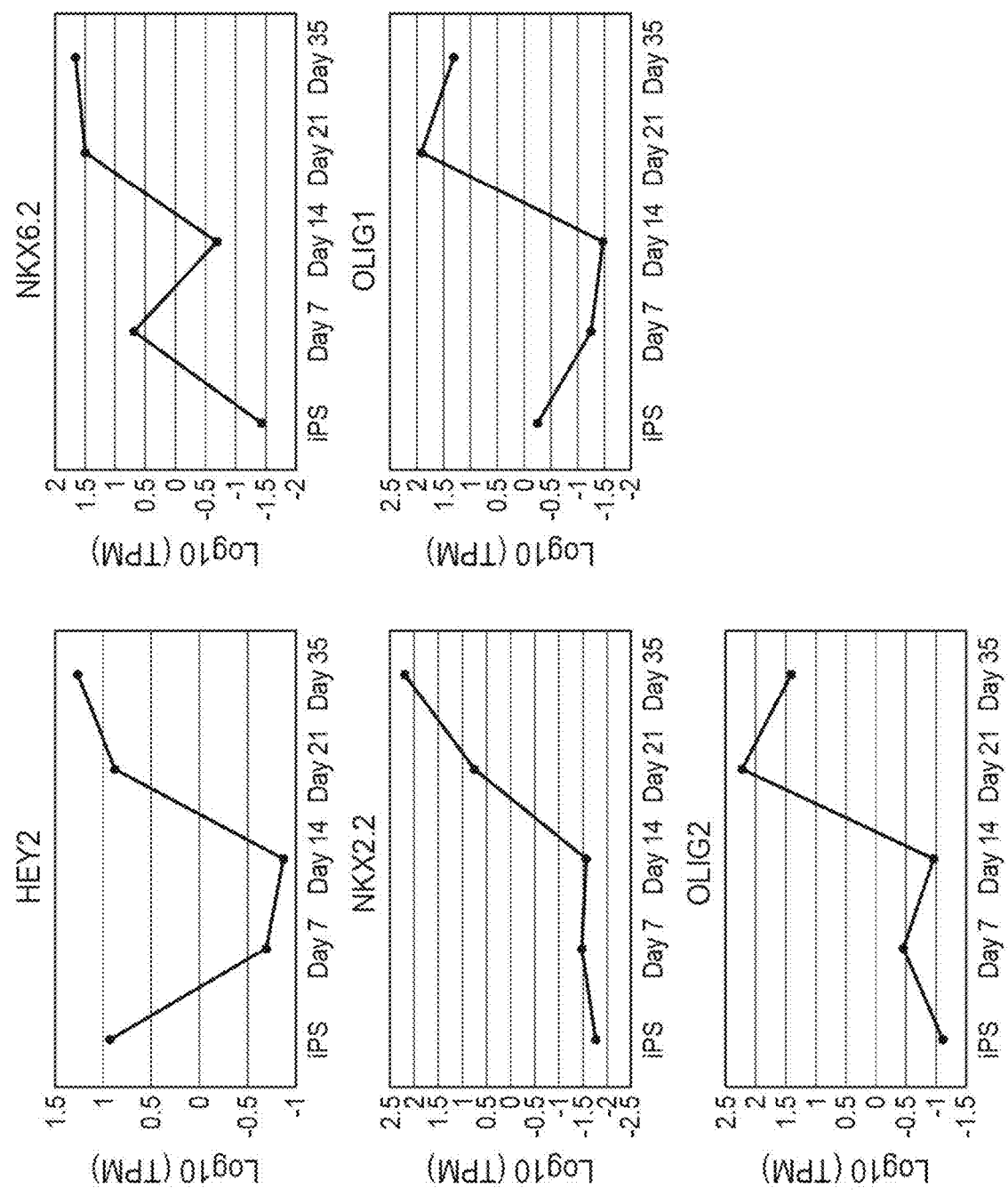
FIG. 3C shows results of gene expression analysis during induction of differentiation in Example 2.
Figure 3D:
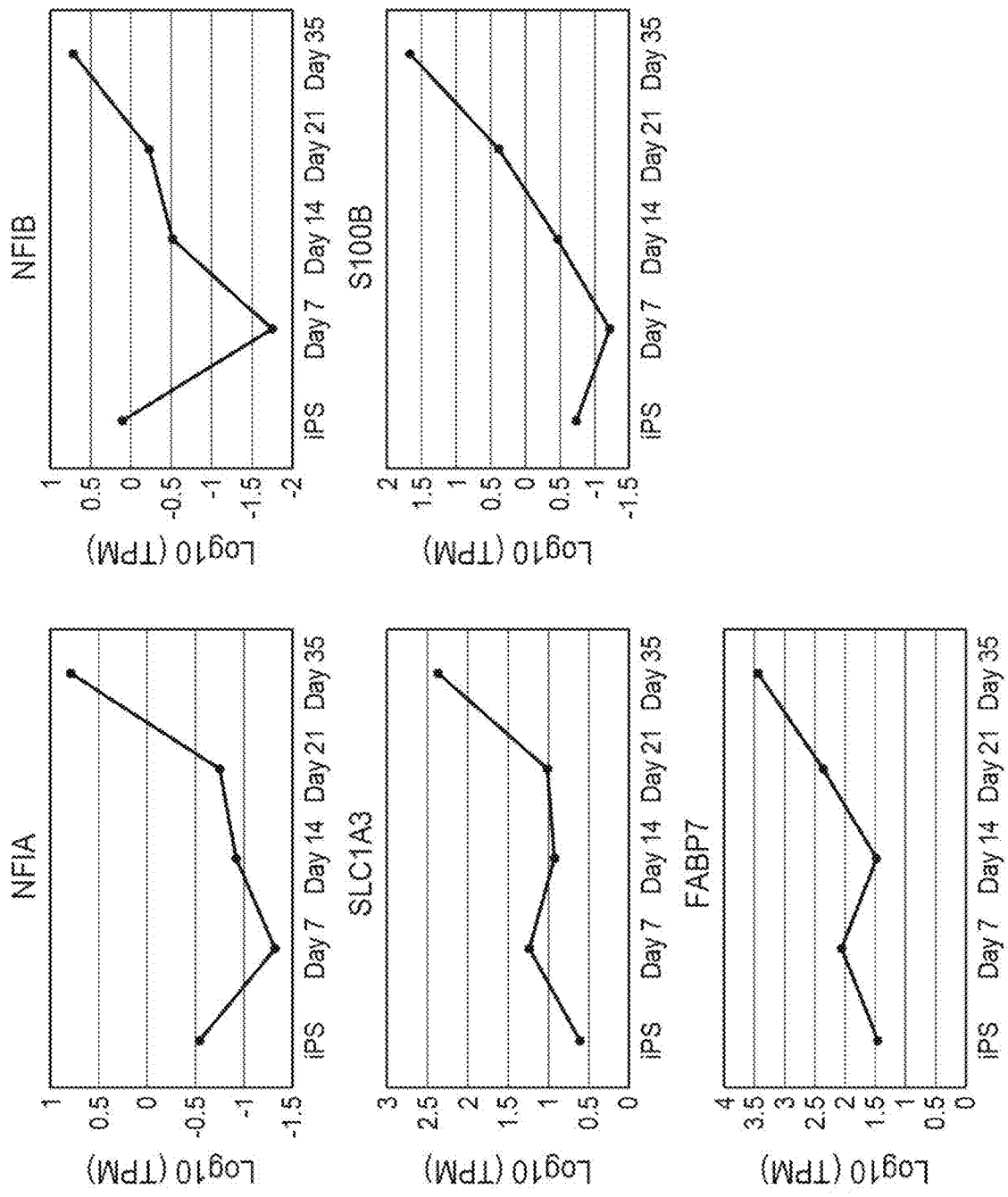
FIG. 3D shows results of gene expression analysis during induction of differentiation in Example 2.

Results of comparison of gene expression profiles before induction of differentiation (iPS cells) and on day 7 of differentiation found that the expression levels of the pluripotency markers NANOG and POU5F1 (OCT3/4) had significantly decreased on day 7 of differentiation, and the expression levels of the neural stem cell markers SOX1, PAX6, HES4, and HES5 had significantly increased on day 7 of differentiation (FIG. 3A). Results of comparison of gene expression profiles on day 7 of differentiation and on day 14 of differentiation found that genes with increased gene expression on day 14 of differentiation as compared with that on day 7 of differentiation were, for example, ASCL1, HEY1, DCX, βIII tubulin (TUBB3), ELAVL3, ZBTB20, SLIT1, HOXB3, HOXA4, HOXB4, HOXB6, and HOXB8 (FIG. 3B). Results of comparison of gene expression profiles on day 14 of differentiation and on day 21 of differentiation found that genes with increased gene expression on day 21 of differentiation as compared with that on day 14 of differentiation were, for example, HEY2, NKX6.2, NKX2.2, OLIG1, and OLIG2 (FIG. 3C). Results of comparison of gene expression profiles on day 21 of differentiation and on day 35 of differentiation found that genes with increased gene expression on day 35 of differentiation as compared with that on day 21 of differentiation were, for example, NFIA, NFIB, SLC1A3, S100B, and FABP7 (FIG. 3D). The expression level of PAX6 significantly decreased (FIG. 3A).

Example 3: Characterization of Cell Aggregates—Part 2 (Immunofluorescence Staining for Cell Aggregates)

Cell aggregates including glial progenitor cells were produced with use of an Ff-WJ14s01 strain, which is a cord-blood-derived feeder-free iPS cell line established by Center for iPS Cell Research and Application, Kyoto University, as an iPS cell line in accordance with the method of condition 3 in Example 1, and immunofluorescence staining for different differentiation markers were carried out. In the immunofluorescence staining, eight primary antibodies and fluorescence-labeled secondary antibodies corresponding thereto were used. Two or three primary antibodies were mixed together as shown in Table 5, and diluted with blocking solution to prepare three primary antibody solutions (primary antibody solution 1, primary antibody solution 2, and primary antibody solution 3). Similarly, two or three secondary antibodies were mixed together as shown in Table 5 with further addition of Hoechst 33342 (dilution rate: 1:1000, manufactured by DOJINDO LABORATORIES) for nuclear staining, and diluted with blocking solution to prepare three secondary antibody solutions (secondary antibody solution 1, secondary antibody solution 2, and secondary antibody solution 3).

TABLE 5

| Primary antibody solution 1 | Secondary antibody solution 1 |
| --- | --- |
| rat IgG2a anti-GFAP antibody (dilution rate: 1:1000, manufactured by Thermo Fisher Scientific Inc.) | donkey anti-rat IgG* labeled with Alexa Fluor 488 |
| mouse IgG1 anti-NESTIN antibody (dilution rate: 1:300, manufactured by Millipore Corporation) | goat anti-mouse IgG1* labeled with Alexa Fluor 555 |
| mouse IgG2b anti-βIII tubulin antibody (Tuj1) (antibody dilution rate: 1:500, manufactured by Sigma-Aldrich Co. LLC) | goat anti-mouse IgG2b* labeled with Alexa Fluor 647 |
| Primary antibody solution 2 | Secondary antibody solution 2 |
| mouse IgG2a anti-OLIG2 antibody (dilution rate: 1:300, manufactured by Millipore Corporation) | goat anti-mouse IgG2a* labeled with Alexa Fluor 488 |
| rabbit anti-PDGFRα antibody (dilution rate: 1:300, manufactured by Cell Signaling Technology, Inc.) | donkey anti-rabbit IgG labeled with Alexa Fluor 555 |
| mouse IgG2b anti-ELAVL3/4 antibody (dilution rate: 1:100, manufactured by Thermo Fisher Scientific Inc.) | goat anti-mouse IgG2b* labeled with Alexa Fluor 647 |
| Primary antibody solution 3 | Secondary antibody solution 3 |
| mouse IgG1 anti-MAP2 antibody (dilution rate: 1:500, manufactured by Thermo Fisher Scientific Inc.) | goat anti-mouse IgG1* labeled with Alexa Fluor 647 |
| rabbit anti-NFIA antibody (dilution rate: 1:100, manufactured by Sigma-Aldrich Co. LLC) | donkey anti-rabbit IgG* labeled with Alexa Fluor 555 |

*dilution rate: 1:1000, manufactured by Thermo Fisher Scientific Inc.

On day 77 of differentiation, cell aggregates were fixed with 4% PFA at room temperature for 20 minutes, and washed three times with PBS. The cells after fixing were subjected to freeze-embedding on dry ice by using O.C.T. compound (manufactured by Sakura Finetek Japan Co., Ltd.) to produce frozen sections of 10 μm in thickness, which were stored at −80° C. The frozen sections were washed once with PBS, and then incubated with 10% goat serum (manufactured by FUJIFILM Wako Pure Chemical Corporation)/PBS as blocking solution at room temperature for 1 hour. Thereafter, a primary antibody solution (primary antibody solution 1, primary antibody solution 2, or primary antibody solution 3) shown above in Table 5 was added, and incubation was performed at 4° C. overnight for containing. Then, washing was performed three times with PBS, the secondary antibody solution (secondary antibody solution 1 or secondary antibody solution 2 or secondary antibody solution 3) corresponding to the primary antibody solution was further added, and incubation was performed at room temperature for 1 hour. After mounting with the mounting medium PermaFluor (manufactured by Thermo Fisher Scientific Inc.), the resultant was stored at 4° C.

Figure 4A:
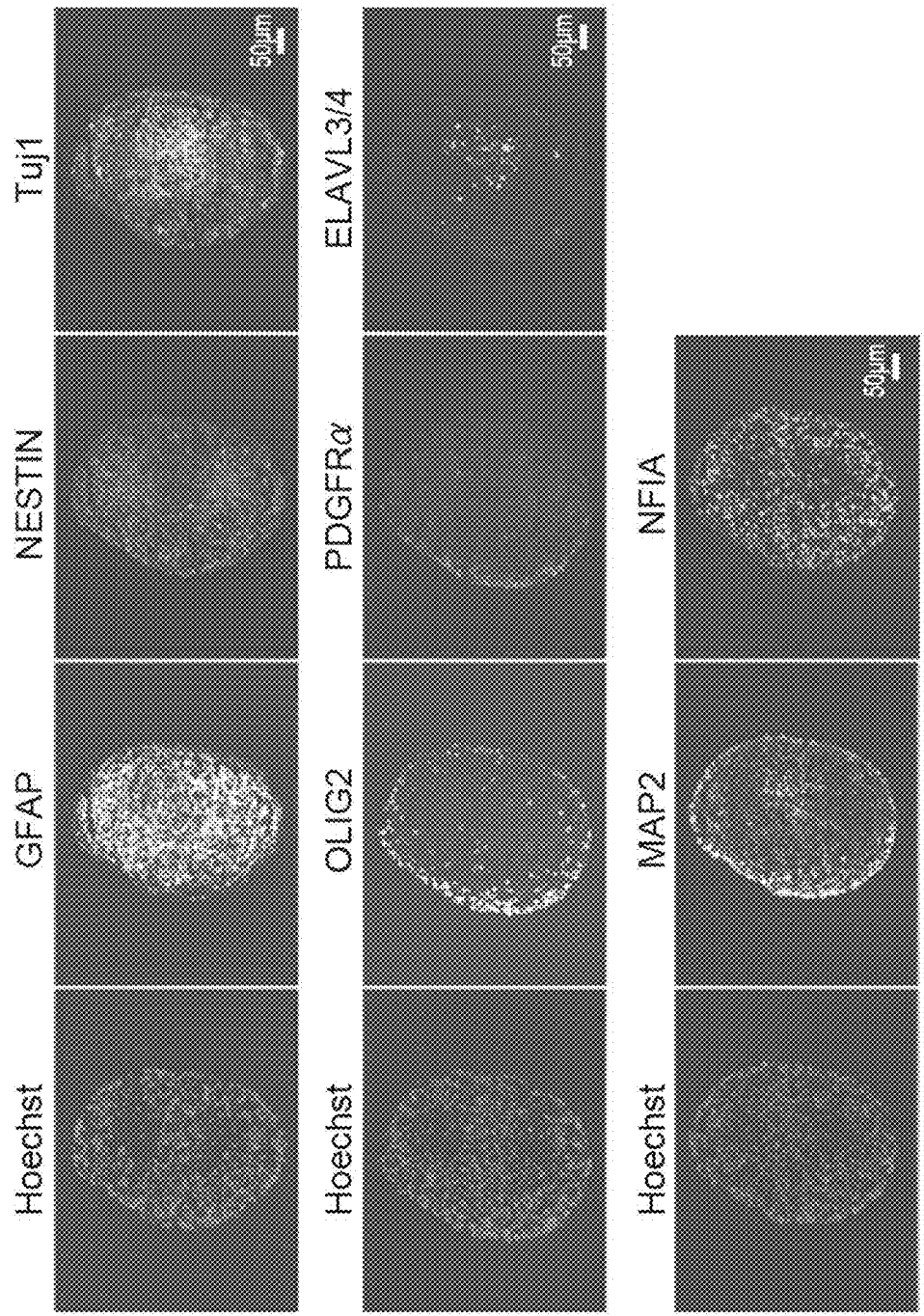
FIG. 4A shows fluorescence microscopy images showing results of immunofluorescence staining for cell aggregates including glial progenitor cells in Example 3.
Figure 4B:
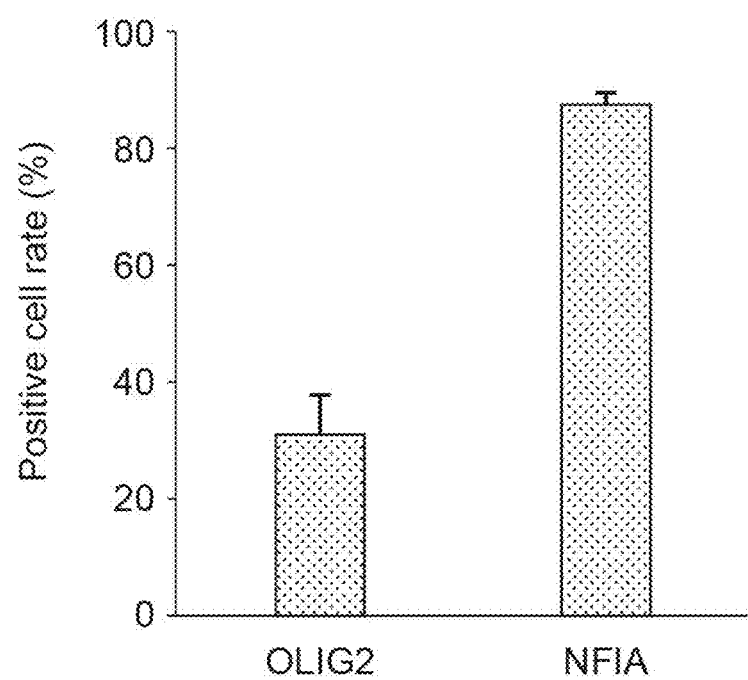
FIG. 4B shows a graph showing results of analysis of proportions of OLIG2-positive cells and NFIA-positive cells to the total number of cells constituting a cell aggregate including glial progenitor cells in Example 3.

Microscopy and image acquisition were performed by using the fluorescence microscope BZ-X710 (manufactured by KEYENCE CORPORATION). The immunofluorescence staining images are shown in FIG. 4A. GFAP-positive cells, NESTIN-positive cells, Tuj1-positive cells, OLIG2-positive cells, ELAVL3-positive cells, MAP2-positive cells, and NFIA-positive cells were found. The proportions of OLIG2-positive cells and NFIA-positive cells to the total number of cells constituting one sphere (cell aggregate) were quantified with analysis software (BZ-H3C) attached to the BZ-X710, and the averages for six spheres were calculated. The results showed that OLIG2-positive cells and NFIA-positive cells were present in proportions of 30.9±6.6% and 87.6±1.8%, respectively (FIG. 4B).

Example 4: Characterization of Cell Aggregates—Part 3 (Single-Cell Gene Expression Analysis)

Genes characteristic to cell aggregates including glial progenitor cells were searched. For cell aggregates including glial progenitor cells produced from the Ff-WJ14s01 strain in accordance with the method of condition 3 in Example 1 (Gliogenic NPC) and cell aggregates produced from the Ff-WJ14s01 strain in accordance with a method of Non Patent Literature 2 (Neurogenic NPC), which included many cells having high preference of differentiation into nerves, single-cell RNA-sequencing (RamDA-seq) was performed in accordance with a method described in "Hayashi et al., Nature Communications, volume 9, Article number 619 (2018)". Sequencing in Single-End mode in 50 cycles was performed by using a HiSeq 2500 from Illumina, Inc. Gene expression analysis was performed for 150 Gliogenic NPCs and 91 Neurogenic NPCs (241 NPCs in total) that passed quality evaluation.

Figure 5:
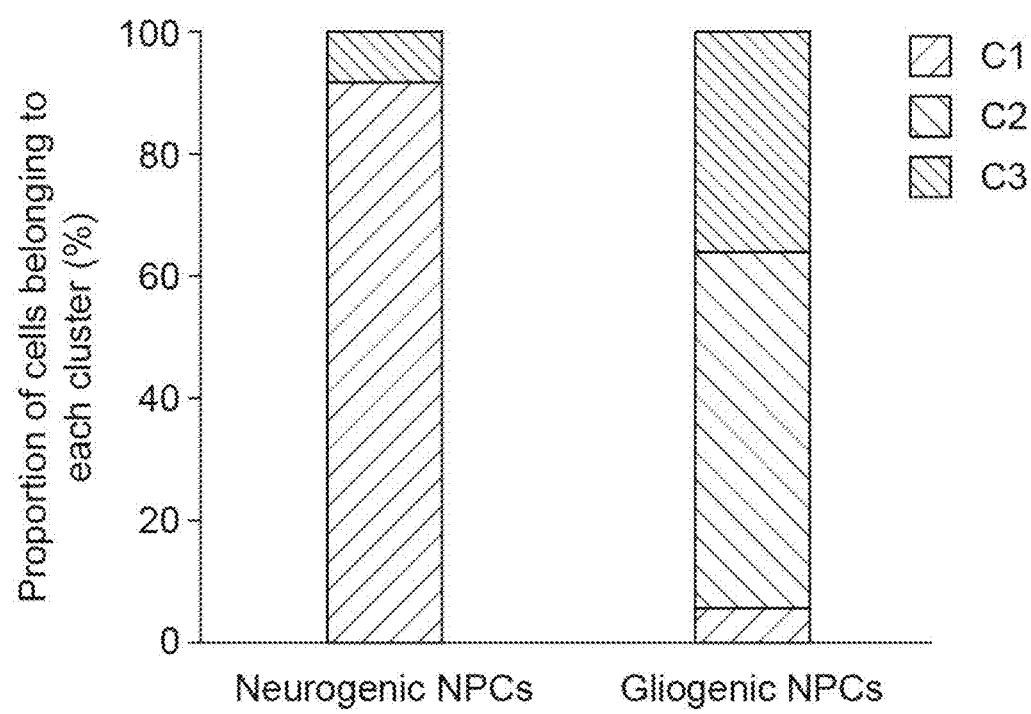
FIG. 5 shows a graph showing proportions of the numbers of cells belonging to different clusters in Gliogenic NPCs and Neurogenic NPCs in Example 4.

From the gene expression profiles, the 241 cells were classified into three clusters (C1 to C3). Among the Neurogenic NPCs analyzed, 91.2% of the total number of cells were classified into C1, 8.8% into C3, and no cell was classified into C2. Among the Gliogenic NPCs analyzed, 5.3% of the total number of cells were classified into C1, 58.0% into C2, and 36.7% into C3 (FIG. 5). Thus, it was suggested that the gene expression profile of Neurogenic NPCs and that of Gliogenic NPCs are largely different.

Figure 6A:
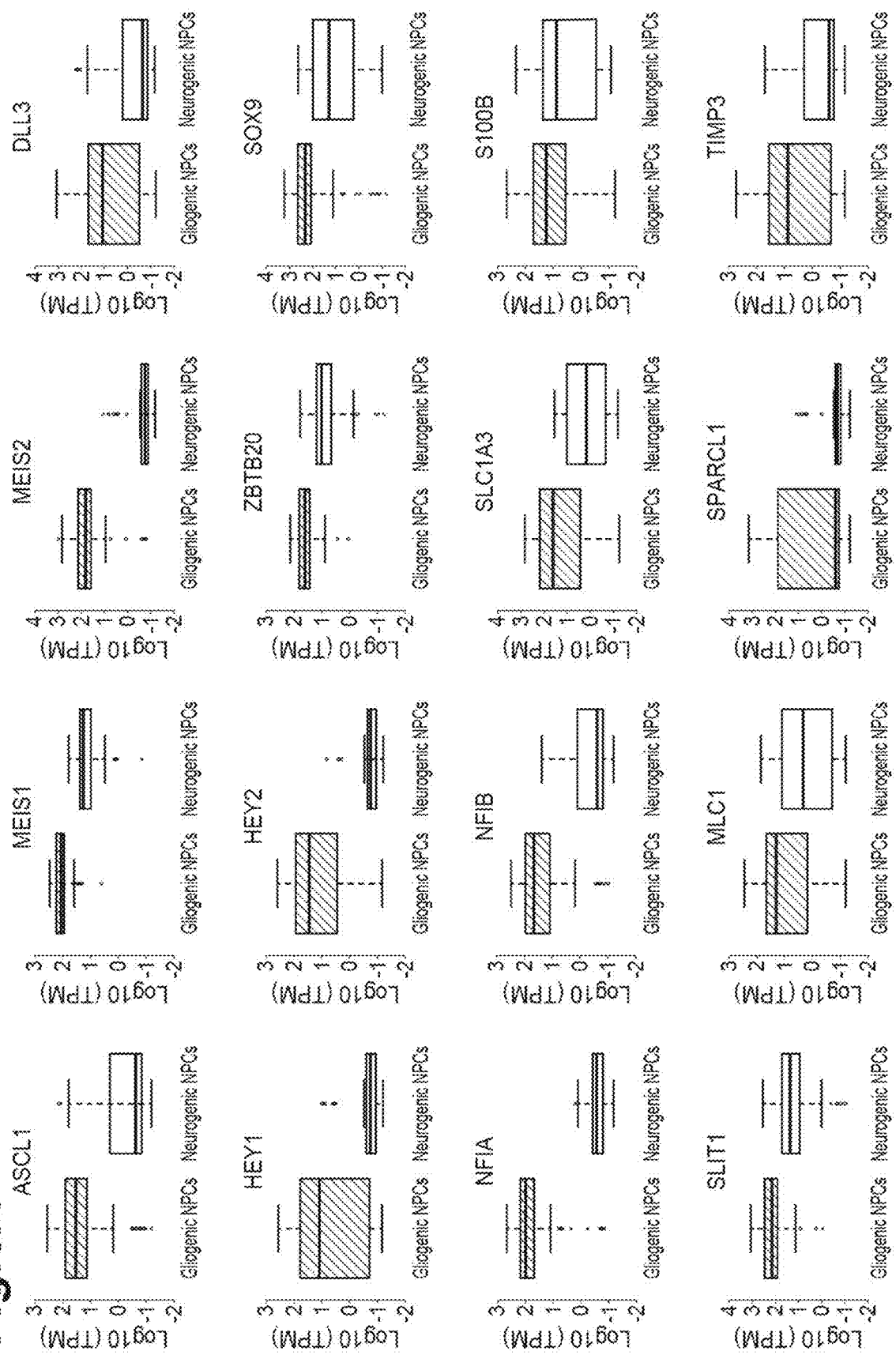
FIG. 6A shows graphs each showing the distribution of expression levels of a gene per cell in Gliogenic NPCs and Neurogenic NPCs in Example 4.
Figure 6B:
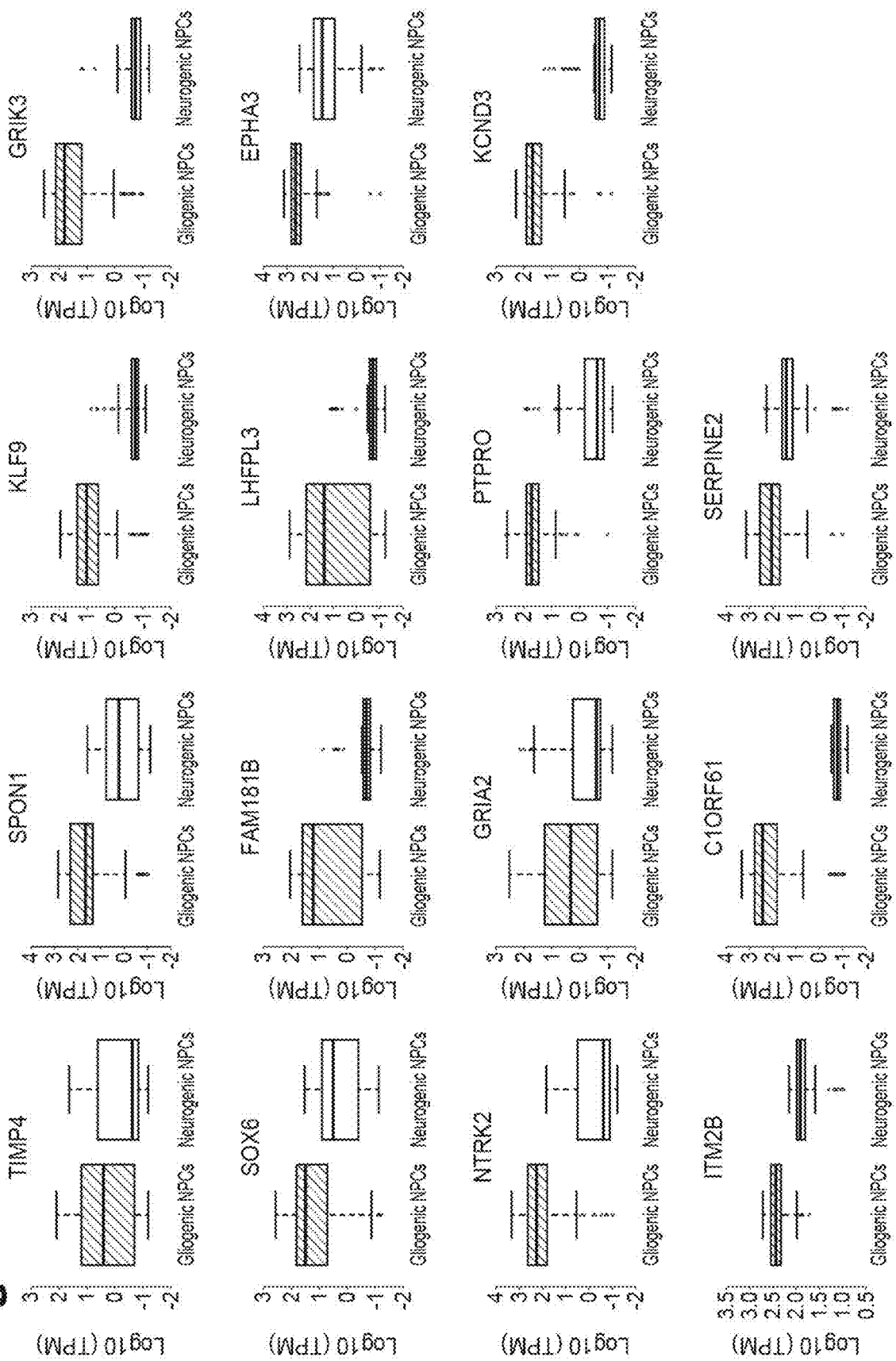
FIG. 6B shows graphs each showing the distribution of expression levels of a gene per cell in Gliogenic NPCs and Neurogenic NPCs in Example 4.

Genes that are characteristically expressed in each cluster (top 10 genes) are shown in Table 6. HEY2, C1ORF61, FAM181B, NFIB, ITM2B, NFIA, LHFPL3, and MLC1 were found to be genes that are highly expressed in cells belonging to C2 into which only Gliogenic NPCs were classified (Table 6, FIG. 6A, FIG. 6B). In addition, ASCL1, MEIS1, MEIS2, DLL3, HEY1, ZBTB20, SOX9, SLC1A3, S100B, SLIT1, SPARCL1, TIMP3, TIMP4, SPON1, KLF9, GRIK3, SOX6, EPHA3, NTRK2, GRIA2, PTPRO, KCND3, and SERPINE2 were found to be genes that are more highly expressed on Gliogenic NPCs than on Neurogenic NPCs (FIG. 6A, FIG. 6B). GenBank Accession Nos. of some of the genes listed in Table 6 are shown in Table 1. LOC541471 is described in Oncol Lett. 2019 February; 17(2): 2457-2464.

TABLE 6

| Cluster | C1 | C2 | C3 |
| --- | --- | --- | --- |
| Genes that are characteristically expressed in each cluster (top 10 genes) | ALK | HEY2 | ATCAY |
| | LAMA1 | C1ORF61 | AKR1C1 |
| | FKBP5 | FAM181B | ACTL6B |
| | MGC12916 | NFIB | CELF4 |
| | SFRP2 | ITM2B | SLC8A2 |
| | MMRN1 | NFIA | LMTK3 |
| | IMPA2 | LHFPL3 | KIF3C |
| | LOC541471 | MLC1 | STXBP1 |
| | HS3ST3B1 | IFI44L | DYNC1I1 |
| | LINC00152 | IFI44 | ASPHD1 |

Example 5: Characterization of Cell Aggregates—Part 4 (Evaluation of Terminal Differentiation Potential)

Figure 7A:
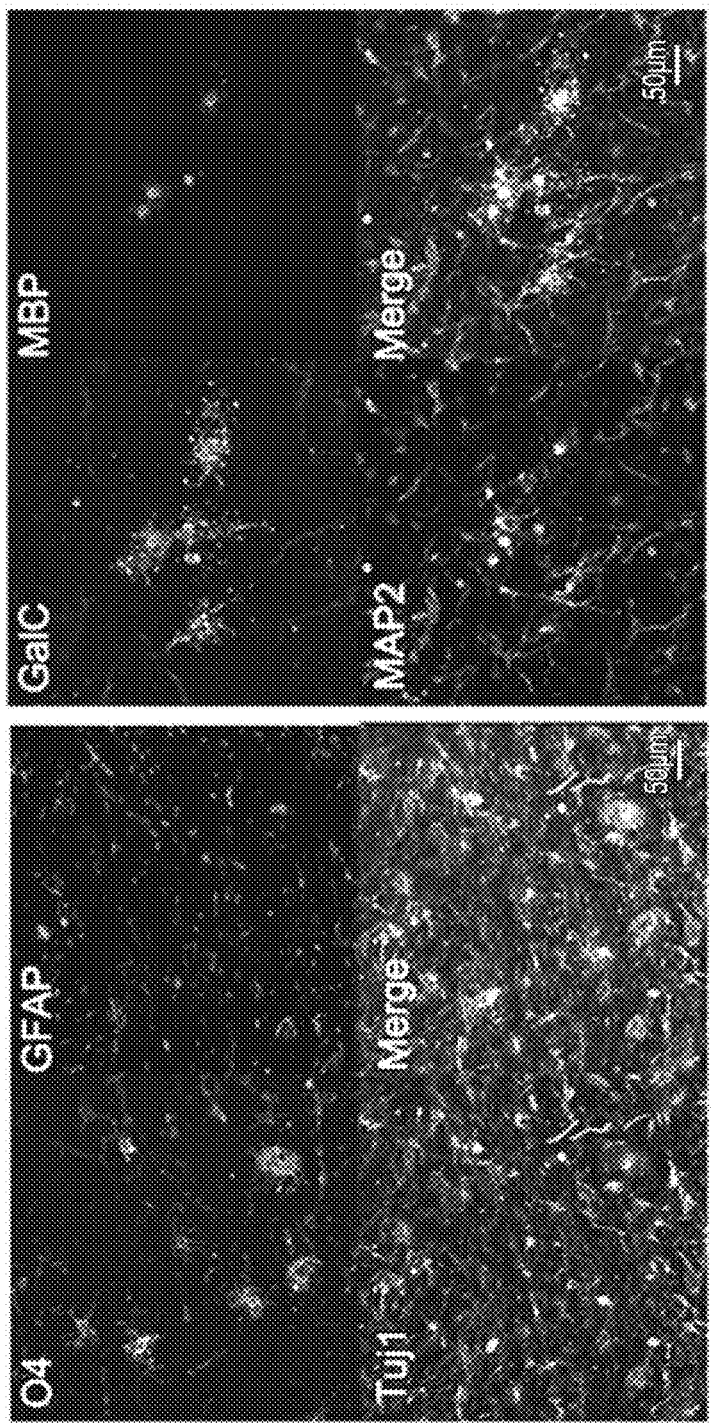
FIG. 7A shows fluorescence microscopy images showing results of immunofluorescence staining for cell aggregates including glial progenitor cells 31 days after terminal differentiation in Example 5.
Figure 7B:
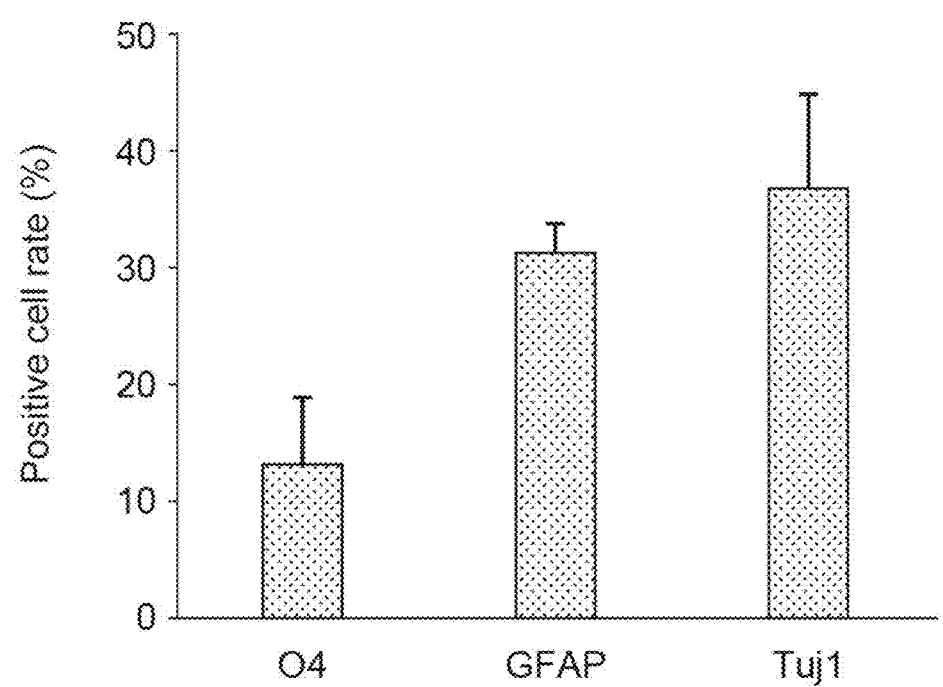
FIG. 7B shows a graph showing proportions of O4-positive cells, GFAP-positive cells, and Tuj1-positive cells in cell aggregates including glial progenitor cells 31 days after terminal differentiation in Example 5.

Cell aggregates including glial progenitor cells were examined on whether to differentiate into three lineages: neurons, astrocytes, and oligodendrocytes, after terminal differentiation. In accordance with the method, induction of terminal differentiation was performed with a maturation culture medium for Ff-WJ14s01-strain-derived cell aggregates including glial progenitor cells (on day 77 of differentiation) produced in accordance with the method of condition 3 in Example 1. Thirty-one days after the terminal differentiation (on day 108 of differentiation), the cells were fixed with 4% PFA by the method described in Example 1 at room temperature for 25 minutes, washed three times with PBS, and then subjected to immunofluorescence staining. Microscopy and image acquisition were performed by using the fluorescence microscope BZ-X710 (manufactured by KEYENCE CORPORATION) and the confocal fluorescence microscope LSM880 (manufactured by Carl Zeiss AG). The result showed that Tuj1- and MAP2-positive neurons, GFAP-positive astrocytes, and O4-positive, GalC-positive, and MBP-positive oligodendrocytes were detected. Thus, differentiation potential into the three lineages was confirmed (FIG. 7A). Further, each positive cell rate was quantified with Developer Toolbox (manufactured by GE Healthcare), which is analysis software in an In Cell Analyzer. The results showed that the positive cell rate for O4-positive cells was about 10%, that for GFAP-positive cells was about 30%, and that for Tuj1-positive cells was about 30% (FIG. 7B).

Example 6: Characterization of Cell Aggregates—Part 5 (Gene Expression Change after Terminal Differentiation The gene expression levels of various differentiation markers on cell aggregates including glial progenitor cells were analyzed before and after terminal differentiation. In accordance with the method described in Example 1, induction of terminal differentiation was performed with a maturation culture medium for cell aggregates including glial progenitor cells (on day 48 of differentiation) produced from the QHJI01s04 strain in accordance with the method of condition 3 in Example 1. Total RNA was extracted from cells before terminal differentiation (on day 48 of differentiation) and 34 days after terminal differentiation (on day 82 of differentiation) by using an RNeasy Plus Mini kit (manufactured by QIAGEN). The total RNA extracted was reverse-transcribed into cDNA by using a SuperScript III First-Strand Synthesis System for RT-PCR (manufactured by Thermo Fisher Scientific Inc.). Thereafter, the expression levels of GFAP, CSPG4 (NG2), OLIG2, PLP1 (PLP), PDGFRA (PDGFRα), SOX10, CNP, MBP, TUBB3 (βIII tubulin), and MAP2 in a quantitative RT-PCR method using Fast SYBR™ Green Master Mix (manufactured by Thermo Fisher Scientific Inc.) were measured with a Step One Plus Realtime PCR System (manufactured by Thermo Fisher Scientific Inc.). Glyceraldehyde-3-phosphate dehydrogenase (GAPDH) was used as an endogenous control.

Figure 8:
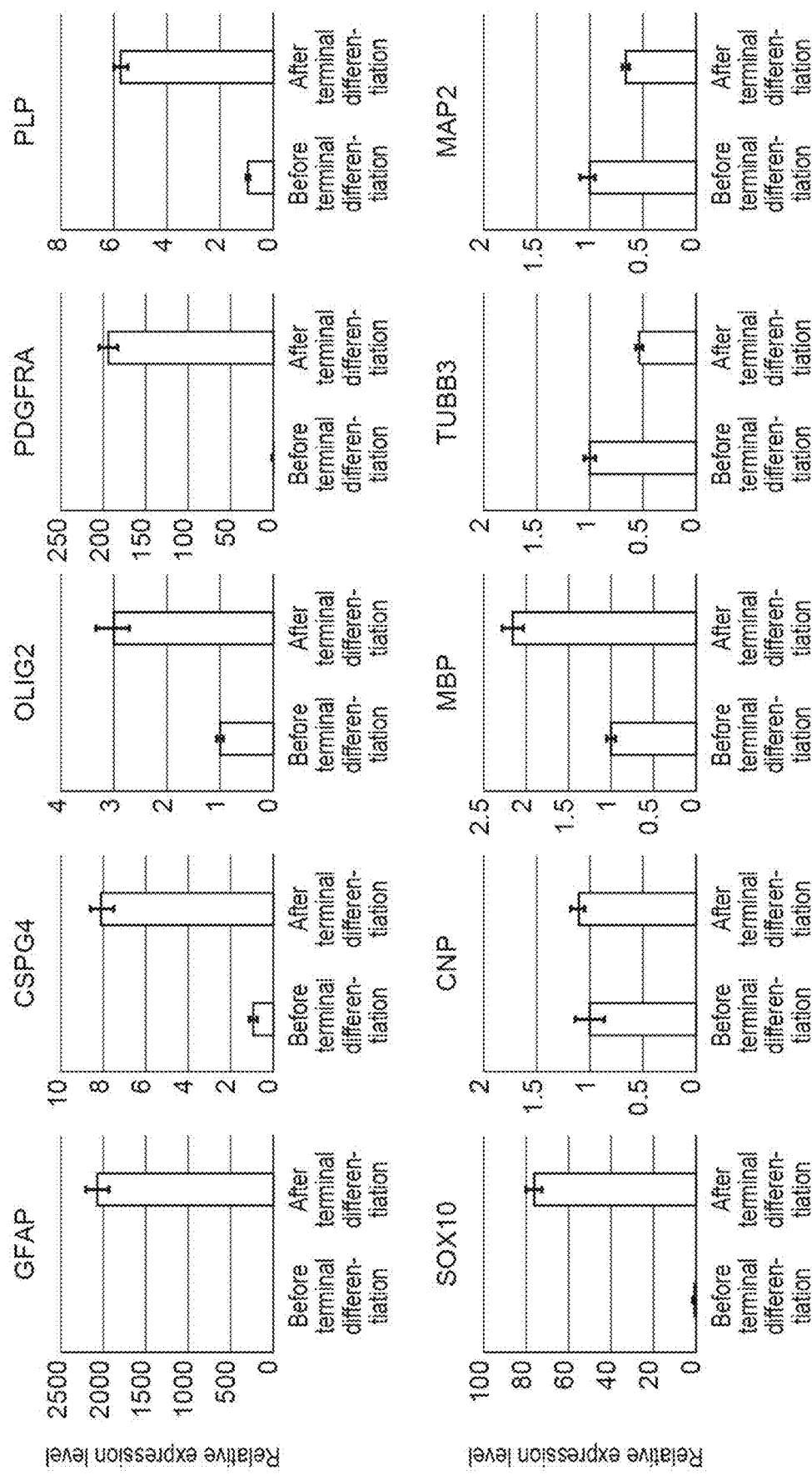
FIG. 8 shows graphs showing relative values of different gene expression levels before and after terminal differentiation in cell aggregates including glial progenitor cells in Example 6.

Primer sets used for the amplification reaction of the target genes are listed in Table 7. The results are shown in FIG. 8. Each expression level after terminal differentiation is shown as a relative expression level to the corresponding expression level before terminal differentiation (assumed as 1). From the result that the expression levels of astrocyte markers and oligodendrocyte markers increased in cells after terminal differentiation, it was suggested that differentiation into mature astrocytes and oligodendrocytes occurred by induction of terminal differentiation with the maturation culture medium. Although the gene expression levels of the neuronal markers βIII tubulin and MAP2 were almost unchanged after terminal differentiation, the cell aggregates including glial progenitor cells had already expressed βIII tubulin and MAP2 when being cell aggregates before terminal differentiation as shown by the examination on the result of immunofluorescence staining for cell aggregates in Example 3, and it was inferred that the expression is maintained even after terminal differentiation.

TABLE 7

| Gene | Forward primer | Reverse primer |
|---|---|---|
| GAPDH | GGTCGGAGTCAACGGATTTG (SEQ ID NO: 1) | TCAGCCTTGACGGTGCCATG (SEQ ID NO: 2) |
| GFAP | GTTCTCTCGGAGTATCTGG (SEQ ID NO: 3) | GATATCCCACCTCATAAAAAC (SEQ ID NO: 4) |
| CSPG4 | ACTTGCATCCGCGGCTTCCT TCTT (SEQ ID NO: 5) | ACAACGTGGCCCAGCCCTCTA (SEQ ID NO: 6) |
| OLIG2 | GGCGCGCAACTACATCCT (SEQ ID NO: 7) | CGCTCACCAGTCGCTTCAT (SEQ ID NO: 8) |
| PDGFRA | CTATCCACACTGTCAAACAG GTTG (SEQ ID NO: 9) | ACTGCTGGACTGAGAAGTTTC ATC (SEQ ID NO: 10) |
| PLP | CTGCTCACCTTCATGATTGC (SEQ ID NO: 11) | TGACTTGCAGTTGGGAAGTC (SEQ ID NO: 12) |
| SOX10 | ATCCAGGCCCACTACAAGAG (SEQ ID NO: 13) | GAAGTCGATGTGAGGCTTCC (SEQ ID NO: 14) |
| CNP | AAGGAGAAGAACCAGTGGCA (SEQ ID NO: 15) | CAAGTCCATCTTCTCCCTGG (SEQ ID NO: 16) |
| MBP | GAGCCCTCTGCCCTCTCATG CC (SEQ ID NO: 17) | TCAGGGACAGTCCTCTCCCCT TTCCC (SEQ ID NO: 18) |
| TUBB3 | TGATGAGCATGGCATCGAC (SEQ ID NO: 19) | GGCCTGAAGAGATGTCCAAA (SEQ ID NO: 20) |
| MAP2 | GGATCAACGGAGAGCTGAC (SEQ ID NO: 21) | TCAGGACTGCTACAGCCTCA (SEQ ID NO: 22) |

Example 7: Transplantation Test with Cell Aggregate Including Glial Progenitor Cells for Subacute-Phase Spinal Cord Injury Model Mice NOD-SCID (NOD.CB17-Prkdcscid-J) mice (Charles River Laboratories International, Inc.) were treated in accordance with animal experiment guidelines by Keio University and NIH. The animal experimental design was approved by the animal experiment committee of Keio University. Eight-week-old female NOD-SCID mice were anesthetized by intraperitoneal administration of ketamine (100 mg/kg) and xylazine (10 mg/kg). Crush injury was applied at the position corresponding to the 10th thoracic vertebra in accordance with a method described in "Scheff et al., Journal of neurotrauma 20, 179-193 (2003)" by using an IH impactor (60-70 kdyn, manufactured by Precision Systems and Instrumentation, LLC), and immediately thereafter intramuscular injection of ampicillin (12.5 mg/kg) was performed. Seven days after the application of injury, hindlimb motor function was evaluated with Basso Mouse Scale (BMS) in accordance with a method described in "Basso et al., Journal of Neurotrauma, 23: 635-59 (2006)". Individuals which had undergone spontaneous recovery to exhibit BMS of 2.5 or more on day 7 after injury were excluded because it was impossible to measure cell transplantation effect, and the rest were divided into two groups (control group: 12 mice, cell transplantation group: 14 mice) in such a manner that the groups had identical average BMS.

On day 9 after injury (subacute phase), with use of a stereotaxic injection system (manufactured by Muromachi Kikai Co., Ltd.), transplantation by a 28 G metal needle was performed to the epi-center of injury with 2 µl of cell suspension for the cell transplantation group and 2 µl of PBS for the control group. Cells obtained by collecting a cell aggregate including glial progenitor cells ($5.0 \times 10^5$ cells) that was derived from the Ff-WJ14s01 strain in 2 µl of PBS were used for transplantation. Various kinds of evaluation of motor function were carried out for 12 weeks after transplantation. Twelve weeks after transplantation, the heart was perfused with 4% PFA under deep anesthesia to fix the spinal cord, which was stored at 4° C. Thereafter, the fixed spinal cord was stored in 30% sucrose/PBS at 4° C., then subjected to freeze-embedding by using O.C.T. compound, and sagittal (thickness: 14 µm) and transverse (thickness: 16 µm) sections were produced and stored at −80° C. In tissue staining, hematoxylin-eosin (HE) staining was performed for tissue image observation, and Luxol fast blue (LFB) staining was performed for staining of myelin sheath tissue.

For more precise tissue evaluation, immunofluorescence staining was performed. After washing three times with PBS, incubation was performed with Blocking One (manufactured by NACALAI TESQUE, INC.), containing 0.1% TritonX-100, as blocking solution, at room temperature for 1 hour. Thereafter, primary antibody solutions were prepared by diluting primary antibodies with blocking solution, and incubation was performed at 4° C. overnight. The primary antibodies used in the present example were a human anti-Hu antibody (dilution rate: 1:1000, provided by Dr. Robert Darnell, Rockefeller University), a mouse anti-GFAP antibody (dilution rate: 1:5000, manufactured by abcam), a mouse anti-APC antibody (dilution rate: 1:300, manufactured by abcam), a rabbit human-specific anti-NESTIN antibody (dilution rate: 1:200, manufactured by Immuno-Biological Laboratories Co., Ltd.), a rabbit anti-Ki67 antibody (dilution rate: 1:1000, manufactured by Leica Biosystems Nussloch GmbH), a mouse anti-OCT3/4 antibody (dilution rate: 1:100, manufactured by Santa Cruz Biotechnology, Inc.), a mouse human-specific antinuclear antibody (HNA) (dilution rate: 1:100, manufactured by Millipore Corporation), a mouse human-specific anticytoplasmic antibody (STEM121) (dilution rate: 1:100, manufactured by Millipore Corporation), a mouse anti-human Tau antibody (dilution rate: 1:500, manufactured by Thermo Fisher Scientific Inc.), a mouse anti-Bassoon antibody (dilution rate: 1:200, manufactured by GeneTex, Inc.), and a mouse anti-human Synaptophysin antibody (dilution rate: 1:200, manufactured by Millipore Corporation). After subsequently washing three times with PBS, an Alexa-Fluor-labeled secondary antibody corresponding to each primary antibody and Hoechst 33342 (dilution rate: 1:1000, manufactured by DOJINDO LABORATORIES) for nuclear staining were diluted with blocking solution to prepare secondary antibody solutions, and incubation was performed at room temperature for 1 hour. After washing three times with PBS, mounting was performed with the mounting medium PermaFluor (manufactured by Thermo Fisher Scientific Inc.), and the resultant was then stored at 4° C. Observation and image acquisition were performed for the samples by using the fluorescence microscope BZ-X710 (manufactured by KEYENCE CORPORATION) and the confocal fluorescence microscope LSM700 (manufactured by Carl Zeiss AG).

<Example 8: Evaluation of Efficacy of Cell
Aggregate Including Glial Progenitor Cells for
Subacute-Phase Spinal Cord Injury Model Mice (BMS Scoring)

Figure 9:
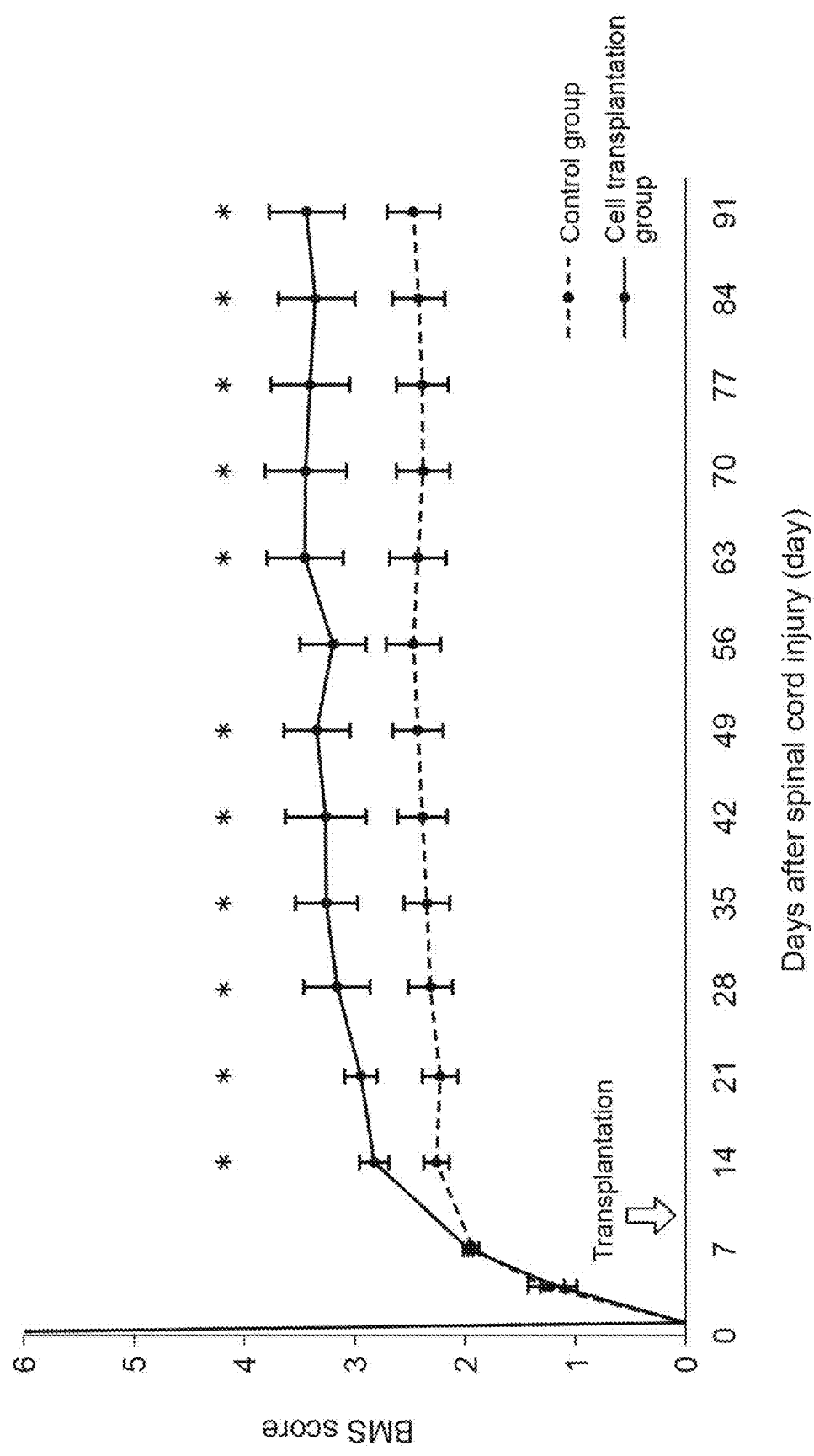
FIG. 9 shows a graph showing results of evaluation of hindlimb motor function by BMS scoring after transplantation of a cell aggregate including glial progenitor cells into subacute-phase spinal cord injury model mice in Example 8.

For evaluation of the efficacy of transplanted cells in the experiment described in Example 7, evaluation of hindlimb motor function by BMS scoring was carried out once every 7 days for 12 weeks after transplantation. The BMS score of the cell transplantation group was significantly (*: $p<0.05$) higher than that of the control group from day 14 after injury (day 5 after transplantation) to day 91 after injury (day 82 after transplantation), the final day of evaluation (FIG. 9).

Example 9: Evaluation of Efficacy of Cell
Aggregate Including Glial Progenitor Cells for
Subacute-Phase Spinal Cord Injury Model Mice
(Rotarod Test)

Figure 10:
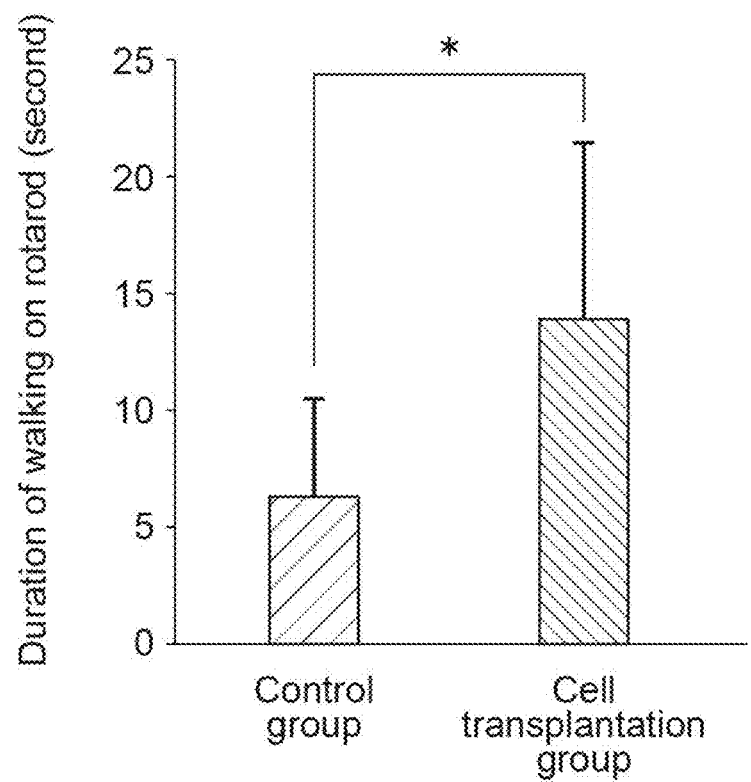
FIG. 10 shows a graph showing results of evaluation of coordinated movement by rotarod test after transplantation of a cell aggregate including glial progenitor cells into subacute-phase spinal cord injury model mice in Example 9.

Evaluation of coordinated movement (rotarod test) was carried out 12 weeks after transplantation. Duration of successful walking on a rotarod (manufactured by Muromachi Kikai Co., Ltd.) rotating at 20 cycles per minute was measured. The cell transplantation group was able to walk on the rotarod for significantly (*: $p<0.05$) longer time than the control group (FIG. 10).

Example 10: Evaluation of Efficacy of Cell
Aggregate Including Glial Progenitor Cells for
Subacute-Phase Spinal Cord Injury Model Mice
(Evaluation of Gait Patterns)

Figure 11A:
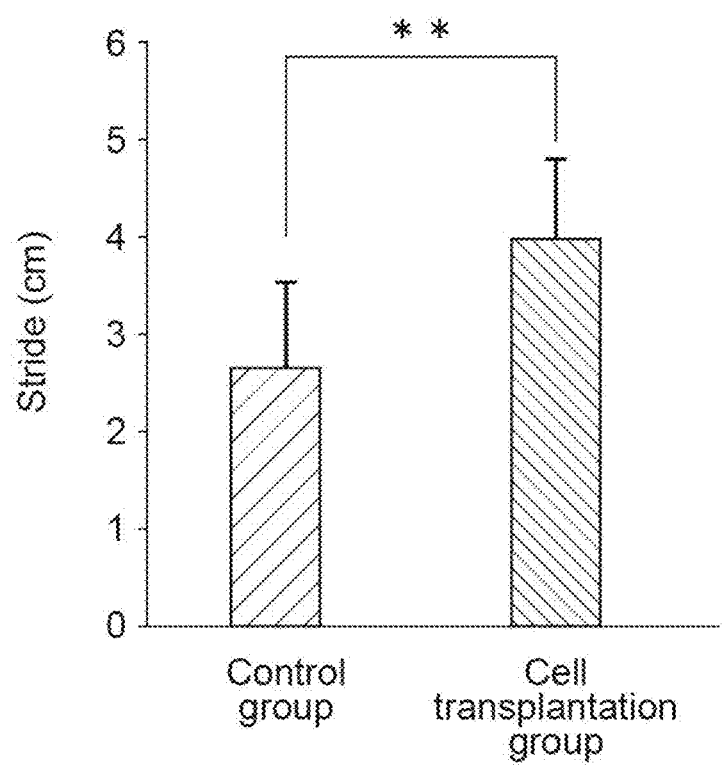
FIG. 11A shows a graph showing results of evaluation of gait patterns by strides after transplantation of a cell aggregate including glial progenitor cells into subacute-phase spinal cord injury model mice in Example 10.
Figure 11B:
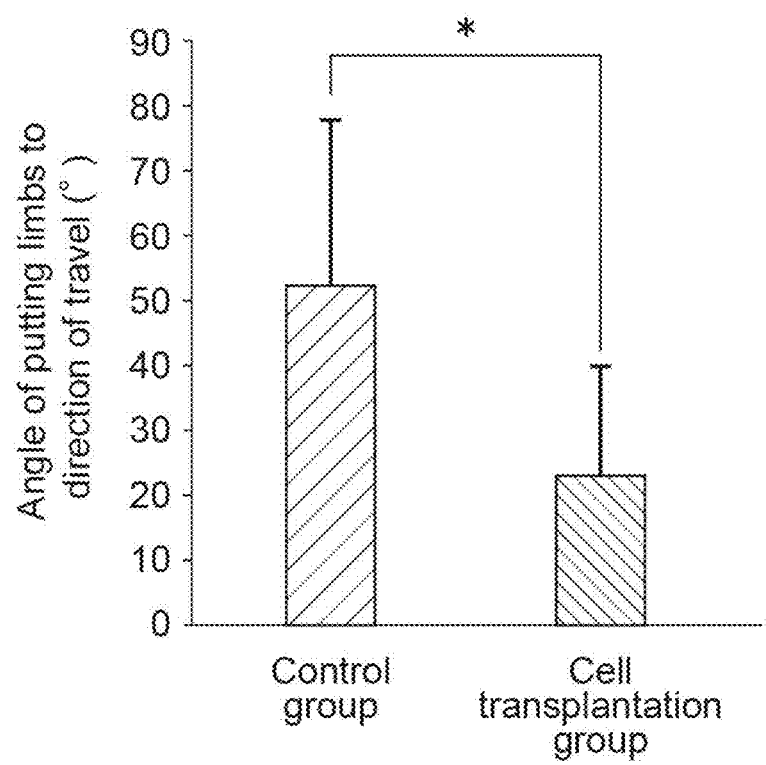
FIG. 11B shows a graph showing results of evaluation of gait patterns by angles of putting limbs to direction of travel after transplantation of a cell aggregate including glial progenitor cells into subacute-phase spinal cord injury model mice in Example 10.

Twelve weeks after transplantation, evaluation of gait patterns was carried out by using a DigiGait system (manufactured by Mouse Specifics, Inc.). Walking on a treadmill (7 cm/sec) was imposed, and strides and walking angles were measured. The strides of the cell transplantation group were significantly (**: $p<0.01$) longer than those of the control group (FIG. 11A). In addition, the angles of putting limbs to direction of travel in the cell transplantation group were significantly (*: $p<0.05$) smaller than those in the control group, suggesting walking patterns closer to normal ones with parallel landing of both limbs (FIG. 11B).

Example 11: Evaluation of Efficacy of Cell
Aggregate Including Glial Progenitor Cells for
Subacute-Phase Spinal Cord Injury Model Mice
(Kinematics Analysis)

Figure 12:
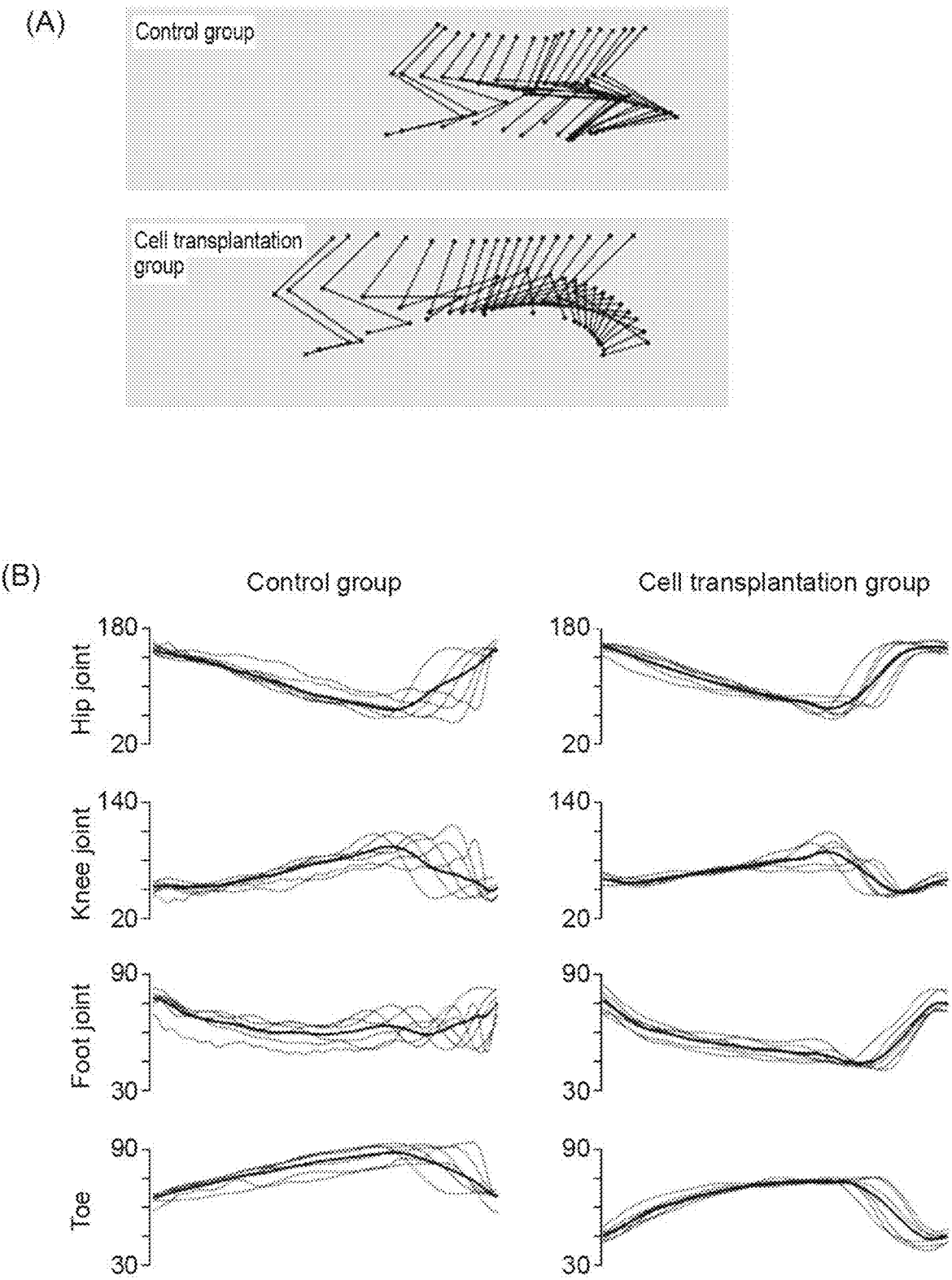
FIG. 12 shows diagrams showing results of evaluation of movement of joints by kinematics analysis after transplantation of a cell aggregate including glial progenitor cells into subacute-phase spinal cord injury model mice in Example 11. (A) shows representative examples of trajectories from toe-off of a hindlimb from the ground to landing thereof, and (B) shows transitions of joint angles in hip joints, knee joints, foot joints, and toes in one walking cycle.

Twelve weeks after transplantation, analysis was carried out by using the three-dimensional action analysis software KinemaTracer (manufactured by KISSEI COMTEC Co., Ltd.) to evaluate movement of joints. Mice with their shoulder joints, hip joints, knee joints, foot joints, and toes labeled with markers were allowed to walk on a treadmill, and video recording was performed from the four directions: front, back, left, and right, by using a high-speed digital camera (manufactured by GoPro, Inc.) to three-dimensionally visualize the trajectories of the markers. (A) in FIG. 12 shows representative examples of trajectories from toe-off of a hindlimb from the ground to landing thereof. The cell transplantation group exhibited toe-off of a limb farther from the ground than that the control group exhibited, thus a smoother trajectory. (B) in FIG. 12 shows transitions of joint angles in hip joints, knee joints, foot joints, and toes in one walking cycle. Five steps were analyzed for each of six individuals, and, in each graph, each thin line shows transitions of joint angles as an average for five steps in one individual and a thick line shows the average for the six individuals. It was suggested that the cycle-by-cycle variation of movement of joints in walking in the cell transplantation group was smaller than that in the control group.

Figure 13:
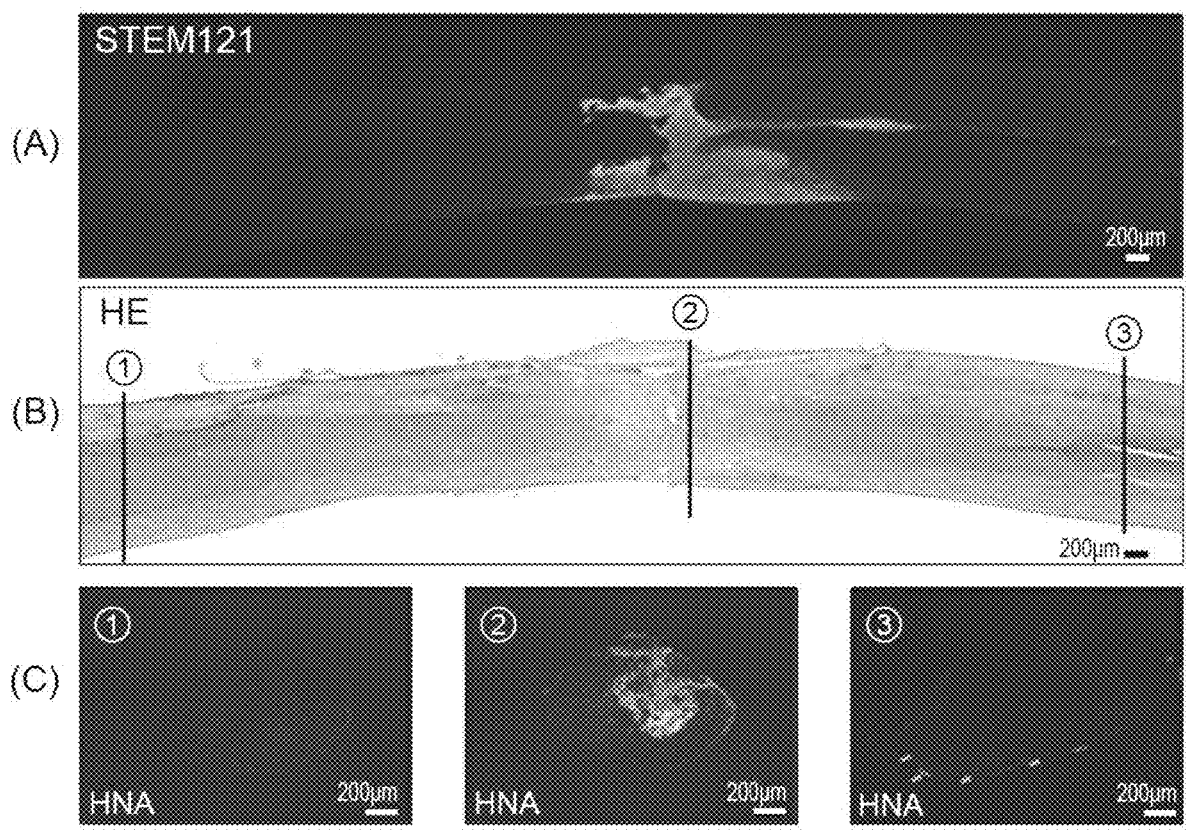
FIG. 13 shows fluorescence microscopy images showing results of tissue section observation after transplantation of a cell aggregate including glial progenitor cells into subacute-phase spinal cord injury model mice in Example 12. (A) shows a result for a sagittal section subjected to immunofluorescence staining using a STEM121 antibody; (B) shows a result for a sagittal section subjected to HE staining; and (C) shows results for transverse sections subjected to immunofluorescence staining using an anti-HNA antibody at (1) a part 4 mm away from an epi-center of injury in the rostral side, (2) the epi-center of injury, and (3) a part 4 mm away from the epi-center of injury in the caudal side.

Example 12: Evaluation of Tissue of Spinal Cord
for Subacute-Phase Spinal Cord Injury Model Mice Twelve weeks after transplantation, immunofluorescence staining was performed with a STEM121 antibody for the sagittal section to detect transplanted cells ((A) in FIG. 13). Transplanted cells were detected in a broad range including sites distant from the epi-center of injury, and thus the engraftment of transplanted cells was confirmed. HE staining was carried out for the adjacent sections, and tissue images in a broad range from the rostral side to the caudal side were observed to find no tumor-like structure ((B) in FIG. 13). In addition, immunofluorescence staining was performed with an anti-HNA antibody for transverse sections at (2) the epi-center of injury, (1) apart 4 mm away from the epi-center of injury in the rostral side, and (3) a part 4 mm away from the epi-center of injury in the caudal side ((C) in FIG. 13). From the result that HNA-positive cells were detected in the sections at the epi-center of injury, which was the site of transplantation, a part 4 mm away therefrom in the rostral side, and a part 4 mm away therefrom in the caudal side, it was suggested that transplanted cells had migrated over a broad range.

For more precise characteristic analysis of transplanted cells, immunofluorescence costaining was carried out with a human-specific marker and various markers for the sagittal section. Considering a report that when neural progenitor cells derived from iPS cells form a tumor, they become OCT3/4-positive (Non Patent Literature 8), immunofluorescence staining was first performed with an anti-OCT3/4 antibody and an anti-Ki67 (proliferation marker) antibody together with an anti-HNA antibody. For characteristic analysis of transplanted cells, immunofluorescence staining was performed with an anti-NESTIN (neural stem cell marker) antibody, an anti-Hu (neuronal marker) antibody, an anti-GFAP (astrocyte marker) antibody, an anti-APC (oligodendrocyte marker) antibody, and an anti-HNA antibody, and positive cells were quantified.

Figure 14A:
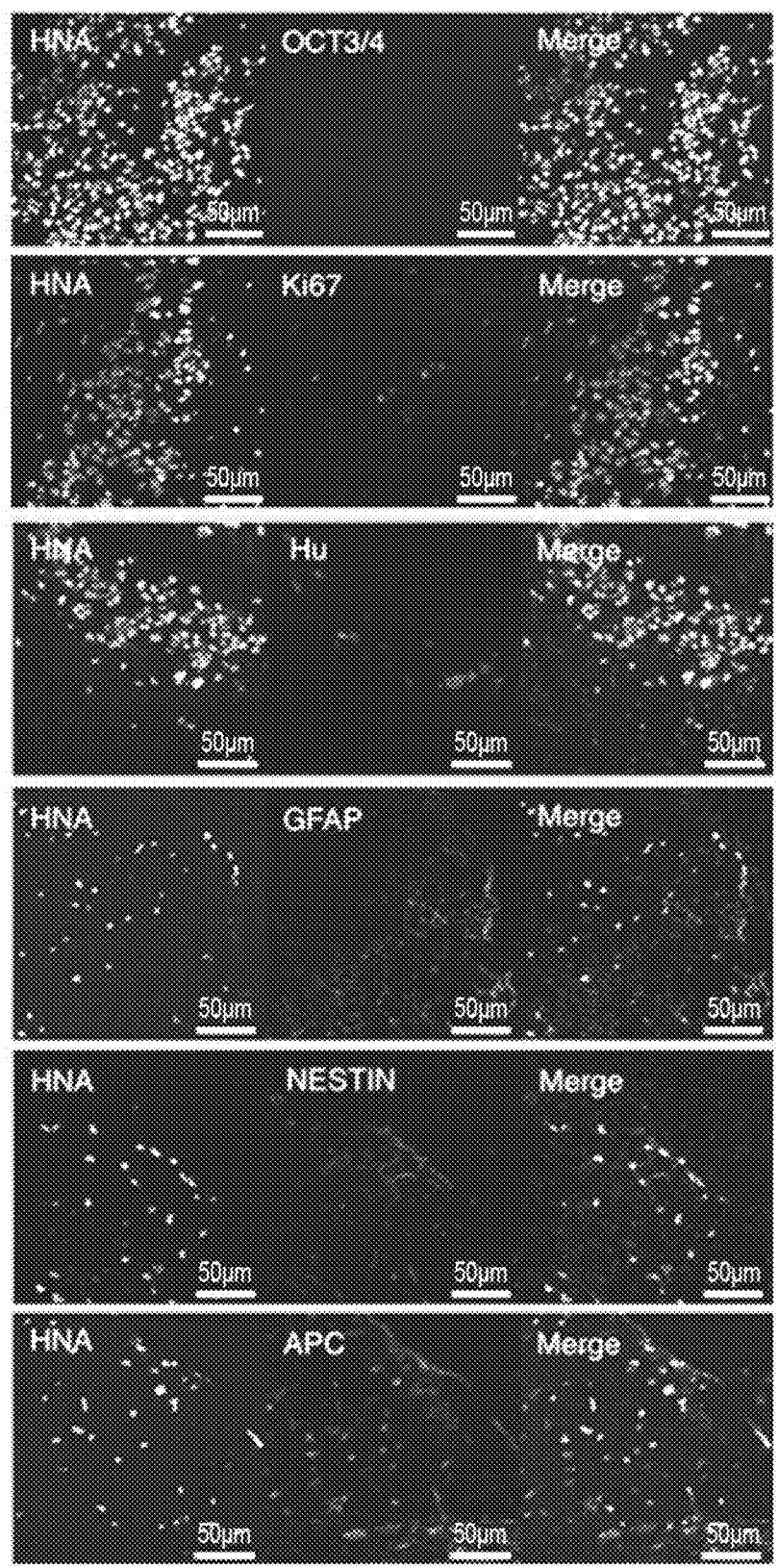
FIG. 14A shows fluorescence microscopy images of sagittal sections subjected to immunofluorescence containing with a human-specific marker and different markers.
Figure 14B:
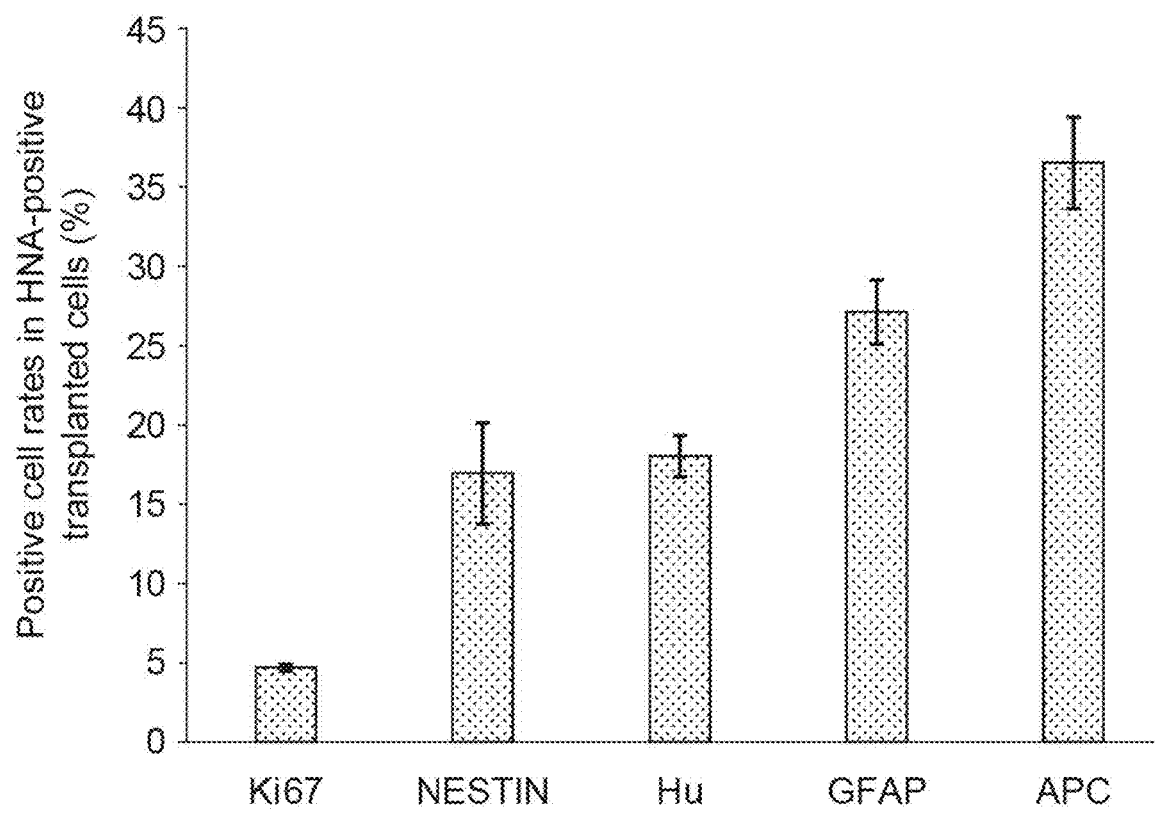
FIG. 14B shows a graph showing positive cell rates in HNA-positive transplanted cells in sagittal sections in Example 12.

From the result that no $HNA^+/OCT3/4^+$-copositive cell was detected, it was suggested that transplanted cells did not form a tumor (FIG. 14A). The proportion of $HNA^+/Ki67^+$-copositive cells was 4.71±0.20%, suggesting that proliferative cells were present in the transplanted cells. The proportions of $HNA^+/NESTIN^+$-copositive neural progenitor cells, $HNA^+/Hu^+$-copositive neural cells, $HNA^+/GFAP^+$-copositive astrocytes, and $HNA^+/APC^+$-copositive oligodendrocytes were 17.02±3.10%, 18.12±1.22%, 27.23±1.92%, and 36.56±2.82%, respectively (FIG. 14B). Thus, it was suggested that although some immature neural progenitor cells and glial progenitor cells were present on day 91 after transplantation, most of the transplanted cells differentiated into the three lineages: neurons, astrocytes, and oligodendrocytes.

Figure 15:
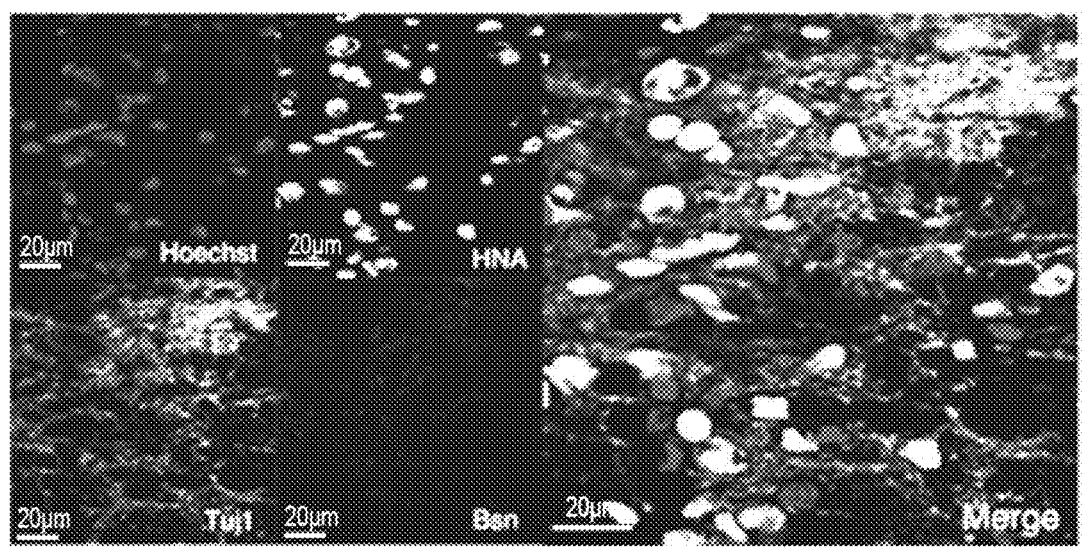
FIG. 15 FIG. 15 shows fluorescence microscopy images of sagittal sections subjected to immunofluorescence staining using a Tuj1 antibody and an anti-HNA antibody together with an anti-mouse-specific Bassoon (Bsn) or anti-human Synaptophysin (hSyn) antibody in Example 12.
Figure 15:
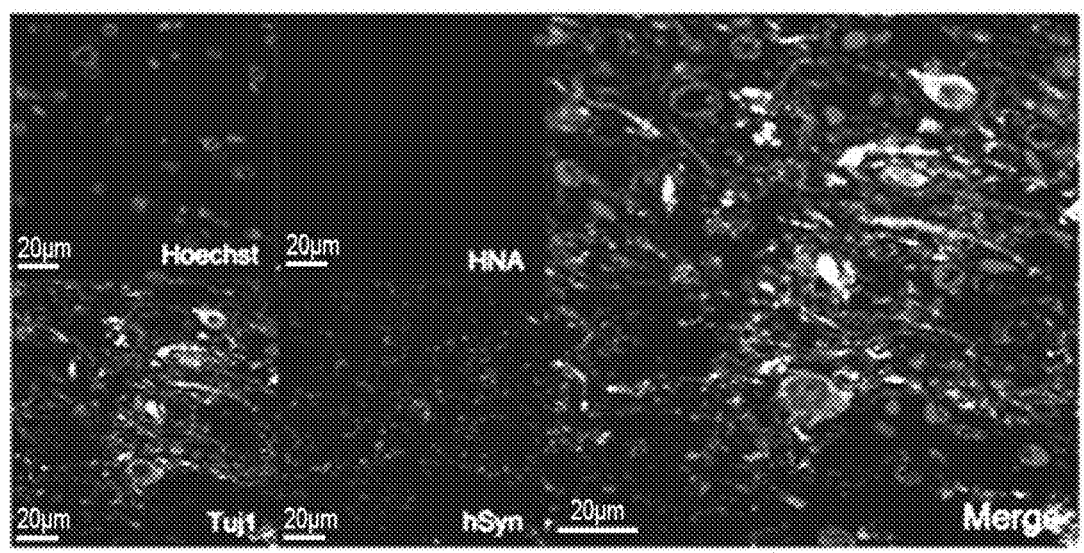

Next, to examine whether neurons derived from transplanted cells were forming neurons and neural circuits of a host mouse, immunofluorescence staining was performed with a Tuj1 antibody and an anti-HNA antibody together with an anti-mouse-specific Bassoon (presynaptic marker) or an anti-human Synaptophysin (synaptic vesicle protein) antibody for the sagittal section. The result showed that $HNA^+/Tuj1^+$-copositive neurons derived from transplanted cells coexisted with mouse-specific Bassoon ((A) in FIG. 15). In addition, HNA⁻/Tuj1⁺ host neurons coexisted with human-specific Synaptophysin ((B) in FIG. 15). From these results, it was suggested that neurons of the host mouse and neurons derived from transplanted cells were forming neural circuits.

Figure 16A:
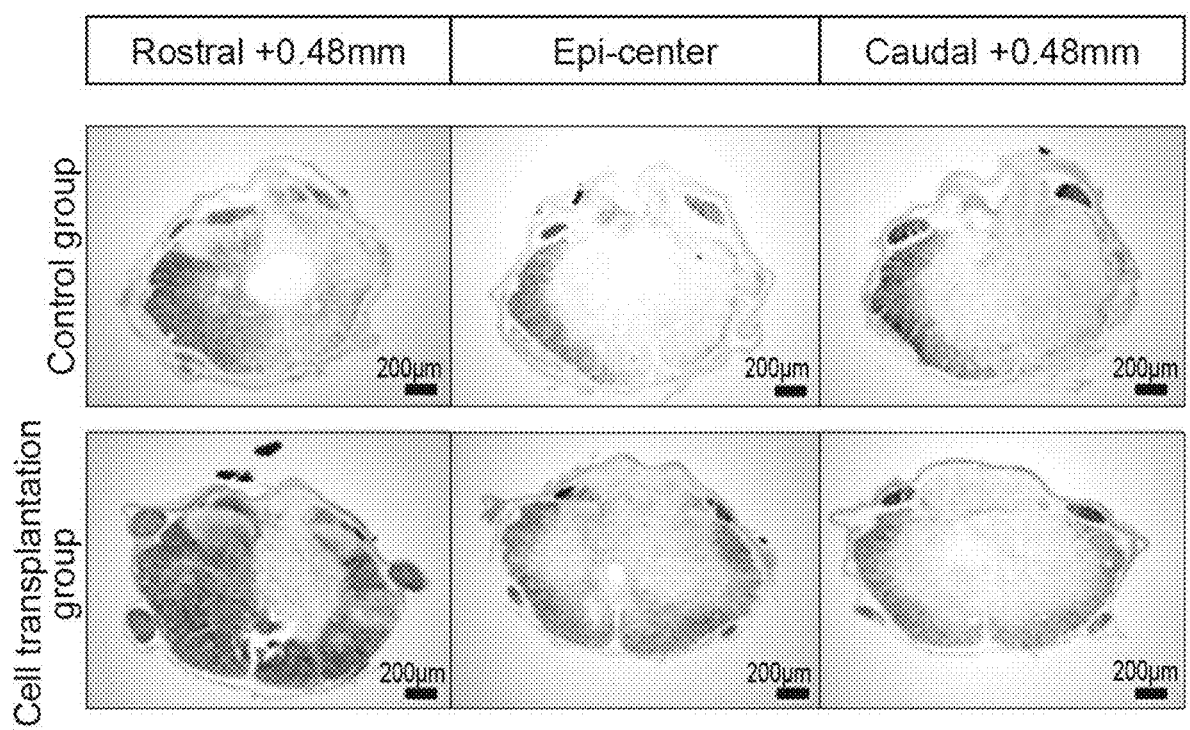
FIG. 16A shows LFB-stained images at a part 0.48 mm away from an epi-center of injury in the rostral side (Rostral), the epi-center of injury (Epi-center), and apart 0.48 mm away from the epi-center of injury in the caudal side (Caudal) in Example 12.
Figure 16B:
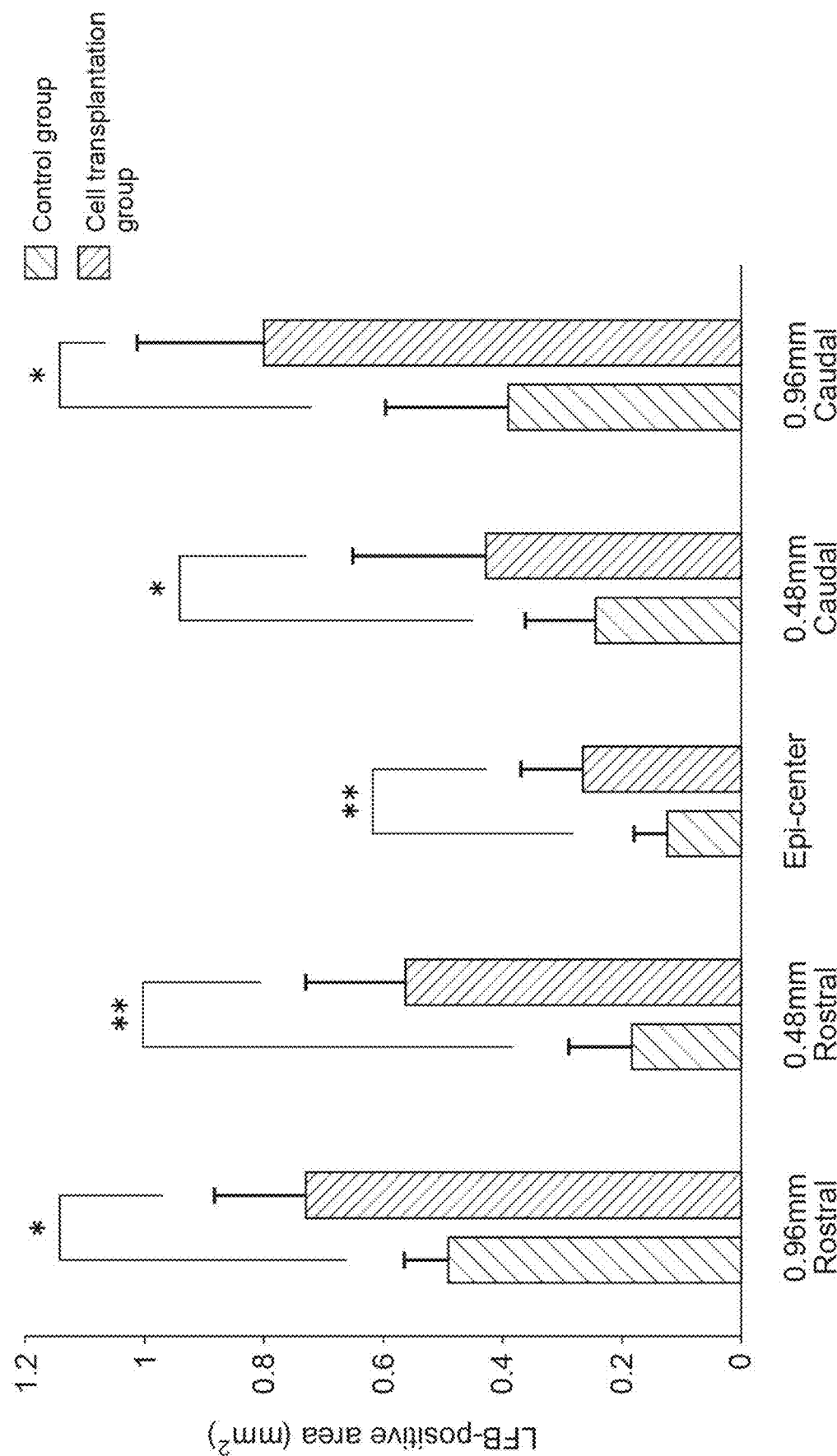
FIG. 16B shows a graph showing results of quantification of LFB-positive areas in myelin sheath tissue from an epi-center of injury to parts 0.96 mm away therefrom in the rostral and caudal sides in transverse sections subjected to LFB staining in Example 12.
Figure 17:
FIG. 17 shows fluorescence microscopy images of a transverse section subjected to immunofluorescence staining using a STEM121 antibody and an anti-MBP antibody in Example 12.
Figure 18:
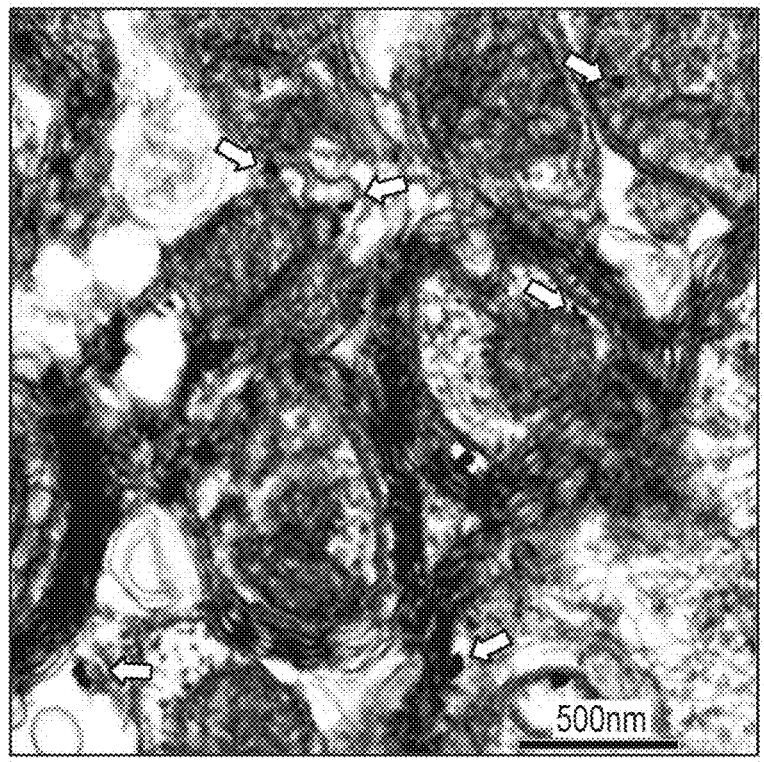
FIG. 18 shows electron micrographs of a transverse section in which STEM121 antibody reaction sites were detected by immunoelectron microscopy in Example 12. The STEM121 antibody reaction sites detected with a secondary antibody labeled with gold colloidal particles (black spots) are indicated with arrows. (A) and (B) are images taken from different fields.
Figure 18:
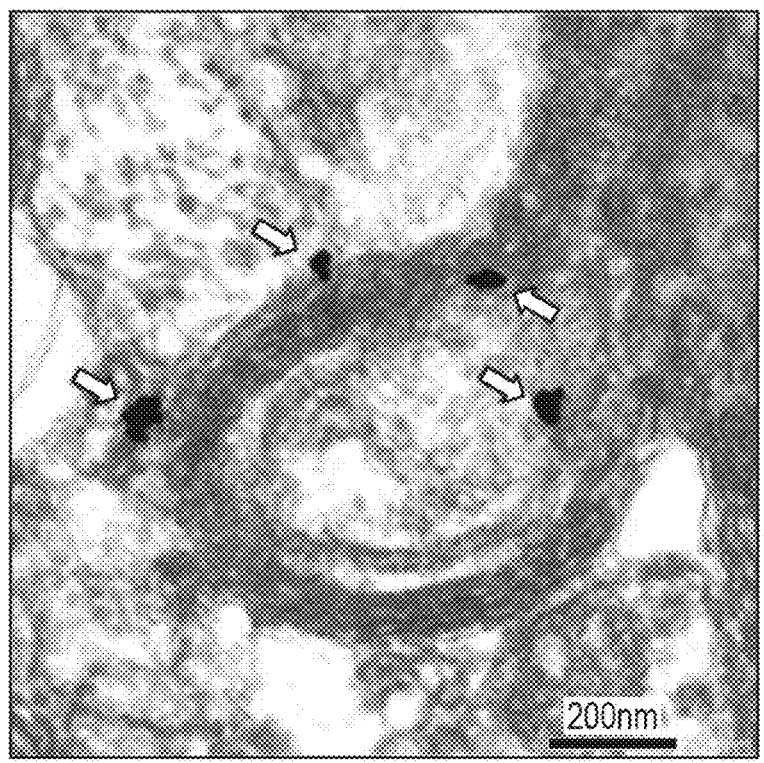

Next, remyelination effect provided by cell transplantation was examined. FIG. 16A shows LFB-stained images at a part 0.48 mm away from the epi-center of injury in the rostral side (Rostral), the epi-center of injury (Epi-center), and apart 0.48 mm away from the epi-center of injury in the caudal side (Caudal). For transverse sections from the epi-center of injury to parts 0.96 mm away therefrom in the rostral and caudal sides, myelin sheath tissue was observed with LFB staining, and LFB-positive areas were quantified. The result showed that, in all of the sections observed, the LFB-positive area for the cell transplantation group was significantly (*: $p<0.05$; **: $p<0.01$) larger than that in the control group (FIG. 16A, FIG. 16B). In addition, immunofluorescence staining with the mature oligodendrocyte marker MBP and STEM121 was performed for the transverse sections. The result showed that a STEM121*/MBP*-copositive area was detected (FIG. 17). Moreover, for more precise observation, immunoelectron microscopy using a STEM121 antibody was performed for the transverse sections in accordance with a method described in "Shibata et al., Frontiers in Neural Circuits, 2019; 13:29.", and STEM121 antibody reaction sites were detected with a secondary antibody labeled with gold colloidal particles. When myelin sheaths were observed through an electron microscope, gold colloidal particles were detected in the myelin sheaths (arrows in FIG. 18). From these results, it was suggested that mature oligodendrocytes derived from transplanted cells were remyelinating nerve axons.

Example 13: Transplantation Experiment With Cell Aggregate Including Glial Progenitor Cells for Chronic-Phase Spinal Cord Injury Model Rats Nude (F344/NJcl-rnu/rnu) rats (CLEA Japan, Inc.) were treated in accordance with animal experiment guidelines by Keio University and NIH. The animal experimental design was approved by the animal experiment committee of Keio University. Eight-week-old female Nude rats were anesthetized by intraperitoneal administration of a triple anesthetic (medetomidine: 0.375 mg/kg, midazolam: 2 mg/kg, butorphanol: 2.5 mg/kg). Crush injury was applied at the position corresponding to the 10th thoracic vertebra in accordance with a method described in "Scheff et al., Journal of neurotrauma 20, 179-193 (2003)" by using an IH impactor (220 kdyn, manufactured by Precision Systems and Instrumentation, LLC), subcutaneous injection of orbifloxacin (5 mg/kg) was performed, and awakening was then performed by intraperitoneal administration of a medetomidine antagonist (atipamezole: 0.75 mg/kg). On the next day after application of injury and every 1 week after injury, hindlimb motor function was evaluated with Basso Beattie Bresnahan (BBB) in accordance with a method described in "Basso et al., Journal of Neurotrauma, 12: 1-21 (1995)". Individuals which had undergone spontaneous recovery to exhibit BBB of 9 or more on day 41 after injury were excluded because it was impossible to measure cell transplantation effect, and the rest were divided into two groups (control group: 13 rats, cell transplantation group: 18 rats) in such a manner that the groups have identical average BBB.

On day 42 after injury (chronic phase), with use of a stereotaxic injection system (manufactured by Muromachi Kikai Co., Ltd.), transplantation by a 27 G metal needle was performed to two positions in the rostral and caudal sides of the epi-center of injury with 2 µl of cell suspension for the cell transplantation group and 2 µl of PBS for the control group. Cells obtained by collecting a cell aggregate including glial progenitor cells ($5.0 \times 10^5$ cells/2 µl) that was derived from the QHJI01s04 strain in PBS were used for transplantation. Evaluations of hindlimb motor function were carried out for 12 weeks after transplantation. After carrying out evaluation of gait patterns 12 weeks after transplantation, the heart was perfused with 4% PFA under deep anesthesia to fix and collect the spinal cord, which was stored at 4° C. with soaking in 4% PFA. Thereafter, the fixed spinal cord was stored in 30% sucrose/PBS at 4° C., then subjected to freeze-embedding by using O.C.T. compound, and sagittal (thickness: 14 m) and transverse (thickness: 20 m) sections were produced and stored at −80° C. In tissue staining, hematoxylin-eosin (HE) staining and immunofluorescence staining were performed for tissue image observation.

<Example 14: Evaluation of Efficacy of Cell Aggregate Including Glial Progenitor Cells for Chronic-Phase Spinal Cord Injury Model Rats>(BBB Scoring)

Figure 19:
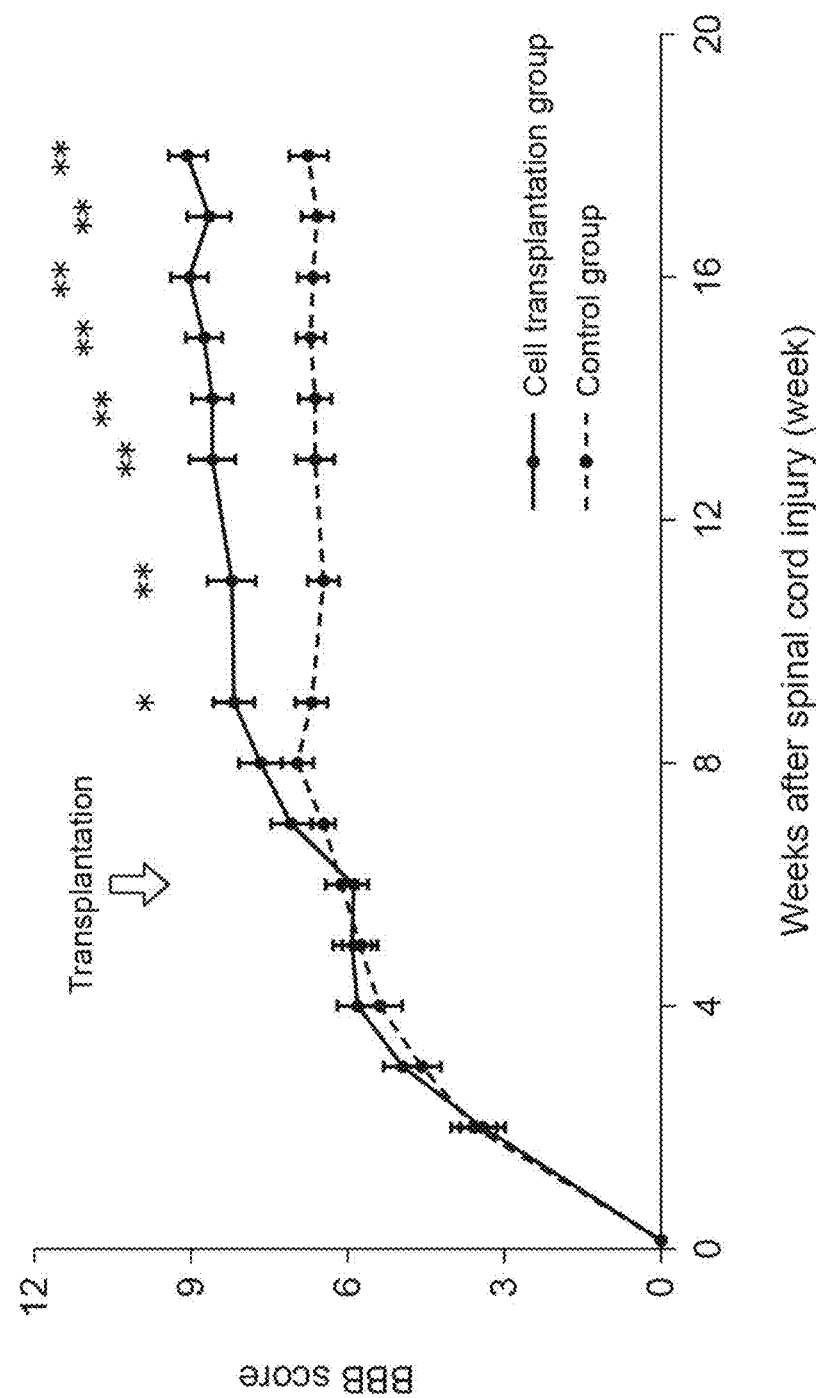
FIG. 19 shows a graph showing results of evaluation of hindlimb motor function by BBB scoring after transplantation of a cell aggregate including glial progenitor cells into chronic-phase spinal cord injury model rats in Example 14.

For evaluation of the efficacy of transplanted cells in the experiment described in Example 13, evaluation of hindlimb motor function by BBB scoring was carried out once every 7 to 14 days for 12 weeks after transplantation. The BBB score of the cell transplantation group was significantly (*: $p<0.05$, **: $p<0.01$) higher than that of the control group from day 63 after injury (day 21 after transplantation) to day 126 after injury (day 84 after transplantation) (FIG. 19).

Example 15: Evaluation of Efficacy of Cell Aggregate Including Glial Progenitor Cells for Chronic-Phase Spinal Cord Injury Model Rats (Evaluation of Gait Patterns)

Figure 20:
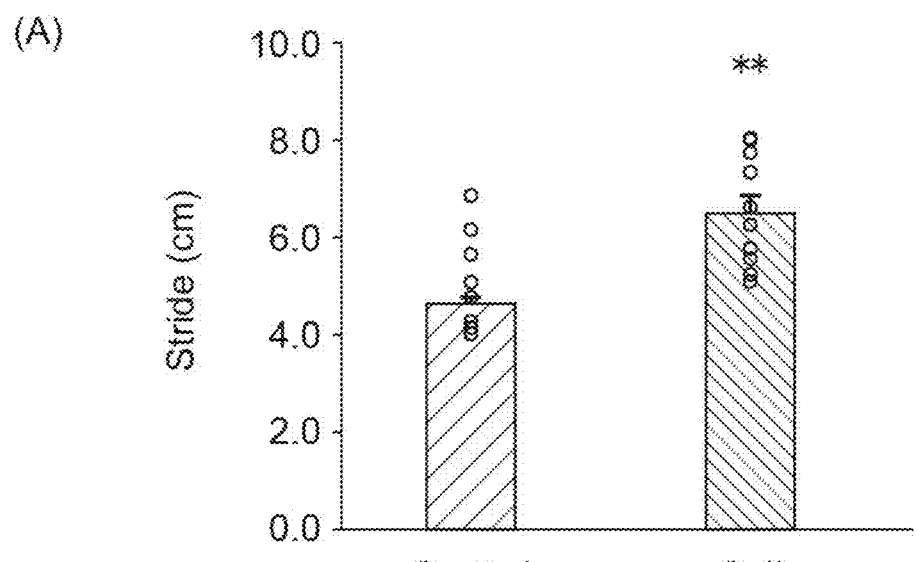
FIG. 20 shows results of evaluation of gait patterns 12 weeks after transplantation of a cell aggregate including glial progenitor cells into chronic-phase spinal cord injury model rats in Example 15. (A) shows strides; and (B) shows angles of putting limbs to direction of travel.
Figure 20:
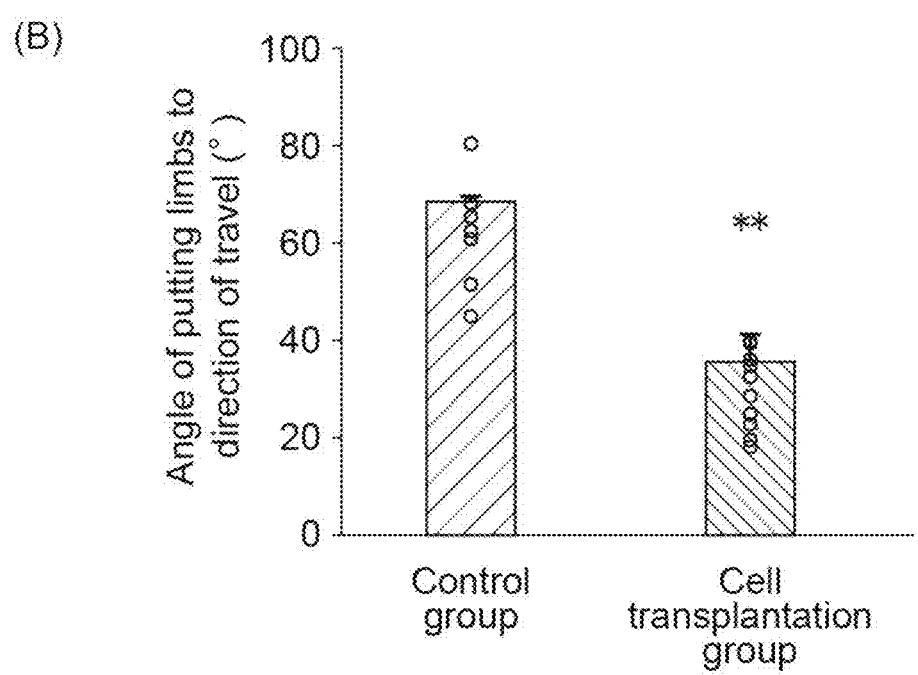

Twelve weeks after transplantation, evaluation of gait patterns was carried out by using a DigiGait system (manufactured by Mouse Specifics, Inc.). Walking on a treadmill (10 cm/sec) was imposed, and strides and walking angles were measured. The strides of the cell transplantation group were significantly (**: $p<0.01$) longer than those of the control group ((A) in FIG. 20). In addition, the angles of putting limbs to direction of travel in the cell transplantation group were significantly (*: $p<0.05$) smaller than those in the control group, suggesting walking patterns closer to normal ones with parallel landing of both limbs ((B) in FIG. 20).

Figure 21:
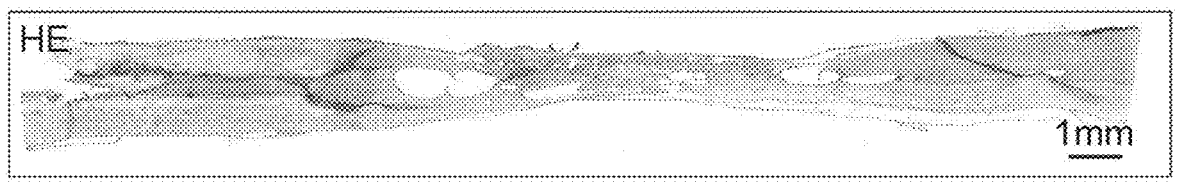
FIG. 21 shows results of tissue section observation after transplantation of a cell aggregate including glial progenitor cells into chronic-phase spinal cord injury model rats in Example 16. (A) shows a result for a sagittal section subjected to HE staining; and (B) shows a result for a sagittal section subjected to immunofluorescence staining using an anti-HNA antibody.
Figure 21:
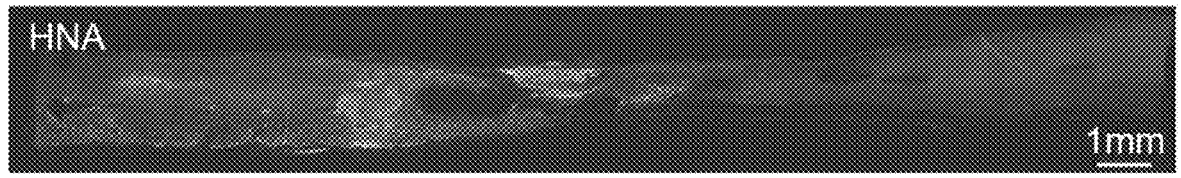

Example 16: Evaluation of Tissue of Spinal Cord for Chronic-Phase Spinal Cord Injury Model Rats When HE staining was carried out for the sagittal section produced with the method described in Example 13, no tumor-like structure was found ((A) in FIG. 21). In addition, immunofluorescence staining was carried out with an anti-HNA antibody for the adjacent section. From the result that HNA-positive cells were detected in a broad range, the engraftment of transplanted cells was confirmed ((B) in FIG. 21).

Figure 22:
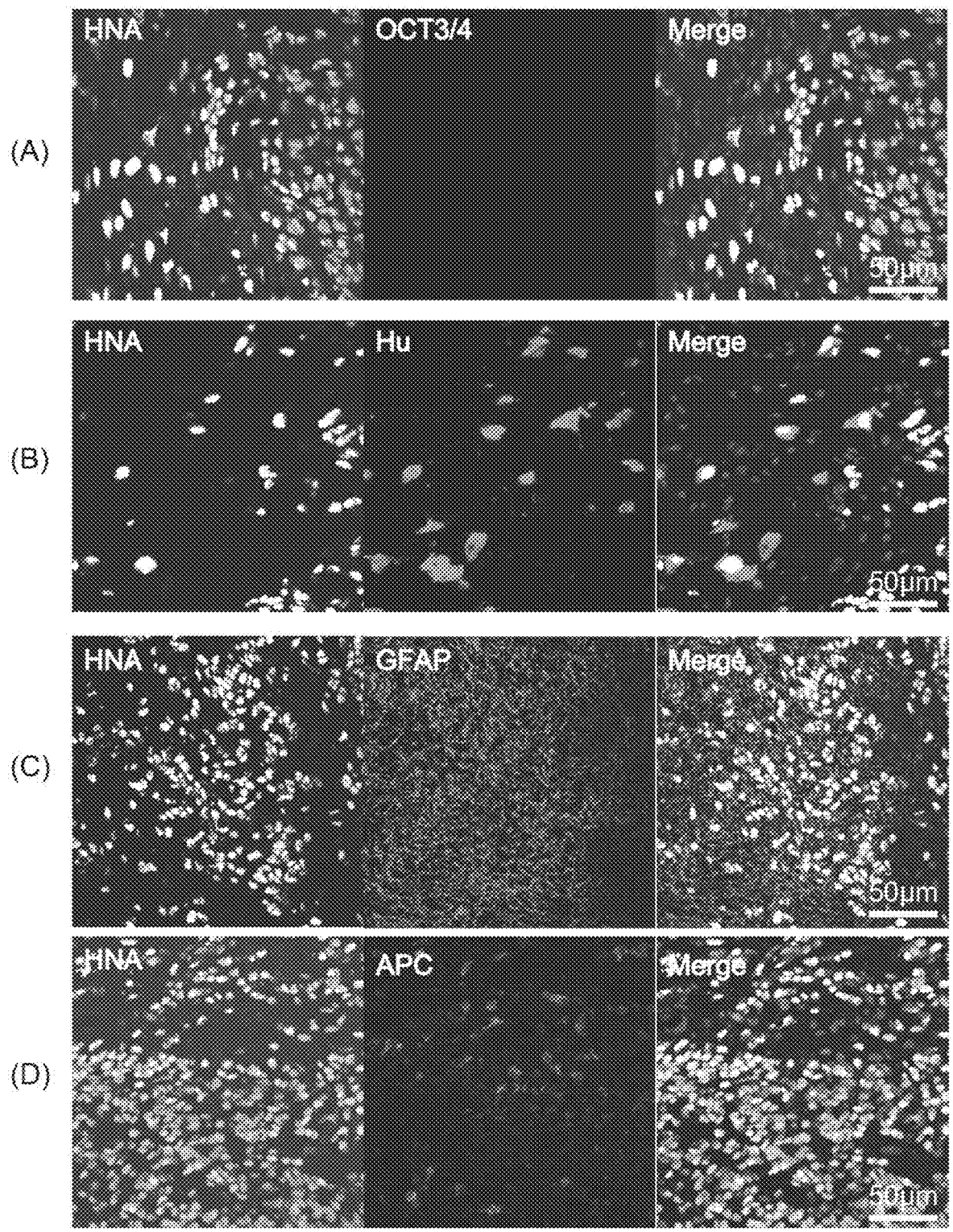
FIG. 22 shows results of tissue section observation after transplantation of a cell aggregate including glial progenitor cells into chronic-phase spinal cord injury model rats in Example 16. (A) shows a result for a sagittal section subjected to immunofluorescence staining using an anti-HNA antibody and an anti-OCT3/4 antibody; (B) shows that using an anti-HNA antibody and an anti-Hu antibody; (C) show that using an anti-HNA antibody and an anti-GFAP antibody; and (D) shows that using an anti-HNA antibody and an anti-APC antibody.

For more precise characteristic analysis of transplanted cells, immunofluorescence costaining was carried out with a human-specific marker and various markers for the sagittal section in accordance with the method described in Example 12. To evaluate tumorigenicity, immunofluorescence staining was performed with an anti-OCT3/4 antibody and an anti-HNA antibody. From the result that no HNA$^+$/OCT3/4$^+$-copositive cell was detected, it was suggested that transplanted cells did not form a tumor ((A) in FIG. 22). To examine the terminal differentiation potential of transplanted cells, immunofluorescence staining was performed with an anti-Hu (neuronal marker) antibody, an anti-GFAP (astrocyte marker) antibody, and an anti-APC (oligodendrocyte marker) antibody together with an anti-HNA antibody. The result showed that HNA$^+$/Hu$^+$-copositive cells ((B) in FIG. 22), HNA$^+$/GFAP$^+$-copositive cells ((C) in FIG. 22), and HNA$^+$/APC$^+$-copositive cells were detected ((D) in FIG. 22). Thus, it was suggested that transplanted cells differentiate into neurons, astrocytes, and oligodendrocytes in the rat spinal cord.

Example 17: Production of Uniformly Sized Cell Aggregates

Figure 23:
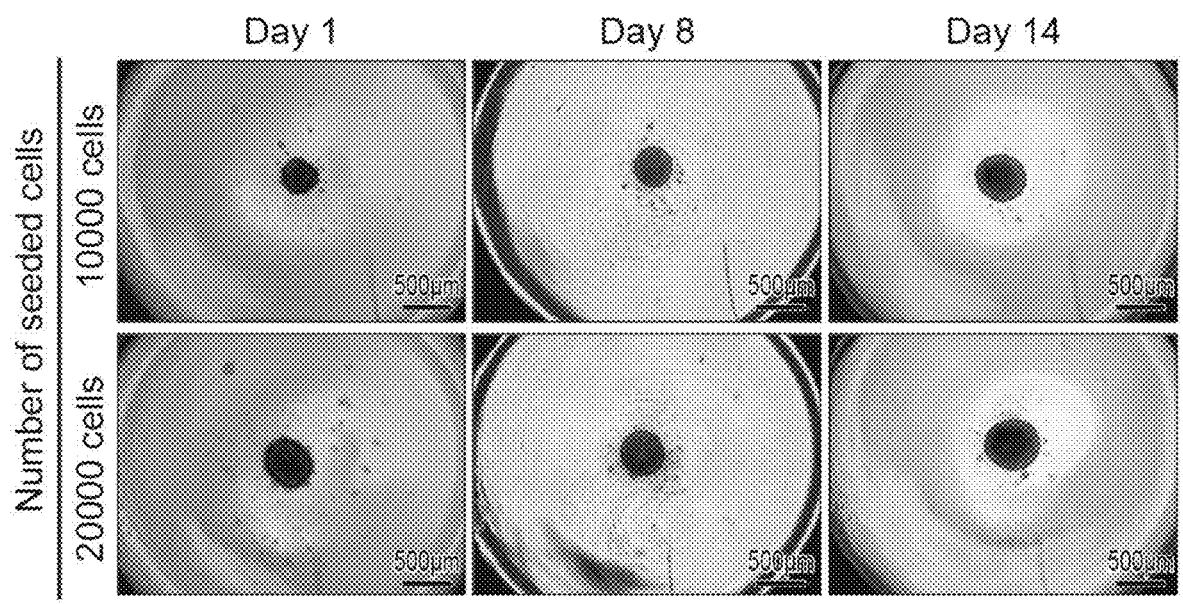
FIG. 23 shows images showing bright field images of cell aggregates including glial progenitor cells on days 1, 8, and 14 after cell seeding in Example 17.

Cell aggregate including glial progenitor cells produced from the QHJI01s04 strain in accordance with the method of condition 3 in Example 1 were dispersed into single cells by using TrypLE Select on day 49 of differentiation, and the cells were then seeded on 96-well low-attachment plates (product name: PrimeSurface® 96 Slit-Well plate, manufactured by Sumitomo Bakelite Co., Ltd.) at 10000 cells/well and 20000 cells/well, and cultured in a neuron-and-glia-proliferating culture medium under 5% $CO_2$/20% $O_2$ at 37° C. Then, formation of cell aggregates was found as early as the next day after seeding. Half-volume culture medium exchange was performed once every 3 days, and culture was performed for 8 days and 14 days (FIG. 23). On day 8 and 14 of culture (on day 57 and 63 of differentiation), one cell aggregate was transferred into one well of a 96-well plate (manufactured by Corning Incorporated) treated with 1% Matrigel Matrix Basement Membrane Growth Factor Reduced (manufactured by Corning Incorporated) diluted with DMEM/F-12, and cultured in a maturation culture medium for 28 days to induce terminal differentiation.

On day 28 of terminal differentiation (on day 85 and 91 of differentiation), fixing was performed with 4% PFA at room temperature for 25 minutes, washing was performed three times with PBS, and incubation was then performed with 10% goat serum (manufactured by FUJIFILM Wako Pure Chemical Corporation)/PBS as blocking solution at room temperature for 1 hour. Thereafter, primary antibody solution 3 shown above in Table 4 was added, and incubation was performed at 4° C. overnight for costaining. After that, washing was performed three times with PBS, secondary antibody solution 3, corresponding to primary antibody solution 3, was further added, and incubation was performed at room temperature for 1 hour. Thereafter, washing was performed three times with PBS, and the resultant was stored at 4° C.

Microscopy and image acquisition were performed by using the fluorescence microscope BZ-X710 (manufactured by KEYENCE CORPORATION). The immunofluorescence staining images are shown in FIG. 24. For all the conditions examined (number of seeded cells (10000 cells and 20000 cells) and days of culturing (8 days (A) and 14 days (B)), O4-positive oligodendrocytes, GFAP-positive astrocytes, and MAP2-positive neurons were detected.

Example 18: Detection of Secretory Factors Derived from Cell Aggregate Including Glial Progenitor Cells Cell aggregate including glial progenitor cells were produced from the QHJI01s04 strain in accordance with the method of condition 3 in Example 1. On day 45 of differentiation, culture medium exchange was performed with a neuron-and-glia-proliferating culture medium, and culture was performed under 5% $CO_2$/20% $O_2$ at 37° C. After 48 hours, the culture solution was collected, and the culture supernatant was collected by centrifugation (1000 rpm, 5 minutes). Each residual cell pellet was dispersed into single cells by using TrypLE Select, and the total number of cells was counted. To measure the concentrations of cytokines contained in the neuron-and-glia-proliferating culture medium, only the neuron-and-glia-proliferating culture medium was treated under the same conditions (5% $CO_2$/20% $O_2$/37° C.) for 48 hours, and then collected.

Secretory factors in the culture supernatant were detected with two methods. By using Bio-Plex Pro® Human Cytokine Screening 48-Plex Panel (manufactured by Bio-Rad Laboratories, Inc.) in accordance with the instruction provided by the manufacturer, as the first method, the concentrations of 48 cytokines (FGF basic, Eotaxin, G-CSF, GM-CSF, IFN-γ, IL-1βP, IL-Ira, IL-1a, IL-2Rα, IL-3, IL-12 (p40), IL-16, IL-2, IL-4, IL-5, IL-6, IL-7, IL-8, IL-9, GRO-α, HGF, IFN-α2, LIF, MCP-3, IL-10, IL-12 (p70), IL-13, IL-15, IL-17, IP-10, MCP-1 (MCAF), MIG, β-NGF, SCF, SCGF-β, SDF-1α, MIP-1a, MIP-1β, PDGF-BB, RANTES, TNF-α, VEGF, CTACK, MIF, TRAIL, IL-18, M-CSF, and TNF-β) were measured.

First, Conjugated magnetic beads in 50-1 portions were added to a 96-well plate, and washed twice with Wash Buffer attached to the kit. The washing step was carried out by using an automated magnetic washing system (Bio-Plex ProII Wash Station, manufactured by Bio-Rad Laboratories, Inc.). Subsequently, 50 μl of 8-step 4-fold dilution series (n=2) produced by using Standard attached to the kit and 50 μl of a sample (culture supernatant and culture medium alone, n=3) were added to each well, and reacted under light-shielded conditions at room temperature for 30 minutes, with shaking at 850 rpm. Thereafter, washing was performed three times with Wash Buffer. Next, 25 μl of Detection Antibodies attached to the kit was added to each well, and reacted under light-shielded conditions at room temperature for 30 minutes, with shaking at 850 rpm. Thereafter, washing was performed three times with Wash Buffer. Next, 50 μl of Streptavidin-Phycoerythrin attached to the kit was added to each well, and reacted under light-shielded conditions at room temperature for 10 minutes, with shaking at 850 rpm. Thereafter, washing was performed three times with Wash Buffer. To each well, 125 μl of Assay Buffer attached to the kit was added, and fluorescence values were measured by using a Bio-Plex 200 system (manufactured by Bio-Rad Laboratories, Inc.).

A standard curve was prepared from measurement data for Standard dilution series of each cytokine by 5-parameter logistic regression using Bio-Plex Manager Software ver. 6.1 (Bio-Rad Laboratories, Inc.), and the concentrations of cytokines in each sample were quantified. Thereafter, measurement data for the culture medium alone were subtracted as a background from measurement data for the culture supernatant to calculate the concentrations of cytokines secreted into the culture supernatant. The concentrations of top 10 cytokines detected in the culture supernatant and the secretion rates per cells are shown in Table 8.

TABLE 8

|       | pg/ml | pg/1000 cells |
|-------|-------|---------------|
| MIF   | 433   | 1.50          |
| MCP-1 | 250   | 0.867         |
| IL-8  | 11.5  | 0.0398        |
| SCF   | 8.83  | 0.0306        |
| M-CSF | 6.65  | 0.0230        |
| HGF   | 5.48  | 0.0190        |
| GRO-α | 5.43  | 0.0188        |
| LIF   | 3.29  | 0.0114        |
| IFN-γ | 3.07  | 0.0106        |
| TRAIL | 3.01  | 0.0104        |

MIF, MCP-1, IL-8, and GRO-α are reported to be secretory factors derived from astrocytes (Non Patent Literature 9), SCF, HGF, and MIF promote proliferation and differentiation of neural progenitor cells (Non Patent Literatures 10 to 12), and M-CSF plays an important role in survival and differentiation of oligodendrocyte progenitor cells (Non Patent Literature 13); from these, it was revealed that cytokines that contribute to neurogenesis were secreted from the cell aggregate including glial progenitor cells.

By using a Human SPARC-like 1/SPARCL1 DuoSet ELISA (manufactured by R&D Systems, Inc.) and a DuoSet Ancillary Reagent Kit 2 (manufactured by R&D Systems, Inc.), as the second method, the concentration of SPARCL1 in the culture supernatant was measured.

First, in accordance with the instruction provided by the manufacturer, Human SPARC-like 1 Capture Antibody in 100-μl portions was added to a 96-well plate, and allowed to be adsorbed at room temperature overnight. Thereafter, washing was performed three times with Wash Buffer attached to the kit. Next, 300 μl of Reagent Diluent attached to the kit was added to each well, and reacted at room temperature for 80 minutes. Thereafter, washing was performed three times with Wash Buffer. Subsequently, 100 μl of 11-step 2-fold dilution series (n=2) produced by using Standard attached to the kit and 100 μl of a sample (culture supernatant and culture medium alone, n=3) were added to each well, and reacted under light-shielded conditions at room temperature for 2 hours. Thereafter, washing was performed three times with Wash Buffer. Next, 100 μl of Human SPARC-like 1 Detection Antibody attached to the kit was added to each well, and reacted under light-shielded conditions at room temperature for 2 hours. Thereafter, washing was performed three times with Wash Buffer. Next, 100 μl of Streptavidin-Horseradish peroxidase attached to the kit was added to each well, and reacted under light-shielded conditions at room temperature for 20 minutes. Thereafter, washing was performed three times with Wash Buffer. Next, 100 μl of Substrate Solution (a 1:1 mixture of Color Reagent A and Color Reagent B attached to the kit) was added, and reacted under light-shielded conditions at room temperature for 20 minutes. Subsequently, 50 μl of Stop Solution attached to the kit was added to each well to terminate the reaction, and absorbance was immediately measured by using the plate reader Enspire (manufactured by PerkinElmer, Inc.), and values of absorbance at 450 nm minus absorbance at 540 nm were calculated.

A calibration curve was prepared from a log-log scale plot of measurement data for the Standard dilution series by using Excel (manufactured by Microsoft Corporation), and the concentration of SPARCL1 in each sample was quantified. Measurement data for the culture medium alone were subtracted as a background from measurement data for the culture supernatant to calculate the concentration of SPARCL1 secreted into the culture supernatant. In addition, the secretion rate of SPARCL1 per cells was calculated (Table 9).

TABLE 9

|         | ng/ml   | ng/1000 cells |
|---------|---------|---------------|
| SPARCL1 | 6489.09 | 22.47         |

The results of analysis revealed that a high concentration of SPARCL1 was present in the culture supernatant for the cell aggregate including glial progenitor cells. SPARCL1 is a secretory factor derived from astrocytes and known to control synaptogenesis (Non Patent Literature 14), and hence it is inferred to be reasonable that SPARCL1 is a marker detected in culture supernatant for glial progenitor cells. Therefore, when being used singly or in combination with another marker, SPARCL1 is useful as a marker to confirm that target cells have been successfully obtained in the production process.

The invention claimed is:

1. A method for producing a cell aggregate including glial progenitor cells, comprising:
   (1) a step of subjecting pluripotent stem cells to suspension culture in an embryoid-body-forming culture medium containing SMAD signaling inhibitors and a Wnt signaling activator in the absence of feeder cells for 7 days, to form a cell aggregate, wherein the SMAD signaling inhibitors are a TGFβ inhibitor and a BMP inhibitor, wherein the TGFβ inhibitor is SB431542, wherein the BMP inhibitor is LDN-193189, and wherein the Wnt signaling activators is CHIR99021;
   (2) a step of subjecting the cell aggregate obtained in (1) to suspension culture in an embryoid-body-forming culture medium containing retinoic acid for 7 days;
   (3) a step of subjecting the cell aggregate obtained in (2) to suspension culture in an embryoid-body-forming culture medium or neuron-and-glia-proliferating culture medium containing retinoic acid and a SHH signaling activator, wherein the SHH signaling activator is purmorphamine; and
   (4) a step of subjecting the cell aggregate obtained in (3) to suspension culture in a neuron-and-glia-proliferating culture medium containing no retinoic acid and purmorphamine.

2. The production method according to claim 1, wherein, in step (1), pluripotent stem cells are cultured by using a culture vessel having a plurality of pores uniform in shape.

3. The production method according to claim 1, wherein, in step (1), step (1) is sustained until a cell aggregate satisfying at least one of the following conditions:
   1) having an RNA expression level of at least one of SOX1, PAX6, HES4, and HES5 increased by 100 times or more;
   2) having an RNA expression level of OCT3/4 decreased by 200 times or more; and
   3) having an RNA expression level of NANOG decreased by 400 times or more,
   as compared with the cell aggregate at initiation of step (1), is obtained, and step (2) is then initiated.

4. The production method according to claim 1, wherein, in step (2), step (2) is sustained until a cell aggregate satisfying at least one of the following conditions:
   1) having an RNA expression level of at least one of ASCL1, DCX, HEY1, ZBTB20, βμl tubulin, ELAVL3, and SLIT1 increased by 5 times or more; and
   2) having an RNA expression level of at least one of HOXB3, HOXA4, HOXB4, HOXB6, and HOXB8 increased by 5 times or more,
   as compared with the cell aggregate at initiation of step (2), is obtained, and step (3) is then initiated.

5. The production method according to claim 1, wherein an oxygen concentration is 3% to 10% in steps (1) and (2).

6. The production method according to claim 1, wherein, in step (3), step (3) is sustained until a cell aggregate satisfying at least one of the following conditions:
   1) Having an RNA expression level of at least one of HEY2, NKX6.2, and NKX2.2 increased by 5 times or more; and
   2) having an RNA expression level of OLIG1 and/or OLIG2 increased by 10 times or more,
   as compared with the cell aggregate at initiation of step (3), is obtained, and step (4) is then initiated.

7. The production method according to claim 1, wherein step (3) is performed for 4 days to 11 days.

8. The production method according to claim 1, wherein, in step (4), step (4) is sustained until a cell aggregate satisfying at least one of the following conditions:
   1) Having an RNA expression level of at least one of NFIA, NFIB, SLC1A3, S100B, and FABP7 increased by 10 times or more; and
   2) Having an RNA expression level of PAX6 decreased by 5 times or more,
   as compared with the cell aggregate at initiation of step (4), is obtained, and step (5) is then initiated.

9. The production method according to claim 1, wherein step (4) is performed for 4 days or more.

10. The production method according to claim 1, wherein, in step (4), the cell aggregate obtained in step (3) is dispersed at initiation of step (4), and the dispersed cells are then subjected to suspension culture, to form a cell aggregate again.

11. The production method according to claim 1, comprising step (5), wherein, in step (5), the cell aggregate obtained in step (4) is dispersed at initiation of step (5), and the dispersed cells are then subjected to suspension culture for 5 days to 100 days, to form a cell aggregate again.

12. The production method according to claim 1, comprising step (5), wherein, in step (5), step (5) is sustained until one or more markers selected from an O4 antigen, NG2, OLIG2, PDGFRα, SOX10, SPON1, FAM181B, TIMP4, SOX6, GRIK3, LHFPL3, KLF9, an A2B5 antigen, CNP, and PLP are expressed.

13. The production method according to claim 1, comprising step (5), wherein, in step (5), step (5) is sustained until one or more proteins selected from the group consisting of SPARCL1, MIF, MCP-1, IL-8, SCF, M-CSF, HGF, GRO-α, LIF, IFN-γ, and TRAIL are detected in the medium for culture of the cell aggregate.

14. The production method according to claim 1, wherein the pluripotent stem cells are induced pluripotent stem cells.

15. The production method according to claim 1, wherein the pluripotent stem cells are human induced pluripotent stem cells.

16. The production method according to claim 1, wherein the cell aggregate including glial progenitor cells has the following characteristics:
   (a) including oligodendrocyte progenitor cells, astrocyte progenitor cells, and neural progenitor cells;
   (b) expressing a spinal region marker; and
   (c) including no feeder cell and containing no xenogeneic-cell-derived component derived from feeder cells.

17. A method for producing a cell population including oligodendrocytes, astrocytes, and neural cells, comprising a step of culturing a cell aggregate including glial progenitor cells with use of a maturation culture medium for 5 days to 60 days, wherein the cell aggregate is produced by the production method according to claim 1.

18. The production method according to claim 17, wherein the cell population including oligodendrocytes, astrocytes, and neural cells includes:
   (i) cells expressing one or more markers selected from the group consisting of an O4 antigen, GalC, MBP, APC, GSTI, CNP, PLP, OLIG2, SOX10, PDGFRα, and NG2;
   (ii) cells expressing one or more markers selected from the group consisting of βIII tubulin, MAP2, and ELAVL3; and
   (iii) cells expressing one or more markers selected from the group consisting of SLC1A3, S100B, AQP4, GFAP, and NG2.

19. The production method according to claim 17, wherein the maturation culture medium is a culture medium containing at least one of T3, NT-3, and LIF.

20. The production method according to claim 19, wherein the maturation culture medium further contains CNTF.

21. The production method according to claim 1, wherein the cell aggregate has the following characteristics:
   (a) including oligodendrocyte progenitor cells, astrocyte progenitor cells, and neural progenitor cells;
   (b) including cells expressing a spinal region marker;
   (c) including no feeder cell and containing no xenogeneic-cell-derived component derived from feeder cells; and
   (d) having an ability to differentiate into a cell population including oligodendrocytes, astrocytes, and neural cells.

22. The production method according to claim 21, wherein the spinal region marker is one or more markers selected from the group consisting of HOXB3, HOXB4, HOXB6, and HOXD8.

23. The production method according to claim 21, further comprising cells expressing one or more markers selected from the group consisting of NKX2.1, NKX2.2, NKX6.1, and NKX6.2.

24. The production method according to claim 21, having the following characteristics:
   (I) including cells expressing one or more markers selected from the group consisting of NFIA, NFIB, SOX9, HEY1, HEY2, FABP7, ZBTB20, SLC1A3, S100B, MLC1, SLIT1, TIMP3, SPARCL1, GFAP, and AQP4;
   (II) including cells expressing one or more markers selected from the group consisting of OLIG2, PDGFRα, SOX10, SPON1, FAM181B, TIMP4, SOX6, GRIK3, LHFPL3, KLF9, an A2B5 antigen, CNP, and PLP;
   (III) including cells expressing one or more markers selected from the group consisting of DCX, Bill tubulin, MAP2, ELAVL3, NTRK2, GRIA2, PTPRO, and EPHA3;
   (IV) including cells expressing one or more markers selected from the group consisting of SOX1, SOX2, NESTIN, MEIS1, MEIS2, DLL3, and ASCL1; and
   (V) having an ability to differentiate into a cell population including (i) cells expressing one or more markers selected from the group consisting of an O4 antigen, GalC, MBP, APC, GSTπ, CNP, PLP, OLIG2, SOX10, PDGFRα, and NG2, (ii) cells expressing one or more markers selected from the group consisting of βIII tubulin, MAP2, and ELAVL3, and (iii) cells expressing one or more markers selected from the group consisting of SLC1A3, S100B, AQP4, GFAP, and NG2.

25. The production method according to claim 21, further (VI) comprising cells expressing one marker or a plurality of markers selected from the group consisting of C1ORF61 and SERPINE2.

26. The production method according to claim 21, further comprising cells expressing or secreting one or more markers selected from the group consisting of SPARCL1, MIF, MCP-1, IL-8, SCF, M-CSF, HGF, GRO-α, LIF, IFN-γ, and TRAIL.

27. The production method according to claim 1, wherein the following step is performed prior to step (1):
   a step of subjecting pluripotent stem cells to maintenance culture in the absence of feeder cells.

* * * * *

SEQUENCE LISTING

<160> NUMBER OF SEQ ID NOS: 22

<210> SEQ ID NO 1
<211> LENGTH: 20
<212> TYPE: DNA
<213> ORGANISM: Artificial Sequence
<220> FEATURE:
<223> OTHER INFORMATION: GAPDH forward primer

<400> SEQUENCE: 1
ggtcggagtc aacggatttg                                         20

<210> SEQ ID NO 2
<211> LENGTH: 20
<212> TYPE: DNA
<213> ORGANISM: Artificial Sequence
<220> FEATURE:
<223> OTHER INFORMATION: GAPDH reverse primer

<400> SEQUENCE: 2

```
tcagccttga cggtgccatg                                               20

<210> SEQ ID NO 3
<211> LENGTH: 19
<212> TYPE: DNA
<213> ORGANISM: Artificial Sequence
<220> FEATURE:
<223> OTHER INFORMATION: GFAP forward primer

<400> SEQUENCE: 3
gttctctcgg agtatctgg                                                19

<210> SEQ ID NO 4
<211> LENGTH: 22
<212> TYPE: DNA
<213> ORGANISM: Artificial Sequence
<220> FEATURE:
<223> OTHER INFORMATION: GFAP reverse primer

<400> SEQUENCE: 4
gatatcccac ctcataaaaa cc                                            22

<210> SEQ ID NO 5
<211> LENGTH: 24
<212> TYPE: DNA
<213> ORGANISM: Artificial Sequence
<220> FEATURE:
<223> OTHER INFORMATION: CSPG4 forward primer

<400> SEQUENCE: 5
acttgcatcc gcggcttcct tctt                                          24

<210> SEQ ID NO 6
<211> LENGTH: 21
<212> TYPE: DNA
<213> ORGANISM: Artificial Sequence
<220> FEATURE:
<223> OTHER INFORMATION: CSPG4 reverse primer

<400> SEQUENCE: 6
acaacgtggc ccagccctct a                                             21

<210> SEQ ID NO 7
<211> LENGTH: 18
<212> TYPE: DNA
<213> ORGANISM: Artificial Sequence
<220> FEATURE:
<223> OTHER INFORMATION: OLIG2 forward primer

<400> SEQUENCE: 7
ggcgcgcaac tacatcct                                                 18

<210> SEQ ID NO 8
<211> LENGTH: 19
<212> TYPE: DNA
<213> ORGANISM: Artificial Sequence
<220> FEATURE:
<223> OTHER INFORMATION: OLIG2 reverse primer

<400> SEQUENCE: 8
cgctcaccag tcgcttcat                                                19

<210> SEQ ID NO 9
<211> LENGTH: 24
<212> TYPE: DNA
<213> ORGANISM: Artificial Sequence
```

```
<220> FEATURE:
<223> OTHER INFORMATION: PDGFRA  forward primer

<400> SEQUENCE: 9
ctatccacac tgtcaaacag gttg                                          24

<210> SEQ ID NO 10
<211> LENGTH: 24
<212> TYPE: DNA
<213> ORGANISM: Artificial Sequence
<220> FEATURE:
<223> OTHER INFORMATION: PDGFRA reverse primer

<400> SEQUENCE: 10
actgctggac tgagaagttt catc                                          24

<210> SEQ ID NO 11
<211> LENGTH: 20
<212> TYPE: DNA
<213> ORGANISM: Artificial Sequence
<220> FEATURE:
<223> OTHER INFORMATION: PLP forward primer

<400> SEQUENCE: 11
ctgctcacct tcatgattgc                                               20

<210> SEQ ID NO 12
<211> LENGTH: 20
<212> TYPE: DNA
<213> ORGANISM: Artificial Sequence
<220> FEATURE:
<223> OTHER INFORMATION: PLP reverse primer

<400> SEQUENCE: 12
tgacttgcag ttgggaagtc                                               20

<210> SEQ ID NO 13
<211> LENGTH: 20
<212> TYPE: DNA
<213> ORGANISM: Artificial Sequence
<220> FEATURE:
<223> OTHER INFORMATION: SOX10 forward primer

<400> SEQUENCE: 13
atccaggccc actacaagag                                               20

<210> SEQ ID NO 14
<211> LENGTH: 20
<212> TYPE: DNA
<213> ORGANISM: Artificial Sequence
<220> FEATURE:
<223> OTHER INFORMATION: SOX10 reverse primer

<400> SEQUENCE: 14
gaagtcgatg tgaggcttcc                                               20

<210> SEQ ID NO 15
<211> LENGTH: 20
<212> TYPE: DNA
<213> ORGANISM: Artificial Sequence
<220> FEATURE:
<223> OTHER INFORMATION: CNP forward primer

<400> SEQUENCE: 15
aaggagaaga accagtggca                                               20
```

```
<210> SEQ ID NO 16
<211> LENGTH: 20
<212> TYPE: DNA
<213> ORGANISM: Artificial Sequence
<220> FEATURE:
<223> OTHER INFORMATION: CNP reverse primer

<400> SEQUENCE: 16
caagtccatc ttctccctgg                                              20

<210> SEQ ID NO 17
<211> LENGTH: 22
<212> TYPE: DNA
<213> ORGANISM: Artificial Sequence
<220> FEATURE:
<223> OTHER INFORMATION: MBP forward primer

<400> SEQUENCE: 17
gagccctctg ccctctcatg cc                                           22

<210> SEQ ID NO 18
<211> LENGTH: 26
<212> TYPE: DNA
<213> ORGANISM: Artificial Sequence
<220> FEATURE:
<223> OTHER INFORMATION: MBP reverse primer

<400> SEQUENCE: 18
tcagggacag tcctctcccc tttccc                                       26

<210> SEQ ID NO 19
<211> LENGTH: 19
<212> TYPE: DNA
<213> ORGANISM: Artificial Sequence
<220> FEATURE:
<223> OTHER INFORMATION: TUBB3 forward primer

<400> SEQUENCE: 19
tgatgagcat ggcatcgac                                               19

<210> SEQ ID NO 20
<211> LENGTH: 20
<212> TYPE: DNA
<213> ORGANISM: Artificial Sequence
<220> FEATURE:
<223> OTHER INFORMATION: TUBB3 reverse primer

<400> SEQUENCE: 20
ggcctgaaga gatgtccaaa                                              20

<210> SEQ ID NO 21
<211> LENGTH: 19
<212> TYPE: DNA
<213> ORGANISM: Artificial Sequence
<220> FEATURE:
<223> OTHER INFORMATION: MAP2 forward primer

<400> SEQUENCE: 21
ggatcaacgg agagctgac                                               19

<210> SEQ ID NO 22
<211> LENGTH: 20
<212> TYPE: DNA
<213> ORGANISM: Artificial Sequence
<220> FEATURE:
<223> OTHER INFORMATION: MAP2 reverse primer
```

```
<400> SEQUENCE: 22
tcaggactgc tacagcctca                                          20
```